(12) United States Patent
Goyal et al.

(10) Patent No.: US 9,596,222 B2
(45) Date of Patent: Mar. 14, 2017

(54) METHOD AND APPARATUS ENCODING A RULE FOR A LOOKUP REQUEST IN A PROCESSOR

(75) Inventors: Rajan Goyal, Saratoga, CA (US);
Satyanarayana Lakshmipathi Billa, Sunnyvale, CA (US); Gregg A. Bouchard, Georgetown, TX (US);
Gregory E. Lund, Eau Claire, WI (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 13/565,389

(22) Filed: Aug. 2, 2012

(65) Prior Publication Data
US 2013/0036477 A1    Feb. 7, 2013

Related U.S. Application Data

(60) Provisional application No. 61/514,344, filed on Aug. 2, 2011, provisional application No. 61/514,382, filed
(Continued)

(51) Int. Cl.
*H04L 29/06* (2006.01)
*G06F 13/16* (2006.01)
(Continued)

(52) U.S. Cl.
CPC .......... *H04L 63/06* (2013.01); *G06F 3/0629* (2013.01); *G06F 3/0647* (2013.01); *G06F 9/46* (2013.01); *G06F 9/5016* (2013.01); *G06F 9/5027* (2013.01); *G06F 11/203* (2013.01); *G06F 12/00* (2013.01); *G06F 12/0207* (2013.01); *G06F 12/04* (2013.01); *G06F 12/06* (2013.01); *G06F 12/0623* (2013.01); *G06F 12/0802* (2013.01); *G06F 12/0868* (2013.01); *G06F 12/126* (2013.01); *G06F 13/16* (2013.01); *G06F 13/1642* (2013.01); *G06N 5/02* (2013.01); *G06N 5/027* (2013.01); *G11C 7/1075* (2013.01);
(Continued)

(58) Field of Classification Search
CPC .......... H04L 63/0227; H04L 63/0263
USPC ....................................... 726/27, 13
See application file for complete search history.

(56) References Cited

U.S. PATENT DOCUMENTS 5,107,361 A    4/1992 Kneidinger et al.
5,214,653 A    5/1993 Elliott et al.
(Continued)

FOREIGN PATENT DOCUMENTS

EP           2 276 217 A2     1/2011
WO    WO 2004/013777 A1     2/2004
(Continued)

OTHER PUBLICATIONS

Abdelghani et al. (2005) "Packet Classification Using Adaptive Rule Cutting," In; The IEEE Proc. of Adv. Indus. Conf. on Telecom. pp. 28-33.
(Continued)

*Primary Examiner* — Jason C Chiang
(74) *Attorney, Agent, or Firm* — Hamilton, Brook, Smith & Reynolds, P.C.

(57) ABSTRACT

In one embodiment, a method includes encoding a key matching rule having at least one dimension by storing in a memory (i) a header of the key matching rule that has at least one header field, and (ii) at least one rule value field of the key matching rule corresponding to one of the dimensions.

24 Claims, 36 Drawing Sheets

Related U.S. Application Data on Aug. 2, 2011, provisional application No. 61/514,379, filed on Aug. 2, 2011, provisional application No. 61/514,400, filed on Aug. 2, 2011, provisional application No. 61/514,406, filed on Aug. 2, 2011, provisional application No. 61/514,407, filed on Aug. 2, 2011, provisional application No. 61/514,438, filed on Aug. 2, 2011, provisional application No. 61/514,447, filed on Aug. 2, 2011, provisional application No. 61/514,450, filed on Aug. 2, 2011, provisional application No. 61/514,463, filed on Aug. 2, 2011, provisional application No. 61/514,459, filed on Aug. 2, 2011.

(51) Int. Cl.

| | | |
|---|---|---|
| *G06F 12/08* | (2016.01) | |
| *G06F 12/02* | (2006.01) | |
| *G06F 12/04* | (2006.01) | |
| *G06F 12/06* | (2006.01) | |
| *G06F 12/00* | (2006.01) | |
| *G06F 3/06* | (2006.01) | |
| *G06F 11/20* | (2006.01) | |
| *G06F 12/12* | (2016.01) | |
| *G06N 5/02* | (2006.01) | |
| *H04L 12/26* | (2006.01) | |
| *H04L 12/747* | (2013.01) | |
| *H04L 12/851* | (2013.01) | |
| *H04L 12/801* | (2013.01) | |
| *H04L 12/741* | (2013.01) | |
| *G06F 9/50* | (2006.01) | |
| *H04L 29/08* | (2006.01) | |
| *G06F 9/46* | (2006.01) | |
| *G11C 7/10* | (2006.01) | |

(52) U.S. Cl.
CPC ............ *H04L 43/18* (2013.01); *H04L 45/742* (2013.01); *H04L 45/745* (2013.01); *H04L 47/2441* (2013.01); *H04L 47/39* (2013.01); *H04L 63/0227* (2013.01); *H04L 63/10* (2013.01); *H04L 67/10* (2013.01); *H04L 69/02* (2013.01); *H04L 69/22* (2013.01); *H04L 63/0263* (2013.01); *Y02B 60/1228* (2013.01); *Y02B 60/142* (2013.01)

(56) References Cited

U.S. PATENT DOCUMENTS

| | | | |
|---|---|---|---|
| 5,463,777 A | 10/1995 | Bialkowski et al. | |
| 5,584,026 A | 12/1996 | Knudsen et al. | |
| 5,682,535 A | 10/1997 | Knudsen | |
| 5,893,142 A | 4/1999 | Moyer et al. | |
| 5,893,911 A | 4/1999 | Piskiel et al. | |
| 6,212,184 B1 * | 4/2001 | Venkatachary et al. | 370/392 |
| 6,233,575 B1 | 5/2001 | Agrawal et al. | |
| 6,298,340 B1 | 10/2001 | Calvignac et al. | |
| 6,341,130 B1 * | 1/2002 | Lakshman et al. | 370/389 |
| 6,467,019 B1 | 10/2002 | Washburn | |
| 6,473,763 B1 | 10/2002 | Corl et al. | |
| 6,476,763 B2 | 11/2002 | Allen | |
| 6,510,509 B1 * | 1/2003 | Chopra et al. | 712/13 |
| 6,539,394 B1 * | 3/2003 | Calvignac et al. | |
| 6,567,408 B1 * | 5/2003 | Li et al. | 370/395.31 |
| 6,587,466 B1 | 7/2003 | Bhattacharya et al. | |
| 6,636,480 B1 | 10/2003 | Walia et al. | |
| 6,658,002 B1 | 12/2003 | Ross et al. | |
| 6,735,600 B1 | 5/2004 | Andreev | |
| 6,868,414 B2 | 3/2005 | Khanna et al. | |
| 6,918,031 B2 | 7/2005 | Wilson | |
| 6,980,555 B2 | 12/2005 | Mar | |
| 7,039,641 B2 | 5/2006 | Woo | |
| 7,046,848 B1 | 5/2006 | Olcott | |
| 7,110,407 B1 | 9/2006 | Khanna | |
| 7,133,409 B1 | 11/2006 | Willardson | |
| 7,225,188 B1 | 5/2007 | Gai et al. | |
| 7,260,558 B1 | 8/2007 | Cheng et al. | |
| 7,350,040 B2 | 3/2008 | Marinescu | |
| 7,366,728 B2 | 4/2008 | Corl et al. | |
| 7,370,361 B2 | 5/2008 | de los Santos et al. | |
| 7,415,472 B2 | 8/2008 | Testa | |
| 7,441,022 B1 | 10/2008 | Schuba et al. | |
| 7,509,300 B2 | 3/2009 | Sahni et al. | |
| 7,536,476 B1 | 5/2009 | Alleyne | |
| 7,546,234 B1 | 6/2009 | Deb et al. | |
| 7,554,949 B2 | 6/2009 | Chen | |
| 7,571,156 B1 | 8/2009 | Gupta et al. | |
| 7,590,860 B2 | 9/2009 | Leporini et al. | |
| 7,594,081 B2 | 9/2009 | Bouchard et al. | |
| 7,613,926 B2 | 11/2009 | Edery et al. | |
| 7,634,408 B1 | 12/2009 | Mohri | |
| 7,636,717 B1 | 12/2009 | Gupta et al. | |
| 7,702,629 B2 | 4/2010 | Cytron et al. | |
| 7,710,988 B1 | 5/2010 | Tripathi et al. | |
| 7,711,893 B1 | 5/2010 | Venkatachary | |
| 7,761,890 B1 | 7/2010 | Harvey et al. | |
| 7,870,161 B2 | 1/2011 | Wang | |
| 7,873,992 B1 | 1/2011 | Daily et al. | |
| 7,932,349 B2 | 4/2011 | Riehle et al. | |
| 7,937,355 B2 | 5/2011 | Corl et al. | |
| 7,949,683 B2 | 5/2011 | Goyal | |
| 7,962,434 B2 | 6/2011 | Estan et al. | |
| 7,990,893 B1 * | 8/2011 | Singh | 370/254 |
| 7,992,169 B1 | 8/2011 | Harvey et al. | |
| 8,005,869 B2 | 8/2011 | Corl et al. | |
| 8,024,802 B1 | 9/2011 | Preston | |
| 8,051,085 B1 | 11/2011 | Srinivasan et al. | |
| 8,111,697 B1 * | 2/2012 | Panwar et al. | 370/392 |
| 8,156,507 B2 | 4/2012 | Brjazorski et al. | |
| 8,165,125 B2 * | 4/2012 | Kim et al. | 370/392 |
| 8,180,803 B2 | 5/2012 | Goyal | |
| 8,301,788 B2 | 10/2012 | Bouchard et al. | |
| 8,352,391 B1 * | 1/2013 | Kapadia | 706/14 |
| 8,392,590 B2 | 3/2013 | Bouchard et al. | |
| 8,407,794 B2 | 3/2013 | Kim et al. | |
| 8,447,120 B2 | 5/2013 | Ji et al. | |
| 8,473,523 B2 | 6/2013 | Goyal | |
| 8,477,611 B2 | 7/2013 | Lim | |
| 8,477,773 B2 | 7/2013 | Sundstrom | |
| 8,543,528 B2 | 9/2013 | Lunteren | |
| 8,554,698 B2 | 10/2013 | Bando et al. | |
| 8,566,344 B2 | 10/2013 | Bando et al. | |
| 8,800,021 B1 | 8/2014 | Swaminathan et al. | |
| 8,856,203 B1 | 10/2014 | Schelp et al. | |
| 8,934,488 B2 | 1/2015 | Goyal et al. | |
| 8,937,952 B2 | 1/2015 | Goyal et al. | |
| 8,937,954 B2 | 1/2015 | Goyal et al. | |
| 8,990,259 B2 | 3/2015 | Billa et al. | |
| 9,137,340 B2 | 9/2015 | Goyal et al. | |
| 9,183,244 B2 | 11/2015 | Bullis et al. | |
| 9,344,366 B2 | 5/2016 | Bouchard et al. | |
| 2001/0006520 A1 | 7/2001 | Moulsley et al. | |
| 2002/0023089 A1 | 2/2002 | Woo | |
| 2003/0005144 A1 | 1/2003 | Engel et al. | |
| 2003/0028674 A1 * | 2/2003 | Boden | 709/250 |
| 2003/0108043 A1 * | 6/2003 | Liao | 370/392 |
| 2003/0126272 A1 | 7/2003 | Corl et al. | |
| 2003/0156586 A1 | 8/2003 | Lee et al. | |
| 2003/0223421 A1 | 12/2003 | Rich et al. | |
| 2004/0006668 A1 | 1/2004 | Park et al. | |
| 2004/0158744 A1 | 8/2004 | Deng et al. | |
| 2004/0162826 A1 | 8/2004 | Wyschogrod et al. | |
| 2004/0172234 A1 | 9/2004 | Dapp et al. | |
| 2004/0193563 A1 | 9/2004 | Hagelin | |
| 2004/0225999 A1 | 11/2004 | Nuss | |
| 2004/0258067 A1 | 12/2004 | Irish et al. | |
| 2004/0264384 A1 | 12/2004 | Deval et al. | |
| 2005/0013293 A1 | 1/2005 | Sahita | |
| 2005/0028114 A1 | 2/2005 | Gould et al. | |
| 2005/0035784 A1 | 2/2005 | Gould et al. | |

(56) References Cited

U.S. PATENT DOCUMENTS

| | | |
|---|---|---|
| 2005/0157641 A1 | 7/2005 | Roy |
| 2005/0177736 A1 | 8/2005 | de los Santos et al. |
| 2005/0238010 A1 | 10/2005 | Panigrahy et al. |
| 2005/0240604 A1 | 10/2005 | Corl et al. |
| 2005/0278781 A1 | 12/2005 | Zhao et al. |
| 2006/0002386 A1* | 1/2006 | Yik et al. ............ 370/389 |
| 2006/0026138 A1 | 2/2006 | Robertson et al. |
| 2006/0029104 A1 | 2/2006 | Jungck |
| 2006/0039372 A1 | 2/2006 | Sarkinen et al. |
| 2006/0059165 A1* | 3/2006 | Bosloy et al. ............ 707/10 |
| 2006/0059314 A1 | 3/2006 | Bouchard et al. |
| 2006/0069872 A1 | 3/2006 | Bouchard et al. |
| 2006/0075206 A1 | 4/2006 | Bouchard et al. |
| 2006/0085533 A1 | 4/2006 | Hussain et al. |
| 2006/0101195 A1 | 5/2006 | Jain |
| 2006/0130142 A1 | 6/2006 | Mester et al. |
| 2006/0136570 A1 | 6/2006 | Pandya |
| 2006/0155915 A1 | 7/2006 | Pereira |
| 2006/0221954 A1 | 10/2006 | Narayan et al. |
| 2006/0288024 A1 | 12/2006 | Braica |
| 2007/0011734 A1* | 1/2007 | Balakrishnan et al. ........ 726/13 |
| 2007/0115966 A1* | 5/2007 | Tzeng ............ 370/389 |
| 2007/0168377 A1 | 7/2007 | Zabarsky |
| 2007/0192863 A1 | 8/2007 | Kapoor et al. |
| 2007/0240229 A1 | 10/2007 | Yoon et al. |
| 2007/0282573 A1 | 12/2007 | Fritz et al. |
| 2008/0031258 A1 | 2/2008 | Acharya et al. |
| 2008/0034427 A1 | 2/2008 | Cadambi et al. |
| 2008/0059464 A1 | 3/2008 | Law et al. |
| 2008/0071783 A1 | 3/2008 | Langmead et al. |
| 2008/0082946 A1 | 4/2008 | Zilic et al. |
| 2008/0097959 A1 | 4/2008 | Chen et al. |
| 2008/0101371 A1 | 5/2008 | Law et al. |
| 2008/0109392 A1 | 5/2008 | Nandy |
| 2008/0109431 A1 | 5/2008 | Kori |
| 2008/0140600 A1 | 6/2008 | Pandya |
| 2008/0140631 A1 | 6/2008 | Pandya |
| 2008/0209540 A1 | 8/2008 | Deng et al. |
| 2008/0229415 A1 | 9/2008 | Kapoor et al. |
| 2008/0262991 A1 | 10/2008 | Kapoor et al. |
| 2008/0270833 A1 | 10/2008 | McMillen |
| 2008/0271147 A1 | 10/2008 | Mohanan et al. |
| 2008/0291916 A1 | 11/2008 | Xiong et al. |
| 2008/0310440 A1* | 12/2008 | Chen et al. ............ 370/413 |
| 2009/0006847 A1* | 1/2009 | Abzarian et al. ............ 713/164 |
| 2009/0034530 A1* | 2/2009 | Basso et al. ............ 370/392 |
| 2009/0063825 A1 | 3/2009 | McMillen et al. |
| 2009/0119279 A1 | 5/2009 | Goyal et al. |
| 2009/0119399 A1 | 5/2009 | Hussain et al. |
| 2009/0125470 A1 | 5/2009 | Shah et al. |
| 2009/0138440 A1 | 5/2009 | Goyal |
| 2009/0138494 A1 | 5/2009 | Goyal |
| 2009/0185568 A1 | 7/2009 | Cho et al. |
| 2009/0217341 A1* | 8/2009 | Sun et al. ............ 726/1 |
| 2009/0262659 A1* | 10/2009 | Sturges et al. ............ 370/253 |
| 2009/0274384 A1 | 11/2009 | Jakobovits |
| 2009/0323383 A1* | 12/2009 | Mondaeev et al. ........ 365/49.17 |
| 2010/0034202 A1 | 2/2010 | Lu et al. |
| 2010/0037056 A1 | 2/2010 | Follis et al. |
| 2010/0067535 A1 | 3/2010 | Ma et al. |
| 2010/0094906 A1 | 4/2010 | Della-Libera et al. |
| 2010/0095162 A1 | 4/2010 | Inakoshi |
| 2010/0110936 A1 | 5/2010 | Bailey et al. |
| 2010/0114973 A1 | 5/2010 | Goyal |
| 2010/0146623 A1 | 6/2010 | Namjoshi et al. |
| 2010/0153326 A1 | 6/2010 | Bernardes et al. |
| 2010/0153420 A1 | 6/2010 | Yang et al. |
| 2010/0158394 A1 | 6/2010 | Chang et al. |
| 2010/0175124 A1 | 7/2010 | Miranda |
| 2010/0192225 A1 | 7/2010 | Ma et al. |
| 2010/0199355 A1 | 8/2010 | Ouddan et al. |
| 2010/0281532 A1 | 11/2010 | Deng et al. |
| 2011/0016154 A1 | 1/2011 | Goyal et al. |
| 2011/0038375 A1 | 2/2011 | Liu et al. |
| 2011/0090842 A1* | 4/2011 | Hirano ............ H04L 63/12 370/328 |
| 2011/0093484 A1 | 4/2011 | Bando et al. |
| 2011/0093496 A1 | 4/2011 | Bando et al. |
| 2011/0113191 A1 | 5/2011 | Pandya |
| 2011/0119440 A1 | 5/2011 | Pandya |
| 2011/0137930 A1 | 6/2011 | Hao et al. |
| 2011/0173149 A1 | 7/2011 | Schon |
| 2011/0173490 A1 | 7/2011 | Narayanaswamy et al. |
| 2011/0185077 A1 | 7/2011 | Bremler-Barr et al. |
| 2011/0219010 A1 | 9/2011 | Lim |
| 2011/0238855 A1 | 9/2011 | Korsunsky et al. |
| 2011/0264822 A1* | 10/2011 | Ferguson et al. ............ 709/235 |
| 2011/0295779 A1 | 12/2011 | Chen et al. |
| 2012/0017262 A1 | 1/2012 | Kapoor et al. |
| 2012/0078832 A1 | 3/2012 | Lunteren |
| 2012/0143854 A1 | 6/2012 | Goyal et al. |
| 2012/0203718 A1 | 8/2012 | Biran et al. |
| 2012/0215569 A1* | 8/2012 | Bauchot et al. ............ 705/5 |
| 2012/0221494 A1 | 8/2012 | Pasetto et al. |
| 2012/0221497 A1 | 8/2012 | Goyal et al. |
| 2012/0311529 A1 | 12/2012 | Beveridge et al. |
| 2012/0331007 A1 | 12/2012 | Billa et al. |
| 2012/0331554 A1 | 12/2012 | Goyal et al. |
| 2013/0034100 A1 | 2/2013 | Goyal et al. |
| 2013/0034106 A1 | 2/2013 | Goyal et al. |
| 2013/0036083 A1 | 2/2013 | Goyal |
| 2013/0036102 A1 | 2/2013 | Goyal et al. |
| 2013/0036471 A1* | 2/2013 | Bouchard et al. ............ 726/23 |
| 2013/0039366 A1 | 2/2013 | Goyal et al. |
| 2013/0060727 A1 | 3/2013 | Goyal et al. |
| 2013/0070753 A1 | 3/2013 | Sahni et al. |
| 2013/0085978 A1 | 4/2013 | Goyal et al. |
| 2013/0133064 A1 | 5/2013 | Goyal et al. |
| 2013/0191916 A1 | 7/2013 | Yao et al. |
| 2013/0212484 A1 | 8/2013 | Joshi et al. |
| 2013/0218853 A1 | 8/2013 | Bullis et al. |
| 2013/0232104 A1 | 9/2013 | Goyal et al. |
| 2013/0282766 A1 | 10/2013 | Goyal et al. |
| 2014/0013104 A1 | 1/2014 | Vinnik et al. |
| 2014/0079063 A1 | 3/2014 | Edsall et al. |
| 2014/0214749 A1 | 7/2014 | Ruehle |
| 2014/0229386 A1 | 8/2014 | Tervo et al. |
| 2014/0279850 A1 | 9/2014 | Goyal et al. |
| 2014/0280357 A1 | 9/2014 | Goyal et al. |
| 2014/0281809 A1 | 9/2014 | Goyal et al. |
| 2015/0066927 A1 | 3/2015 | Goyal et al. |
| 2015/0067123 A1 | 3/2015 | Goyal et al. |
| 2015/0067200 A1 | 3/2015 | Goyal et al. |
| 2015/0067776 A1 | 3/2015 | Goyal et al. |
| 2015/0067836 A1 | 3/2015 | Billa et al. |
| 2015/0117461 A1 | 4/2015 | Goyal et al. |
| 2015/0186786 A1 | 7/2015 | Goyal et al. |
| 2015/0189046 A1 | 7/2015 | Worrell et al. |
| 2015/0193689 A1 | 7/2015 | Worrell |
| 2015/0220454 A1 | 8/2015 | Goyal et al. |
| 2015/0220845 A1 | 8/2015 | Goyal et al. |
| 2016/0248739 A1 | 8/2016 | Bouchard et al. |

FOREIGN PATENT DOCUMENTS

| | | |
|---|---|---|
| WO | WO 2007/109445 A1 | 9/2007 |
| WO | WO 2008/005772 A2 | 1/2008 |
| WO | WO 2009/145712 A1 | 12/2009 |
| WO | WO 2012/177736 A1 | 12/2012 |
| WO | WO 2012/177752 A1 | 12/2012 |
| WO | WO 2013/020002 A1 | 2/2013 |
| WO | WO 2013/020003 A1 | 2/2013 |
| WO | WO 2013/078053 A1 | 5/2013 |

OTHER PUBLICATIONS

Aho et al. (1977) Ch. 3 In; Principles of Compiler Design. Addison-Wesley. pp. 73-124.

Baboescu et al. (2001) "Scalable Packet Classification," In; The Proceedings of the ACM SIGCOMM '01 Conference on Applications, Technologies, Architectures, and Protocols for Computer Communication. pp. 199-210.

(56) References Cited

OTHER PUBLICATIONS

Baboescu et al. (2003) "Packet Classification for Core Routers: Is there an alternative to CAMs?" In; The Twenty-Second Annual Joint Conference of the IEEE Computer and Communications, INFOCOM 2003. vol. 1. pp. 53-63.
Becchi et al (2008) "Extending Finite Automata to Efficiently Match Peri-compatible Regular Expressions," In; The Proceedings of the 2008 CoNEXT Conference. Dec. 9-12, 2008.
Becchi et al. (2007) "A Hybrid Finite Automaton for Practical Deep Packet Inspection," In; The Proceedings of the 6 International Conference on emerging Networking Experiments and Technologies (CoNEXT), New York, New York. Dec. 2007.
Becchi et al. (2009) "Data Structures, Algorithms and Architechtures for Efficient Regular Expression Evaluation," Washington University. Dissertation for the degree of Doctor of Philosophy. Saint Louis, Missouri.
Branch et al. (2002) "Denial of Service Intrusion Detection Using Time Dependent Deterministic Finite Automata," In; The Proc. Research Conference, Troy, NY, Oct. 2002.
Chodnicki (2011) "An Introduction to Regular Expressions/Adventures with Open Source B1," Adventures with Open 9 Source B1. Accessible on the Internet at URL: available at http:1/type-exil.org/adventures-with-open-source-bi/2011/05/an-introduction-to-regular-expressions. [Last Accessed Aug. 21, 2015].
Faro et al. (2008) "Efficient Variants of the Backward-Oracle-Matching Algorithm," In; The Proceedings of Prague Stringology Conference, 2008, pp. 146-160.
Gupta et al. (1999) "Packet Classification on Multiple Fields," In; The Proceedings of SIGCOMM '99 Conference on Applications, Technologies, Architectures, and Protocols for Computer Communication (SIGCOMM '99). pp. 147-160.
Gupta et al. (2000) "Classifying Packets With Hierarchical Intelligent Cuttings," IEEE Micro. 20(1):34-41.
Gupta (2000) "Algorithms for Packet Routing Lookups and Packet Classification," Stanford University. Dissertation for the degree of Doctor of Philosophy.
Hoperoft et al. (1979) Ch. 2 In; Introduction to Automata Theory, Languages, and Computation. Addison-Wesley. Reading, Massachusetts.
Wikipedia "Access control list," Wikimedia Foundation, Inc. Accessible on the Internet at URL: https:l/en.wikipedia.org/ wiki/Access_control_list. [Last Accessed Aug. 21, 2015].
Klarlund (1992) "Progress Measures, Immediate Determinacy, and a Subset Construction for Tree Automata," In; The Proceedings of the Seventh Annual IEEE Symposium on Logic in Computer Science, 1992. LICS '92. pp. 382-393.
Navarro (2001) "NR-grep: A Fast and Flexible Pattern Matching Tool," Software Practice and Experience (SPE). 31:1265-1312.
Navarro (2004) "Pattern Matching," Journal of Applied Statistics. 31 (8):925-949.
Pong et al. (2011) "HARP: Rapid Packet Classification via Hashing Round-Down Prefixes," IEEE Transactions on Parallel and Distributed Systems. 22(7):11 05•1119.
Qi et al. (2009) "Packet Classification Algorithms: From Theory to Practice," In; The Proceedings of the 28th IEEE Conference on Computer Communications (INFOCOM '09). pp. 648-656.
Rabin et al. (1959) "Finite Automata and their Decision Problems," IBM Journal of Research and Development. 3 (2): 114-125.
Singh (2002)"Regular Expressions," Seeing With C. Accessible on the Internet at URL: http://www.seeingwithc.org/ topic7html.html. [Last Accessed Aug. 24, 2014].
Singh et al. (2003) "Packet Classification Using Multidimensional Cutting," In; The Proceedings of the ACMSIGCOMM 23 '03 Conference on Applications, Technologies, Architectures, and Protocols for Computer Communication (SIGCOMM '03). pp. 213-224.
Sipser (1997) "Introduction to the Theory of Computation," PWS Nondeterminism. Section 1.2 pp. 47-63.
Sun et al. (2008) "HFilter: Hybrid Finite Automaton Based Stream Filtering for Deep and Recursive XML Data," Database and Expert Systems Applications Lecture Notes in Computer Science. 5181:566-580.
Theiling (2001) "Generating Decision Trees for Decoding Binaries" In; The OM '01 Proceedings of the 2001 ACM SIGPLAN workshop on Optimization of middle ware and distributed systems. pp. 112-120.
Yu et al. (2006) "A Novel IP Packet Classification Algorithm Based on Hierarchical Intelligent Cuttings," In; The Proceedings of the IEEE 6th International Conference on ITS Telecom. pp. 1033-1036.
Zhang et al. (2010) "On Constructing Efficient Shared Decision Trees for Multiple Packet Filters," In; IEEE INFOCOM '10. San Diego, California.
International Search Report with Written Opinion corresponding to International Patent Application No. PCT/ US2012/043307, mailed Dec. 6, 2012.
International Search Report with Written Opinion corresponding to International Patent Application No. PCT/ US2012/049406, mailed Oct. 18, 2012.
Office Action corresponding to U.S. Appl. No. 13/168,395, mailed Apr. 20, 2015.
Office Action corresponding to U.S. Appl. No. 13/168,395, mailed Dec. 24, 2014.
Office Action corresponding to U.S. Appl. No. 13/168,395, mailed Dec. 27, 2013.
Office Action corresponding to U.S. Appl. No. 13/168,395, mailed Jun. 10, 2014.
Office Action corresponding to U.S. Appl. No. 13/168,450, mailed Apr. 25, 2013.
Office Action corresponding to U.S. Appl. No. 13/168,450, mailed Feb. 28, 2014.
Office Action corresponding to U.S. Appl. No. 13/168,450, mailed Jun. 6, 2014.
Office Action corresponding to U.S. Appl. No. 13/168,450, mailed Oct. 8, 2014.
Office Action corresponding to U.S. Appl. No. 13/565,775, mailed Aug. 26, 2014.
Office Action corresponding to U.S. Appl. No. 13/565,775, mailed Feb. 9, 2015.
Office Action corresponding to U.S. Appl. No. 13/831,191, mailed Dec. 12, 2014.
Office Action corresponding to U.S. Appl. No. 13/831,191, mailed May 21, 2015.
Office Action corresponding to U.S. Appl. No. 13/831,232, mailed Nov. 21, 2014.
Office Action corresponding to U.S. Appl. No. 13/831,415, mailed Dec. 18, 2014.
Office Action corresponding to U.S. Appl. No. 13/831,415, mailed Jun. 4, 2015.
Office Action corresponding to U.S. Appl. No. 14/145,918, mailed Aug. 19, 2015.
Office Action corresponding to U.S. Appl. No. 14/145,918, mailed Jan. 26, 2016.

* cited by examiner

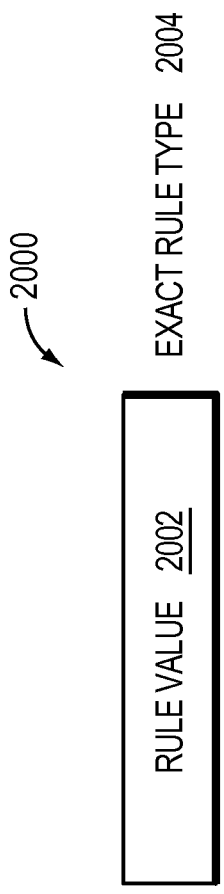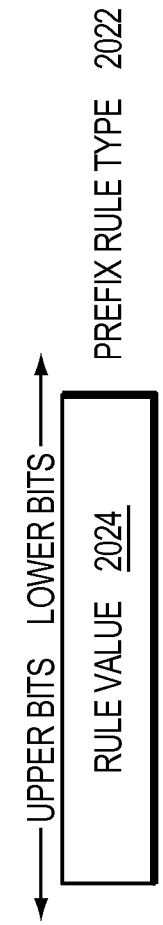

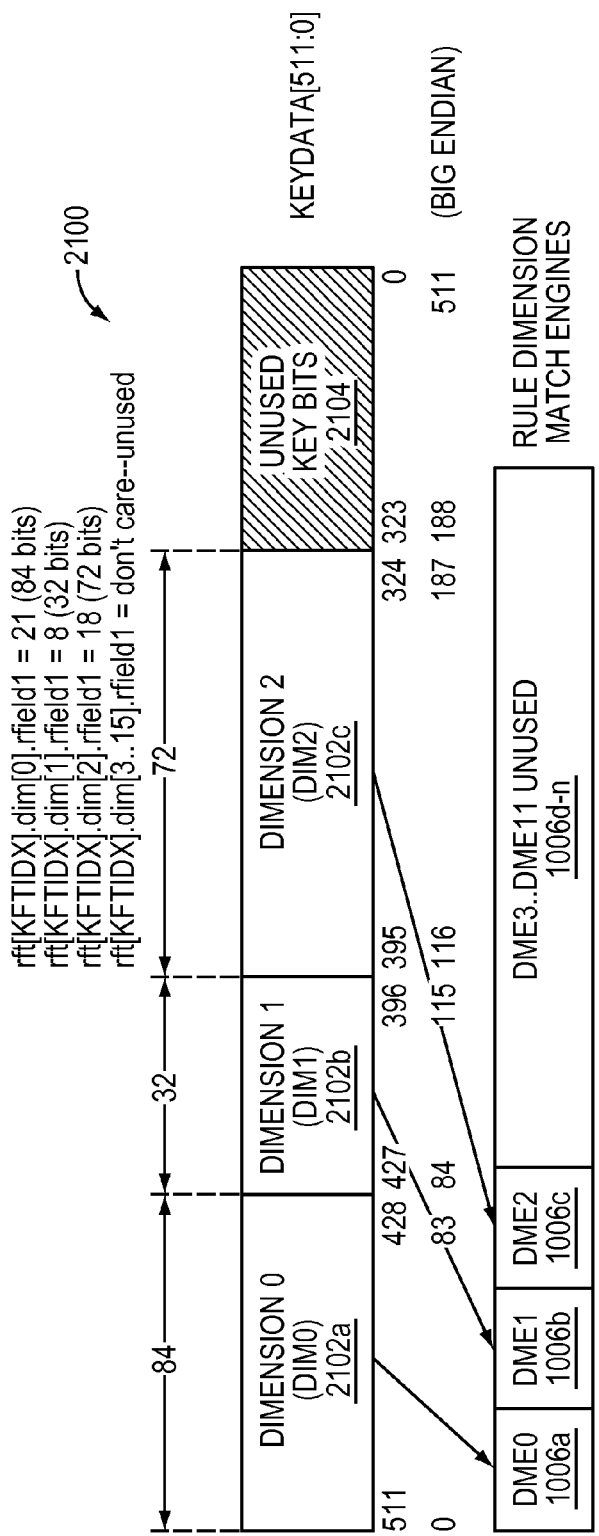
FIG. 21A
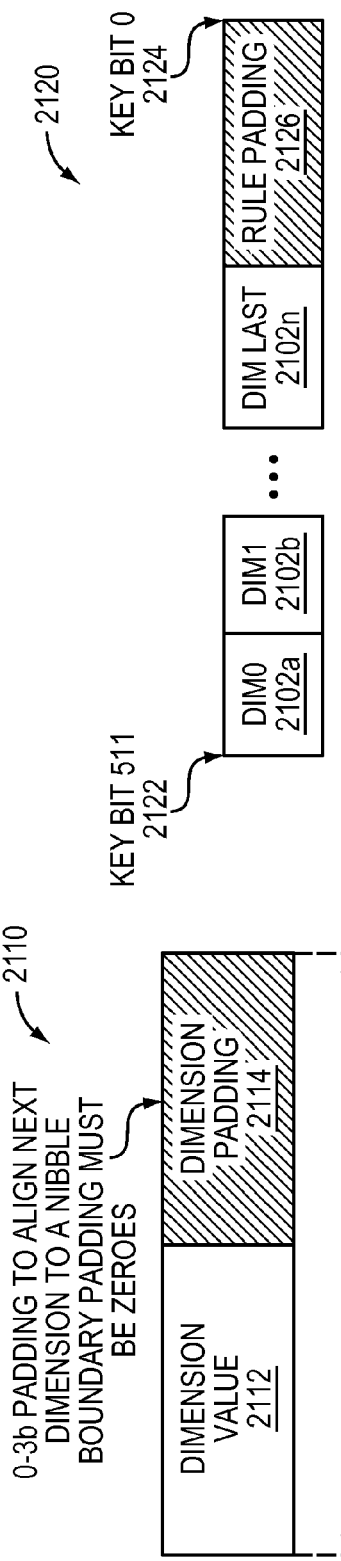
FIG. 21C
FIG. 21B

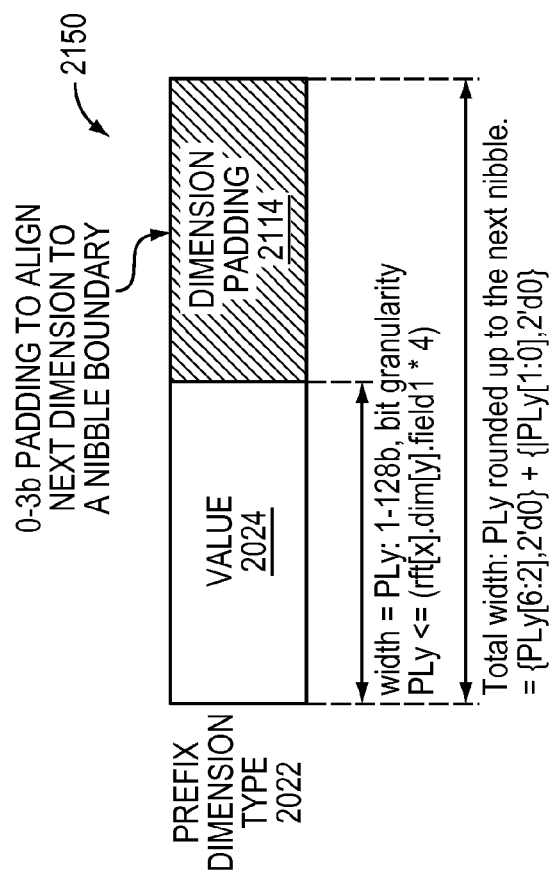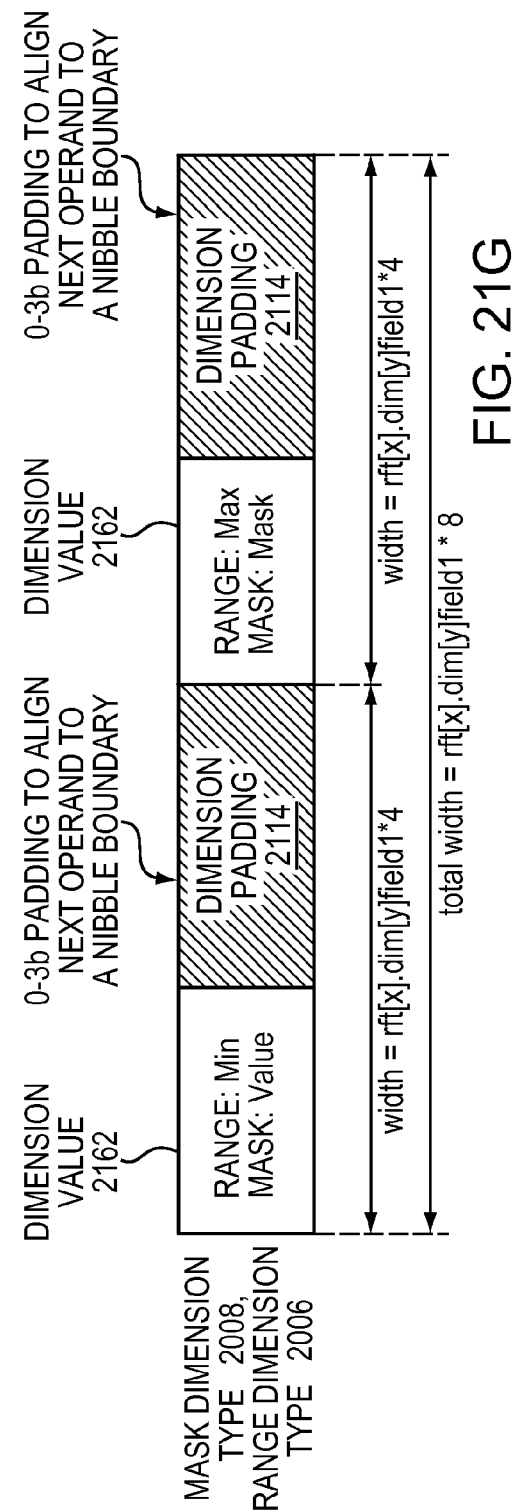

METHOD AND APPARATUS ENCODING A RULE FOR A LOOKUP REQUEST IN A PROCESSOR

RELATED APPLICATIONS

This application claims the benefit of U.S. Provisional Application No. 61/514,344, filed on Aug. 2, 2011; U.S. Provisional Application No. 61/514,382, filed on Aug. 2, 2011; U.S. Provisional Application No. 61/514,379, filed on Aug. 2, 2011; U.S. Provisional Application No. 61/514,400, filed on Aug. 2, 2011; U.S. Provisional Application No. 61/514,406, filed on Aug. 2, 2011; U.S. Provisional Application No. 61/514,407, filed on Aug. 2, 2011; U.S. Provisional Application No. 61/514,438, filed on Aug. 2, 2011; U.S. Provisional Application No. 61/514,447, filed on Aug. 2, 2011; U.S. Provisional Application No. 61/514,450, filed on Aug. 2, 2011; U.S. Provisional Application No. 61/514,459, filed on Aug. 2, 2011; and U.S. Provisional Application No. 61/514,463, filed on Aug. 2, 2011. The entire teachings of the above applications are incorporated herein by reference.

BACKGROUND

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems can process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems can simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Improving the efficiency and security of network operation in today's Internet world remains an ultimate goal for Internet users. Access control, traffic engineering, intrusion detection, and many other network services can be optimized by packet classification, which is discrimination of packets based on multiple fields of packet headers.

Internet routers can classify packets to implement a number of advanced internet services such as routing, rate limiting, access control in firewalls, virtual bandwidth allocation, policy-based routing, service differentiation, load balancing, traffic shaping, and traffic billing. To perform these services, the router classifies incoming packets into different flows and then performs appropriate actions depending on the classification.

A classifier, using a set of filters or rules, specifies the flows, or classes. For example, each rule in a firewall might specify a set of source and destination addresses and associate a corresponding deny or permit action with it. Alternatively, the rules might be based on several fields of a packet header including layers 2, 3, 4, and 5 of the OSI model, which contain addressing and protocol information.

On some types of proprietary hardware, an Access Control List (ACL) refers to rules that are applied to port numbers or network daemon names that are available on a host or layer 3 device, each with a list of hosts and/or networks permitted to use a service. Both individual servers as well as routers can have network ACLs. ACLs can be configured to control both inbound and outbound traffic.

SUMMARY

In one embodiment, a method includes encoding a key matching rule having at least one dimension by storing in a memory (i) a header of the key matching rule that has at least one header field, and (ii) at least one rule value field of the key matching rule corresponding to one of the dimensions.

In another embodiment, the method may store the header of the key matching rule by at least one of the following.

(a) Storing a length of the key matching rule.

(b) Storing a match type of the key matching rule corresponding to one of the dimensions.

(c) Storing an enable value corresponding to the one of the dimensions. The one of the dimensions is enabled if the enable value has a first value. The one of the dimensions is disabled if the enable value has a second value. Disabling matching of the one dimension masks the one dimension.

(d) Storing a rule validity value corresponding to the key matching rule. The key matching rule is enabled if the rule validity value has a first value. The key matching rule is disabled if the rule validity value has a second value.

(e) Storing a priority value corresponding to the key matching rule. The priority value indicates a priority of the key matching rule compared to a plurality of key matching rules.

In one embodiment, disabling matching of the one of the dimensions can further disable storage of the at least one rule value field of the key corresponding to the one of the dimensions.

In another embodiment, the match type field can include an indication of at least one of a prefix match, an exact match, a mask match, and a range match. The prefix match is configured to match a beginning of a field of a key to the one of the dimensions. The exact match is configured to exactly match a field of a key to the one of the dimensions. The mask match is configured to match bits of a field of a key corresponding to a mask to the one of the dimensions. The range match is configured to match a field of a key to a range of values indicated by the one of the dimensions. The match type can further include the indication of the prefix match. The match type field can further include a length to match the beginning of the field of the key.

In another embodiment, the method includes comprising aligning, by adding padding bits to the at least one header field and to the at least one rule value field in the memory. The added padding bits set the at least one header fields and the at least one rule value field to be a multiple of a particular bit length.

In another embodiment, the method can further include grouping a plurality of key matching rules in a chunk. The method can then further include aligning the plurality of key matching rules within the chunk by padding each of the plurality of key matching rules to be a multiple of a particular bit length.

In another embodiment, aligning the plurality of key matching rules within the chunk includes aligning any particular key matching rule to be less than the particular bit length after a successive particular bit length. Each of the key matching rules may include a corresponding priority. The method may order each of the plurality of key matching rules in the chunk according to the corresponding priority.

In another embodiment, one of the header fields may correspond with the one of the dimensions. The rule value field, according to the one of the header fields, may be configured to be compared against a key or a field of the key. If the one of the header fields indicates a prefix match, the rule value field may include a rule value and a bit length, and the rule value may be compared against the bit length of the key or the field of the key. If the one of the header fields indicates a mask match, the rule value field may include a rule value and a bit mask, and the rule value may be compared against the particular bits of a key or a field of the key indicated by the bit mask. If one of the header fields indicates a range match, the rule value field may include a minimum and a maximum, and a key or a field of the key may be determined to be within or out of a range indicated by the minimum and a maximum. If the one of the header fields indicates an exact match, the rule value field may include a rule value, and a key or a field of the key may be compared against the rule value.

In one embodiment, an apparatus includes a memory and a processor. The processor can be configured to encode a key matching rule having at least one dimension by storing in the memory (i) a header of the key matching rule having at least one header field, and (ii) at least one rule value field of the key matching rule corresponding to one of the dimensions.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 20A is a block diagram of an example embodiment of an exact rule type.

FIG. 20B is a block diagram illustrating an example embodiment of a dimension being either a range rule type or a mask rule type.

FIG. 20C is a block diagram of an example embodiment of a prefix rule type.

FIG. 21A is a block diagram of individual dimensions within key data.

FIG. 21B is a block diagram illustrating an example rule with rule padding.

FIG. 21C is a block diagram of an example rule with a plurality of dimensions.

FIG. 21F is a block diagram illustrating a prefix dimension type.

FIG. 21G is a block diagram of a mask dimension type and range dimension type.

DETAILED DESCRIPTION

A description of example embodiments follows.

The teachings of all patents, published applications and references cited herein are incorporated by reference in their entirety.

Figure 1:
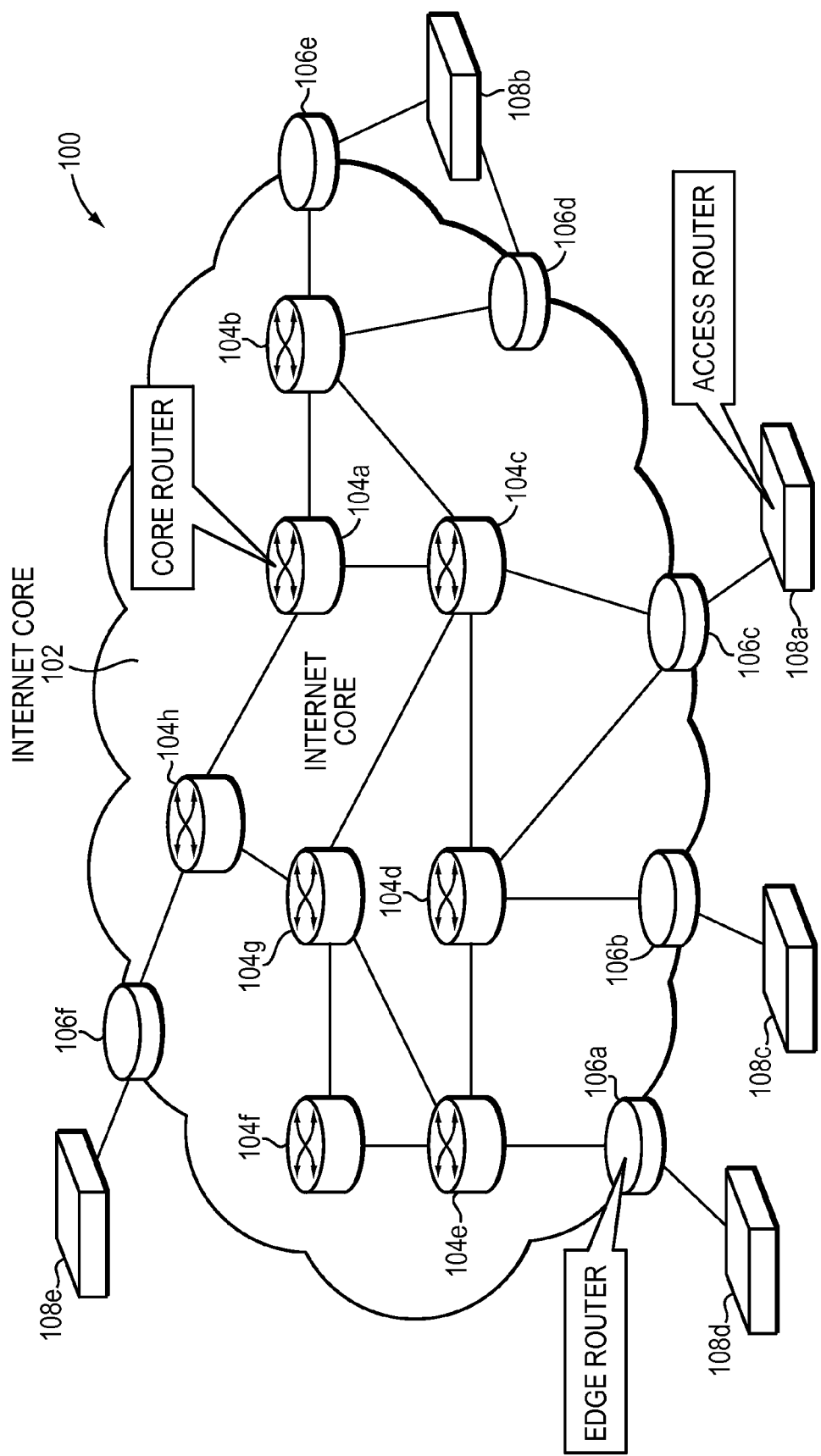
FIG. 1 is a block diagram of a typical network topology including network elements employing example embodiments of a search processor described in this application.

FIG. 1 is a block diagram 100 of a typical network topology including network elements employing example embodiments of a search processor. The network topology includes an Internet core 102 including a plurality of core routers 104a-h. Each of the plurality of core routers 104a-h are connected to at least one other of the plurality of core routers 104a-h. Core routers 104a-h that are on the edge of the Internet core 102 (i.e., core routers 102b-e and 102h) are coupled with at least one edge router 106a-f. Each edge router 106a-f is coupled to at least one access router 108a-e.

The core routers 104a-h are configured to operate in the Internet core 102 or Internet backbone. The core routers 104a-h are configured to support multiple telecommunications interfaces of the Internet core 102 and are further configured to forward packets at a full speed of each of the multiple telecommunications protocols.

The edge routers 106a-f are placed at the edge of the Internet core 102. Edge routers 106a-f bridge access routers 108a-e outside the Internet core 102 and core routers 104a-h in the Internet core 102. Edge routers 106a-f can be configured to employ a bridging protocol to forward packets from access routers 108a-e to core routers 104a-h and vice versa.

The access routers 108a-e can be routers used by an end user, such as a home user or an office, to connect to one of the edge routers 106a-f, which in turn connects to the Internet core 102 by connecting to one of the core routers 104a-h. In this manner, the edge routers 106a-f can connect to any other edge router 106a-f via the edge routers 106a-f and the interconnected core routers 104a-h.

The search processor described herein can reside in any of the core routers 104a-h, edge routers 106a-f, and access routers 108a-e. The search processor described herein, within each of these routers, is configured to analyze Internet protocol (IP) packets based on a set of rules and forward the IP packets along an appropriate network path.

Figure 2A:
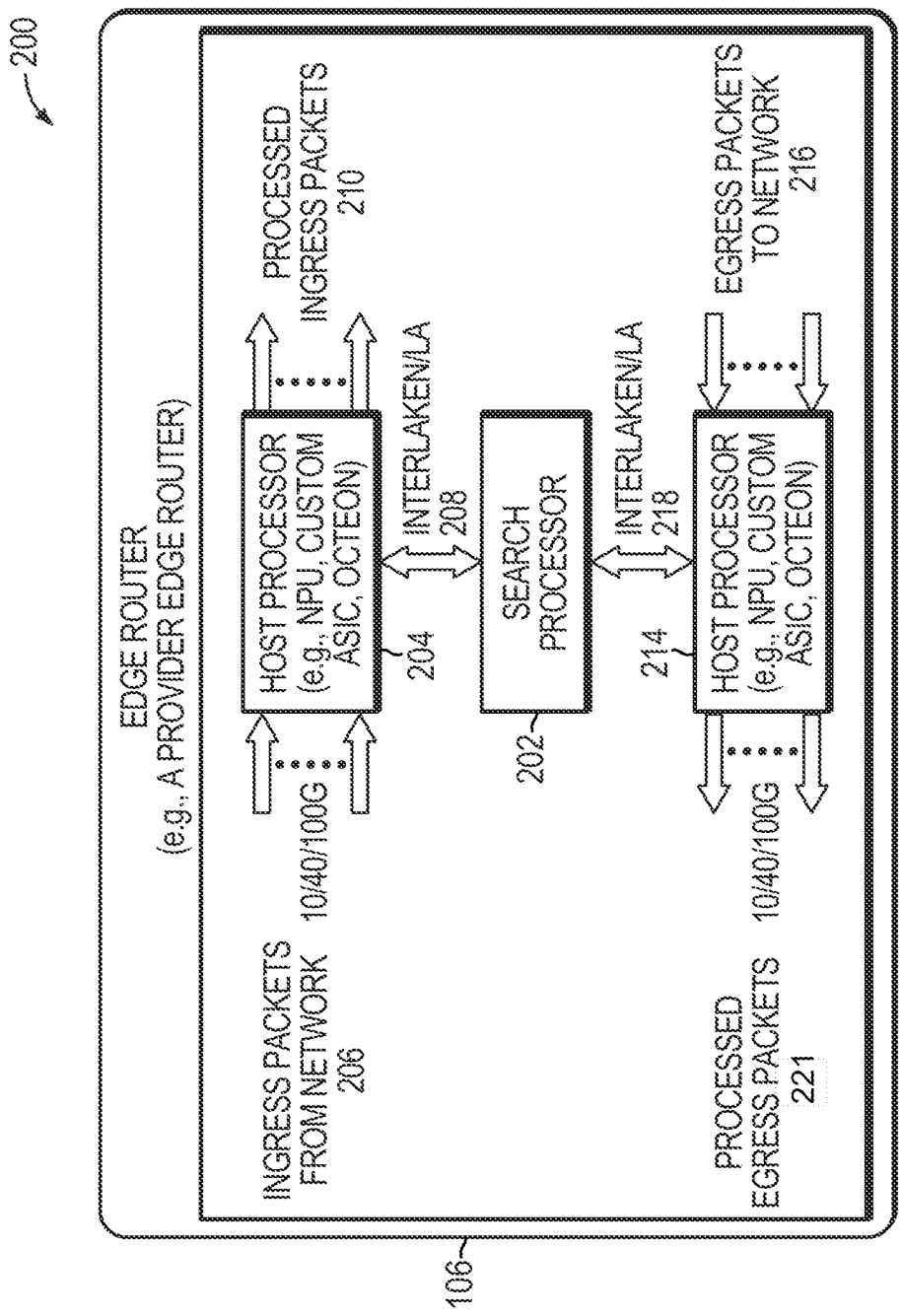
FIGS. 2A-2C are block diagrams illustrating example embodiments of a search processor employed in routers.

FIG. 2A is a block diagram 200 illustrating an example embodiment of a search processor 202 employed in an edge router 106. An edge router 106, such as a provider edge router, includes the search processor 202, a first host processor 204 and a second host processor 214. The first host processor 204 is configured as an ingress host processor. The first host processor 204 receives ingress packets 206 from a network. The first host processor 204 forwards a lookup request including a packet header (or field) from the ingress packets 206 to the search processor 202 using an Interlaken interface 208. The search processor 202 then processes the packet header using a plurality of rule processing engines employing a plurality of rules to determine a path to forward the ingress packets 206 on the network. The search processor 202, after processing the lookup request with the packet header, forwards the path information to the first host processor 204, which forwards the processed ingress packets 210 to another network element in the network.

Likewise, the second host processor 214 is an egress host processor. The second host processor 214 receives egress packets to send from the network 216. The second host processor 214 forwards a lookup request with a packet header (or field) from the egress packets 216 to the search processor 202 over a second Interlaken interface 218. The search processor 202 then processes the packet header using a plurality of rule processing engines employing a plurality of rules to determine a path to forward the packets on the network. The second host processor 214 forwards the processed egress packets 221 to another network element in the network.

Figure 2B:
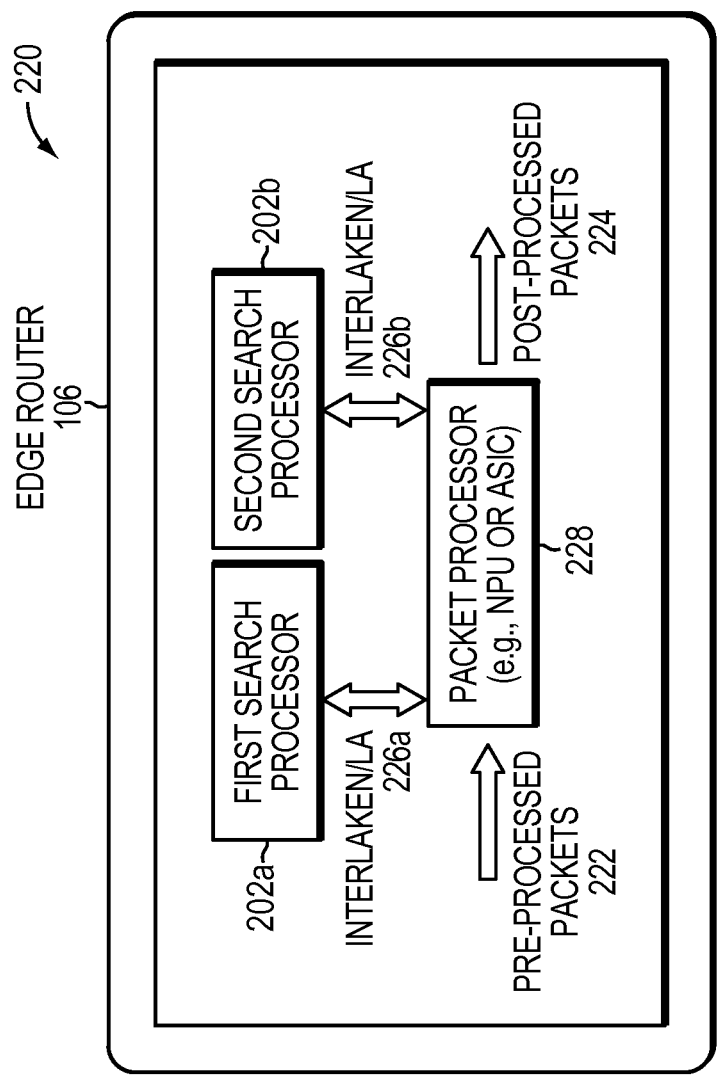

FIG. 2B is a block diagram 220 illustrating another example embodiment of an edge router 106 configured to employ the search processor 202. In this embodiment, the edge router 106 includes a plurality of search processors 202, for example, a first search processor 202a and a second search processor 202b. The plurality of search processors 202a-b are coupled to a packet processor 228 using a plurality of Interlaken interfaces 226a-b, respectively. The plurality of search processors 202a-b can be coupled to the packet processor 228 over a single Interlaken and interface. The edge router 106 receives a lookup request with a packet header (or fields) of pre-processed packets 222 at the packet processor 228. One of the search processors 202a-b searches the packet headers for an appropriate forwarding destination for the pre-processed packets 222 based on a set of rules and data within the packet header, and responds to the lookup request to the packet processor 228. The packet processor 228 then sends the post processed packets 224 to the network based on the lookup request performed by the search processors 202a-b.

Figure 2C:
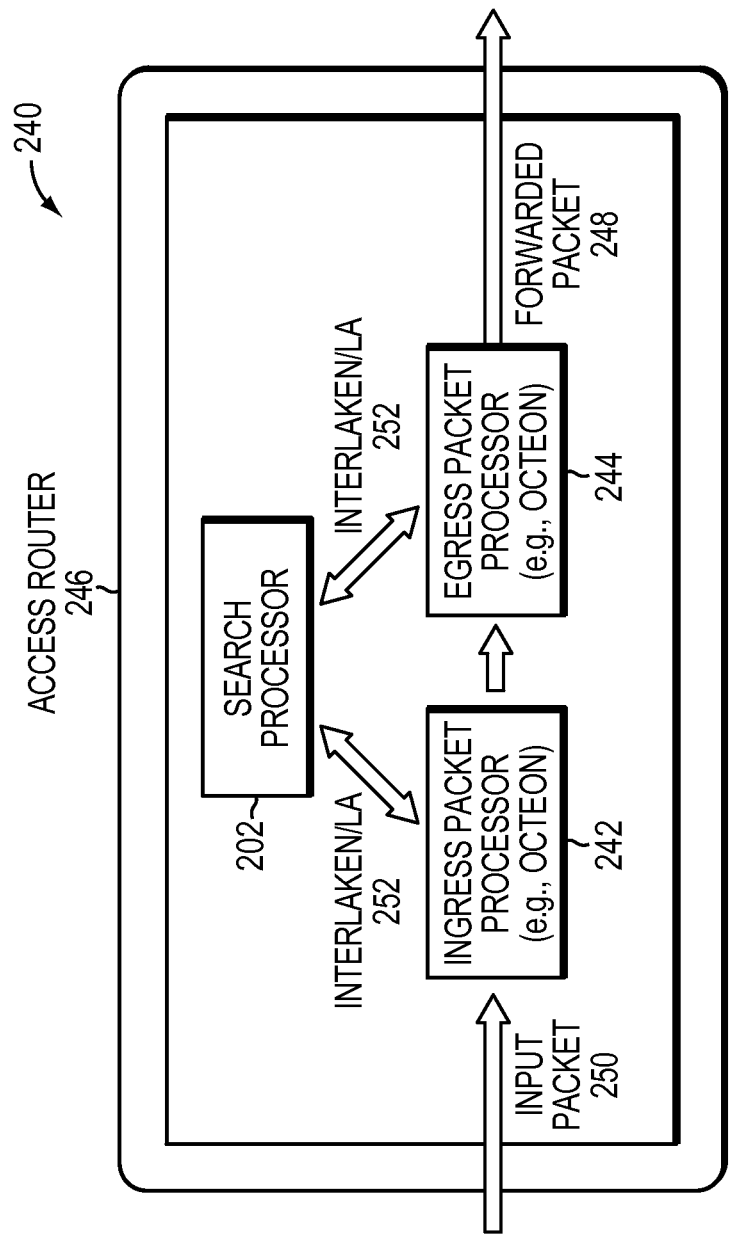

FIG. 2C is a block diagram 240 illustrating an example embodiment of an access router 246 employing the search processor 202. The access router 246 receives an input packet 250 at an ingress packet processor 242. The ingress packet processor 242 then forwards a lookup request with a packet header of the input packet 250 to the search processor 202. The search processor 202 determines, based on packet header of the lookup request, a forwarding path for the input packet 250 and responds to the lookup requests over the Interlaken interface 252 to the egress packet processor 244. The egress packet processor 244 then outputs the forwarded packet 248 to the network.

Figures 3A, 3B:
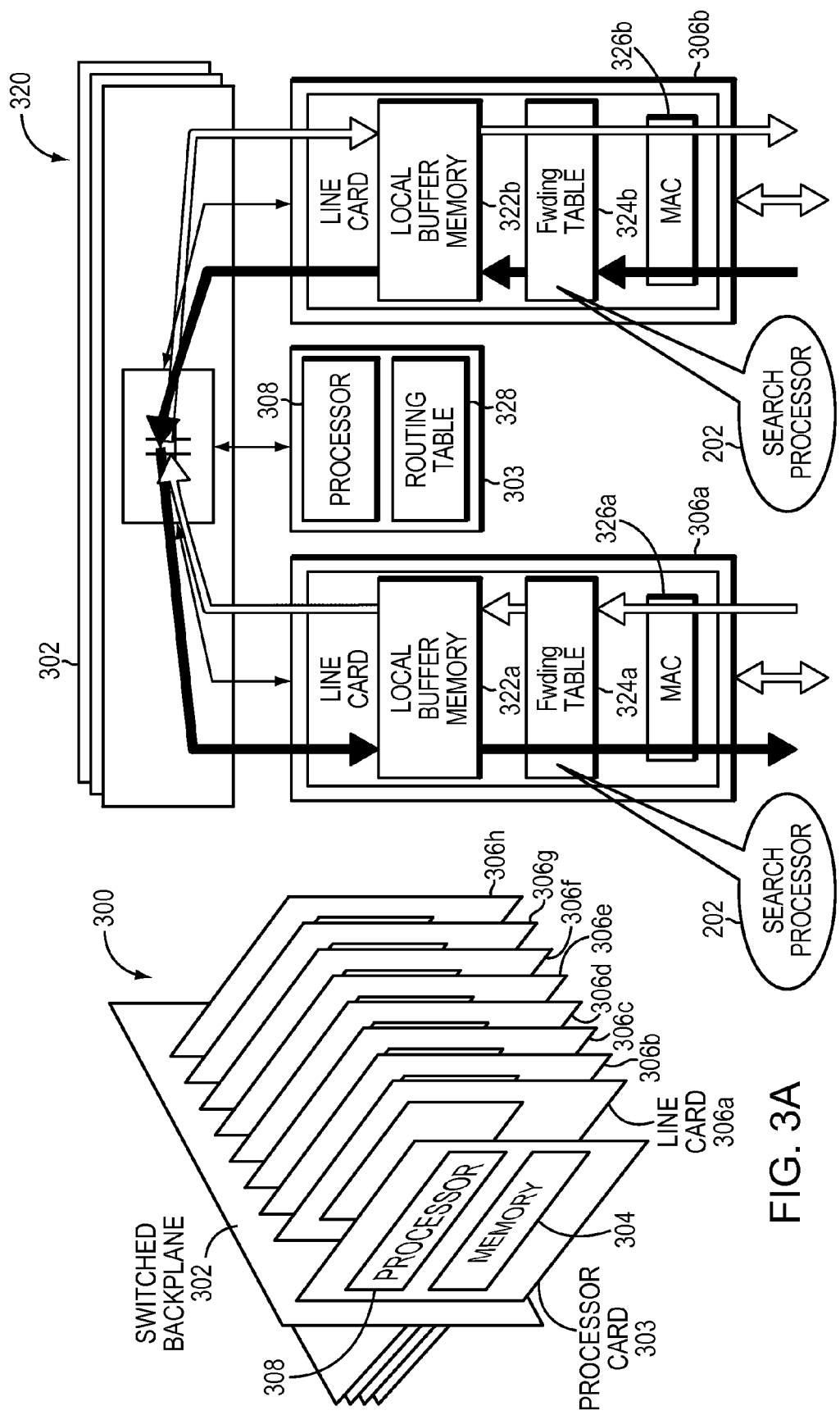
FIG. 3A is a diagram of an example embodiment of a router architecture.
FIG. 3B is a block diagram illustrating an example embodiment of a router employing a search processor.

FIG. 3A is a diagram 300 of an example embodiment of a router architecture. The router architecture includes a switched backplane 302 coupled with a processor card 303 that includes a processor 308 and a memory 304. The switched backplane 302 is further coupled with a plurality of line cards 306a-h. Each line card 306a-h includes a search processor as described herein.

FIG. 3B is a block diagram 320 illustrating an example embodiment of a router employing the search processor 202. The router includes the switched backplane 302 which is coupled to the line cards 306a-b and the processor card 303. The processor card 303 includes a processor 308 and a routing table 328, which can be stored in the memory 304 of the processor card 303. Each line card 306a-b includes a respective local buffer memory 322a-b, a forwarding table 324a-b, and a media access control (MAC) layer 326a-b. The search processor 202 exists within the forwarding table 324a-b of the line card 306a-b.

As an example, a packet is received by the line card 304a at the MAC layer 326a. The MAC layer 326a sends the packet to the forwarding table 324a. Then, the packet and appropriate forwarding table information is stored in the local buffer memory 322a. The processor card 303 then accesses its routing table 328 to determine where to forward the received packet. Based on the determination, the router selects an appropriate line card 304b, stores the packet and forwarding information in the local buffer memory 322b of the appropriate line card, and forwards the packet out to the network.

Figures 3C, 3D:
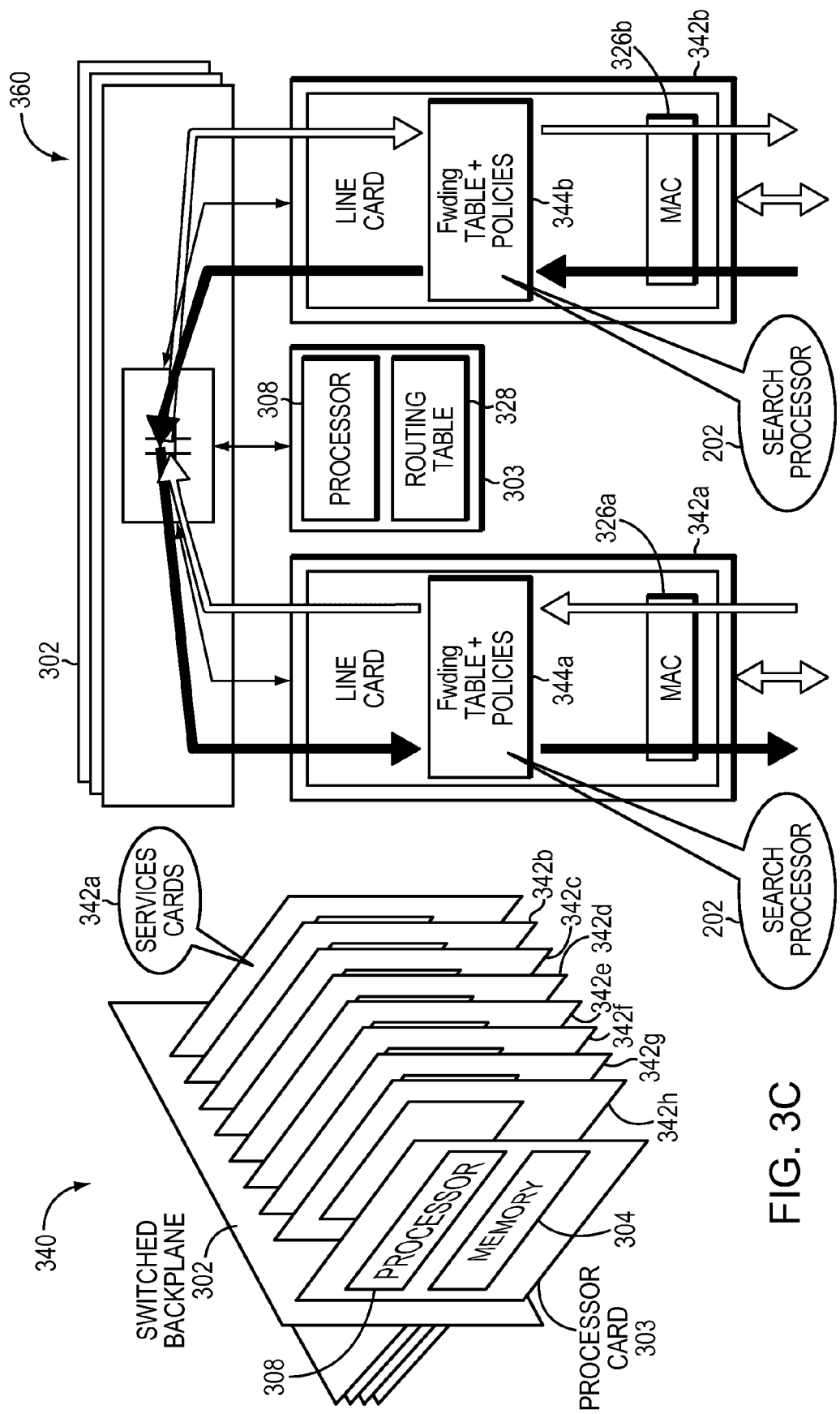
FIG. 3C is a block diagram of another embodiment of a router including a switched backplane.
FIG. 3D is a block diagram illustrating an example embodiment of a router employing a search processor.

FIG. 3C is a block diagram 340 of another embodiment of a router including the switched backplane 302. The switched backplane 302 is coupled to the processor card 303, the line cards 342b-h, and a service card 342a. The processor card 303 includes the memory 304 and the processor 308. The service card 342a is a type of line card 342a-h. Further, the search processor described herein can also exist on the service card 342a.

FIG. 3D is a block diagram 360 illustrating an example embodiment of a router employing the switched backplane 302. The switched backplane 302 is coupled with the processor card 303 and the service card 342a or line cards 342b-h. The line cards 342a-b can either be a service card 342a or line card 342b-h. The line card 342a-b includes a forwarding table and corresponding policies module 344*a-b*, and a MAC layer 326*a-b*. The search processor 202 is included in the line card 342*a-b*. The line card 342*a* receives a packet from a network through the MAC layer 346*a* at the forwarding table and policies module 344*a*. The search processor 202 processes the packet according to the forwarding table and policies module 344*a* according to the routing table 328 in the processor card 303 and forwards the packet to an appropriate line card 342*b* to be forwarded into the network.

Figure 4A:
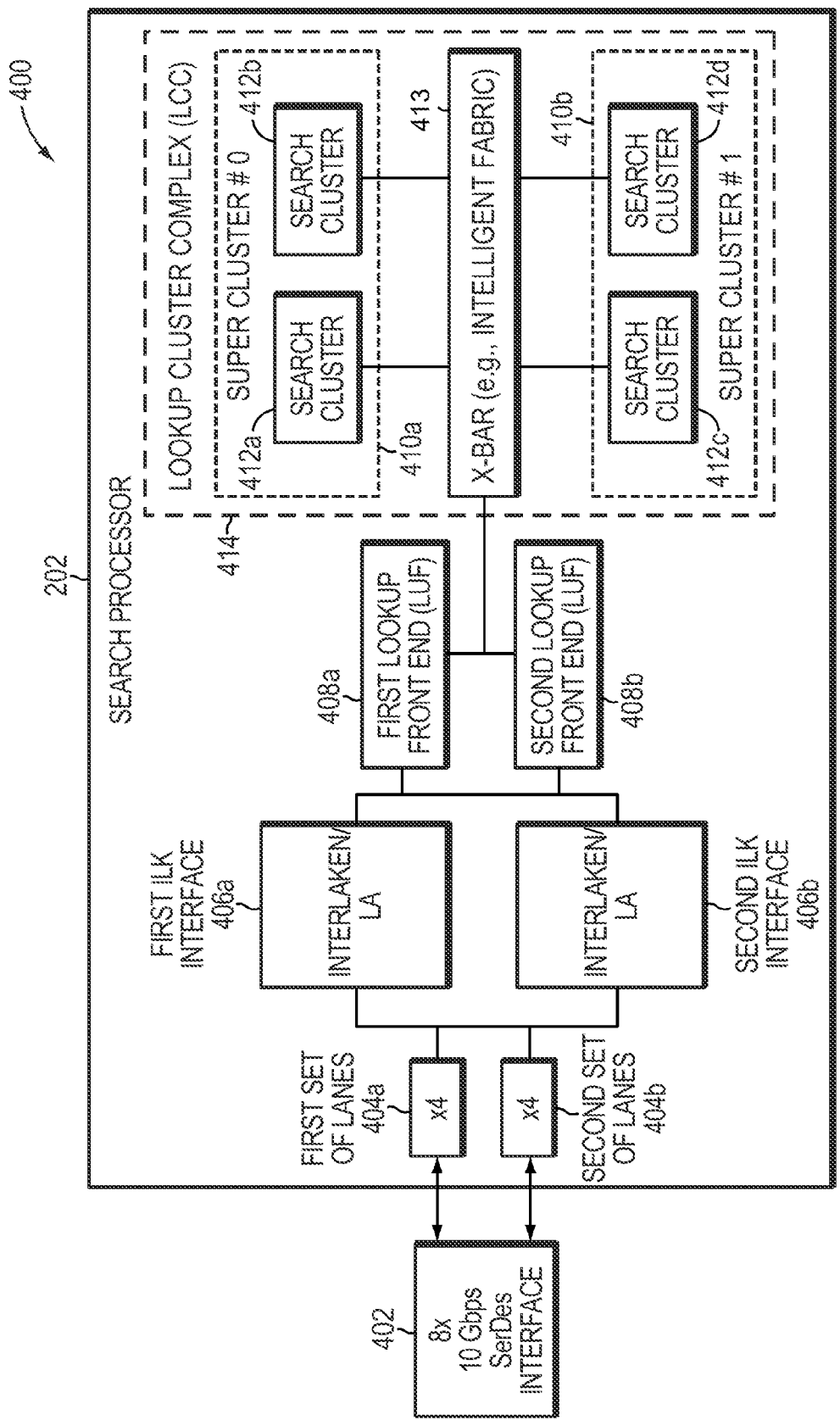
FIGS. 4A-B are block diagrams of example embodiments of a search processor.

FIG. 4A is a block diagram 400 of an example embodiment of the search processor 202. The search processor 202 is coupled with a serializer/deserializer (SerDes) interface 402. In one embodiment, the SerDes interface 402 includes eight transport lanes capable of data transfer speeds of up to at least 10 Gb per second. The search processor 202 includes two sets of quad lane interfaces 404*a-b* coupled with the SerDes interface 402. Each of the quad lanes interfaces 404*a-b* are coupled with a first Interlaken interface 406*a* and a second Interlaken interface 406*b*. The Interlaken interfaces 406*a-b* are then coupled with a first lookup front end (LUF) 408*a* and a second look up front end (LUF) 408*b*. The LUFs 408*a-b* are coupled with a crossbar 413 (also described as an intelligent fabric or 'X-bar').

The crossbar 413 is coupled with a first supercluster 410*a* and a second supercluster 410*b*. Within each supercluster 410*a-b* are a plurality of search blocks 412*a-d*. Each search block 412*a-d*, or search cluster, is configured to receive a key from a received packet, determine and load a set of rules to process the key, and output results of the search executed using those rules. The crossbar 413 and the superclusters 410*a-b* are part of a lookup cluster complex (LCC) 414.

Figure 4B:
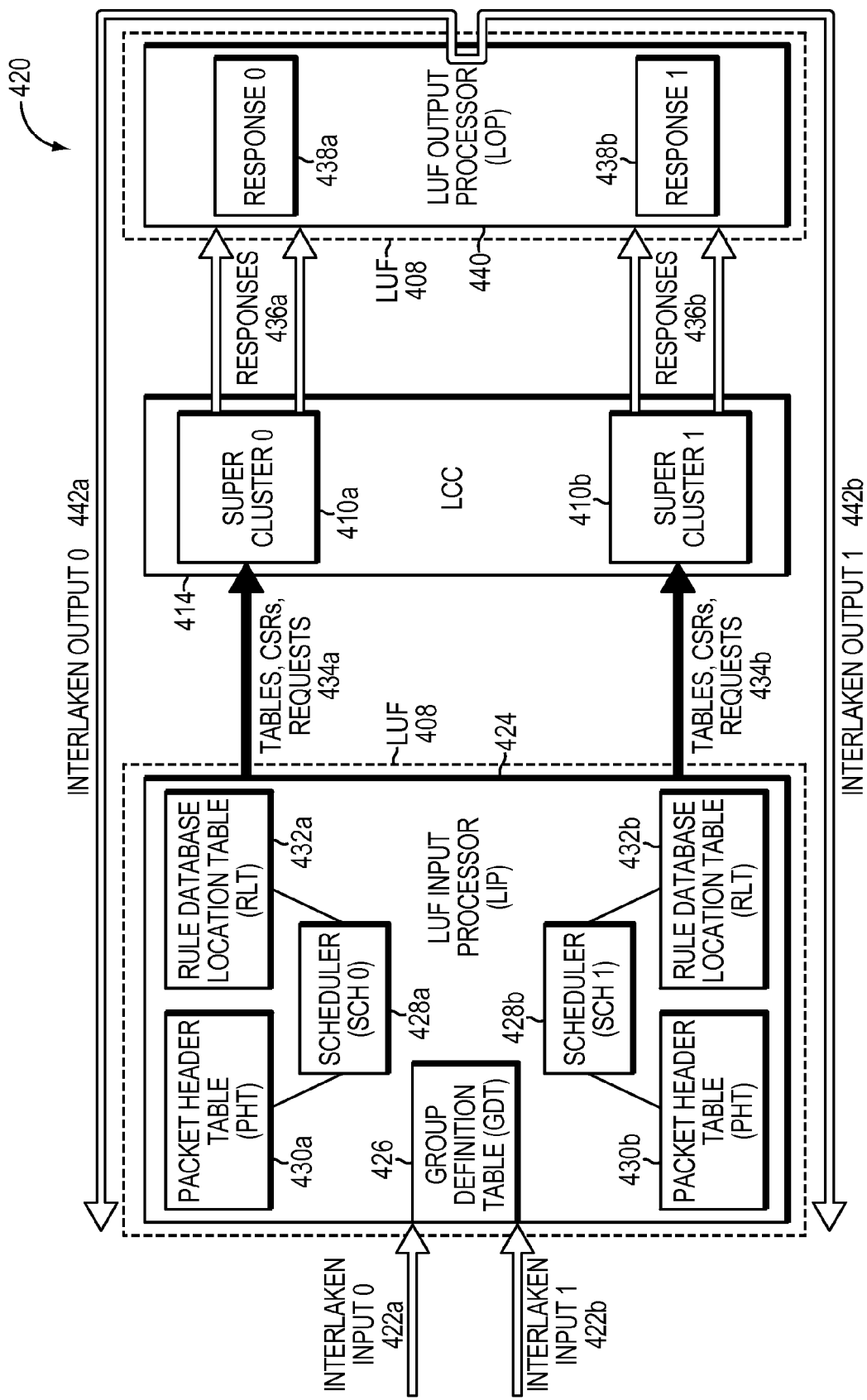

FIG. 4B is a block diagram 420 of an example embodiment of the search processor described herein. The search processor includes the LUF 408 as shown as being a LUF input processor (LIP) 424 and a LUF output processor (LOP) 440. The processor further includes the LCC 414, which includes superclusters 410*a-b*. The LIP 424 receives an Interlaken input 422*a* and Interlaken input 422*b*. The LIP 424 includes a scheduler 428*a-b*, packet header tables 430*a-b*, rule database location table 432*a-b* and a group definition table 426. The LIP 424 generates tables, CSRs, and requests 434*a-b* to the LCC 414. The LCC 414, based on the superclusters 410*a-b* and the search clusters (not shown) therein, generate responses 436*a-b*. The LOP 440 then receives the responses and outputs them over Interlaken output 442*a* and Interlaken output 442*b*.

The processor described herein loads one or more rules (e.g., matching rules) that match a packet. In general, a packet may be broken down into parts, such as a header, a payload, and a trailer. The header of the packet (or packet header) may be further broken down into fields, for example. So, the processor may further find one or more rules that match one or more parts (or fields) of the packet.

The processor can execute a "lookup request," which finds one or more rules matching a packet or parts of a packet. The lookup request first leads to finding one or more matching rules.

From the standpoint of the processor described herein, executing a lookup request begins with 1) receiving the lookup request from a host processor. The lookup request includes a packet header and group identifier (GID).

2) The GID indexes to an entry in a global definition/description table (GDT). Each GDT entry includes (a) n number of table identifiers (TID), (b) a packet header index (PHIDX), and (c) key format table index (KFTIDX).

3) Each TID indexes an entry in a tree location table (TLT). Each TLT entry identifies which lookup engine or processor core looks for the one or more matching rules. In this way, each TID specifies both which lookup engine or processor core looks for the one or more matching rules and where the particular one or more matching rules are stored.

4) Each TID also indexes an entry in a tree access table (TAT). Each TAT entry provides the starting address (e.g., a root node) in memory of a collection of rules (or pointers to rules) called a table or tree of rules. The terms table of rules, tree of rules, table, or tree are used interchangeably throughout the application. In all, the TID identifies the TAT, which identifies the collection or set of rules in which to look for one or more matching rules.

5) The PHIDX of the GDT entry indexes an entry in a packet header table (PHT). Each entry in the PHT instructs the processor how to extract n number of keys from the packet header.

6) The KFTIDX of the GDT entry indexes an entry in a key format table (KFT). Each entry in the KFT provides instructions for extracting one or more fields (i.e., parts of the packet header) from each of the n number of keys extracted from the packet header.

7) The processor looks for subsets of the rules using each of the fields extracted from the packet together with each of the TIDs. Each subset contains rules that may possibly match each of the extracted fields.

8) The processor then compares each rule of each subset against an extracted field. The processor provides rules that mach in responses or lookup responses.

The above description of a lookup request and its enumerated stages are described to present concepts of lookup requests. These concepts may be implemented in numerous ways. For example, according to example embodiments of the present invention, these concepts may be implemented by a search processor.

As described above, the search processor processes a lookup request for a packet. In processing the lookup request, the processor can extract a header or field from the packet that is then applied to one or more rules. The header of field can be referred to as a key.

The search processor stores at least one tree of rules. In one embodiment, the tree of rules is a memory structure employed by the processor to narrow down a set of rules for a given key and a rule is a test of a value of a key. The tree has a root node, or a starting address. The search processor uses a tree walk engine (TWE) to traverse the tree for a particular key. The TWE eventually reaches a pointer to a memory address in the tree. The pointer can be either to a bucket of rules or a pointer to rules in memory directly.

A bucket of rules is a set of pointers to rules. If the pointer is to a bucket of rules, a bucket walk engine (BWE) determines, based on the key and the bucket, a pointer to rules in a memory, such as an on chip memory. A group of rules in memory is called a chunk. The chunk can be sequentially addressed rules or rules grouped in another manner. If the pointer is to rules in the memory directly, the pointer may point directly to the chunk.

Once the processor loads the chunk of rules from memory, it sends the key and the chunk of rules to a rule match engine (RME). The rule match engine determines whether the key matches rules within the chunk. Then, the RME and the search processor can respond to the lookup request with the selected rule and match result.

Figure 5:
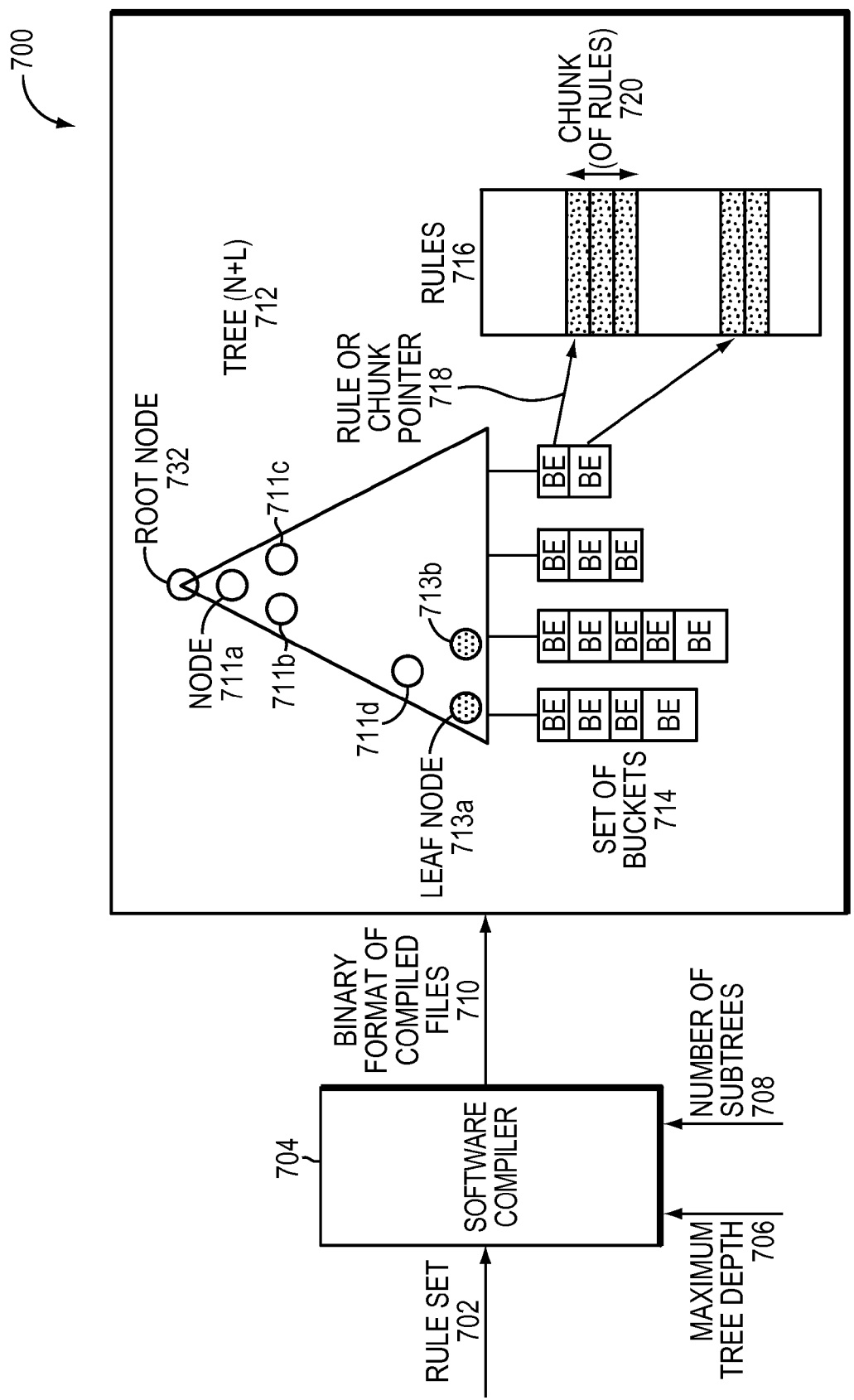
FIG. 5 is a block diagram illustrating an example embodiment of a compiler loading rules into a memory structure.

FIG. 5 is a block diagram 700 illustrating an example embodiment of a compiler loading rules into a memory structure. A software compiler 704 receives a rule set 702.

The software compiler 704 generates a binary format of compiled rules 710. The binary format of compiled rules 710 includes a tree 712, buckets 714 and rules 716. The tree 712 includes nodes 711*a-d*, leaf nodes 713*a-b*, and a root node 732. Each leaf node 713*a-b* of the tree 712 points to one of a set of buckets 714. Within each bucket are bucket entries which contain rule or chunk pointers 718. The rules 716 include chunks of rules 720. A chunk 720 (of rules) can be a sequential group of rules, or a group of rules scattered throughout the memory, either organized by a plurality of pointers or by recollecting the scattered chunk 720 (e.g., using a hash function).

Figure 6:
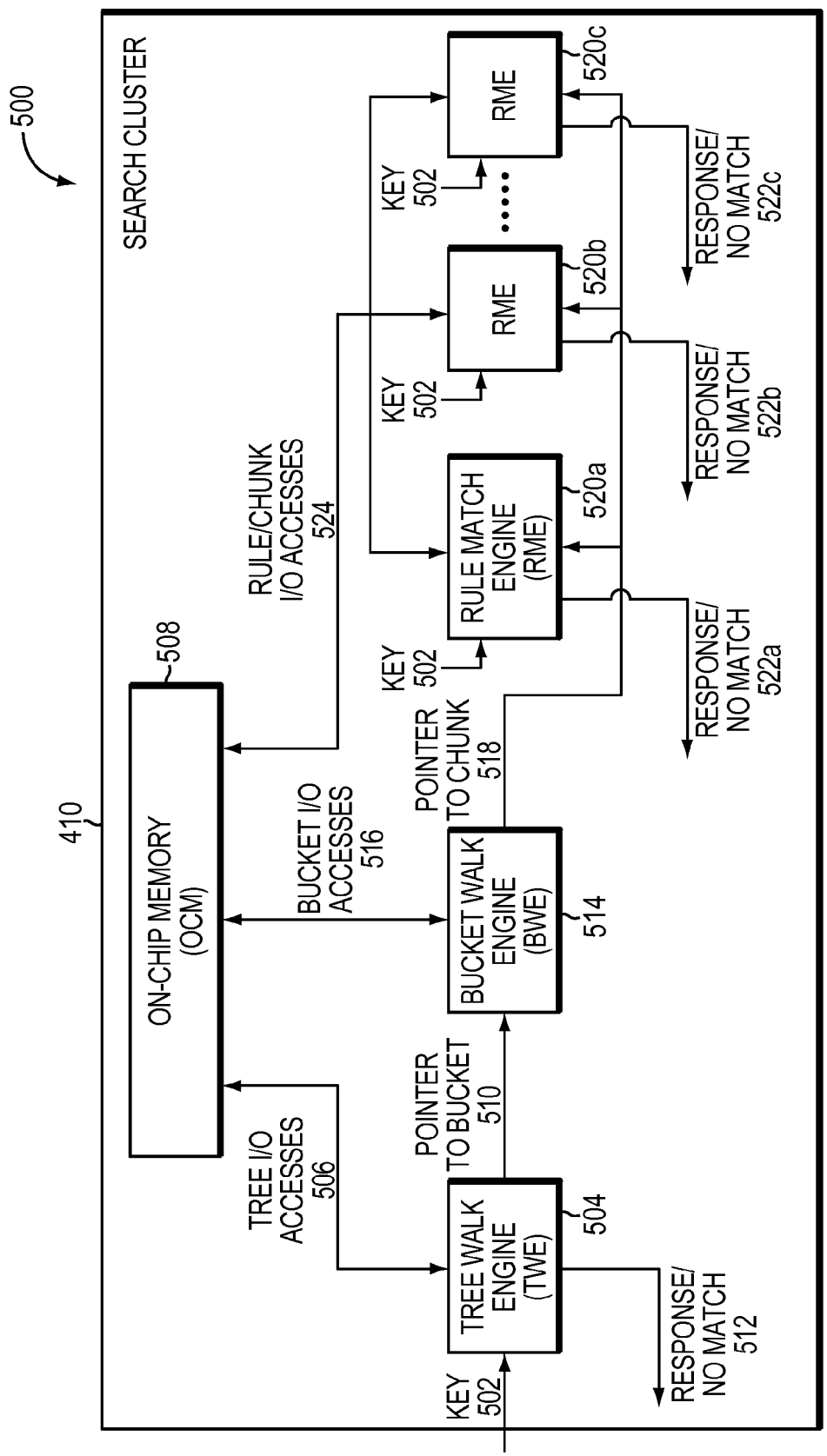
FIG. 6 is a block diagram illustrating an example embodiment of a search block or search cluster.

FIG. 6 is a block diagram 500 illustrating an example embodiment of a search block or search cluster 410. The search cluster 410 includes an on-chip memory (OCM) 508, a tree walk engine (TWE) 504, a bucket walk engine (BWE) 514 and a plurality of rule match engines (RME) 520*a-c*. The OCM 508 stores a tree data structure, a bucket storage data structure, and a chunk and/or rule data structure.

The search cluster 410 receives a key 502 from the LUF 408 (FIG. 4A) at the TWE 504. The TWE 504 issues and receives a plurality of tree input/output (I/O) accesses 506 to the OCM 508. Based on the key 502, the TWE 504 walks the tree from a root node to a possible leaf node. If the TWE 504 does not find an appropriate leaf node, the TWE 504 issues a nomatch 512 (e.g., a no match). Then, if the TWE 504 finds an appropriate leaf node, the leaf node can indicate a pointer 510 to a bucket. The TWE 504 provides the pointer 510 to the bucket to the BWE 514. The BWE 514 accesses the OCM 508 by issuing bucket I/O accesses 516 to the OCM 508. The bucket I/O accesses 516 retrieve at least one pointer 518 to a chunk to the BWE 514. The BWE 514 provides the pointer 518 to the chunk to one of the plurality of RMEs 520*a-c*. The one of the chosen RMEs 520*a-c* also receives the key 502. Each of the plurality of RMEs 520*a-c* are configured to issue rule and/or chunk I/O accesses 524 to the OCM 508 using the pointer 518 to the chunk to download appropriate rules from the chunk in the OCM to analyze the key 502. The RMEs 520*a-c* then analyze the key using the rules accessed from the OCM 508 and issue a response or nomatch 522*a-c* corresponding to whether the key matched the rule or chunk indicated by the tree and bucket stored in the OCM 508.

Figure 7A:
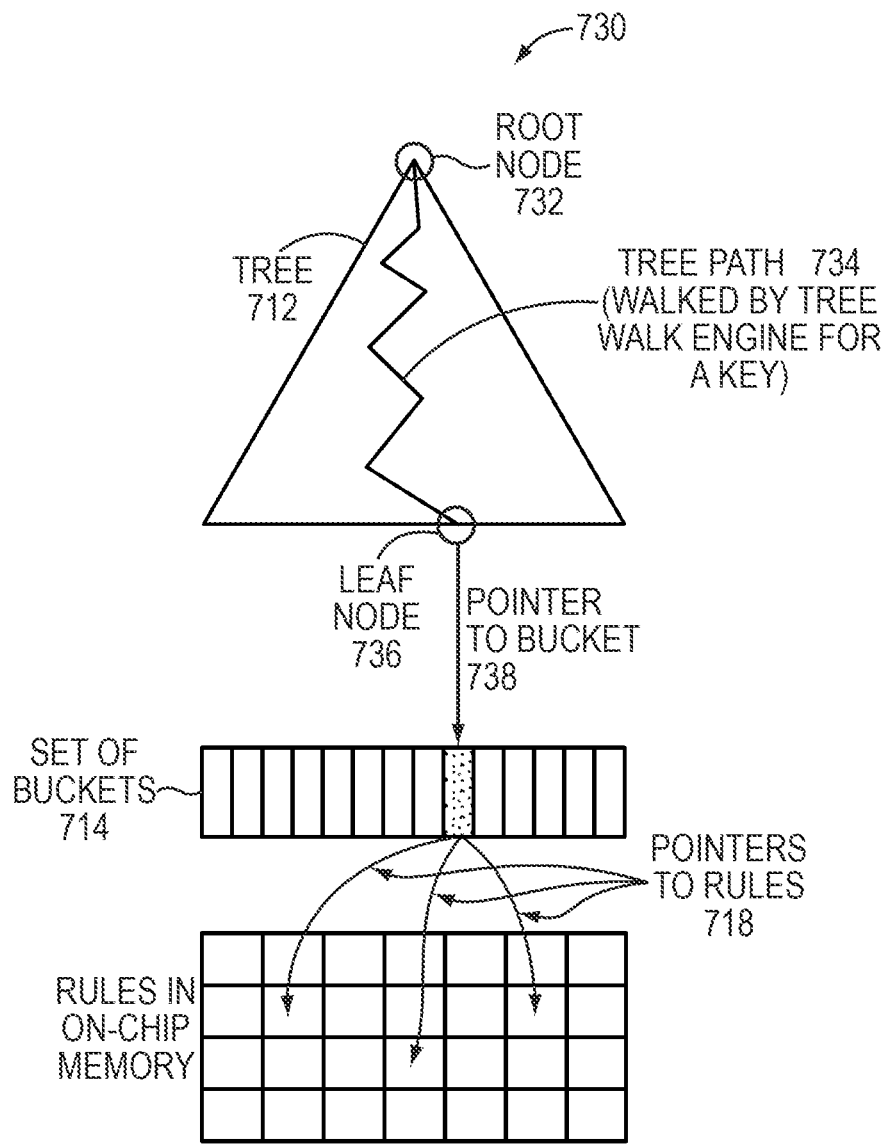
FIG. 7A is a block diagram illustrating an example embodiment of a memory structure used to load rules for a given key in a packet.

FIG. 7A is a block diagram 730 illustrating an example embodiment of a memory structure used to load rules for a given key in a packet. The TWE begins walking the tree 712 for a particular key, starting at its root node 732 and walking along a tree path 734. The TWE walks the tree path 734 through the tree 712 for each key it receives. Eventually, the tree path 734 reaches a leaf node 736 which either contains null or nomatch, in which case the TWE returns a nomatch, or contains a pointer to a bucket 738. In this case, the TWE sends the pointer to the bucket 738 to a BWE, which loads the particular bucket out of the set of buckets 714. The particular bucket can contain at least one pointer 718 to rules or chunks of rules. The BWE loads rules based on the pointer 718 to the rule from the OCM to one of the RMEs in the search cluster.

Figure 7B:
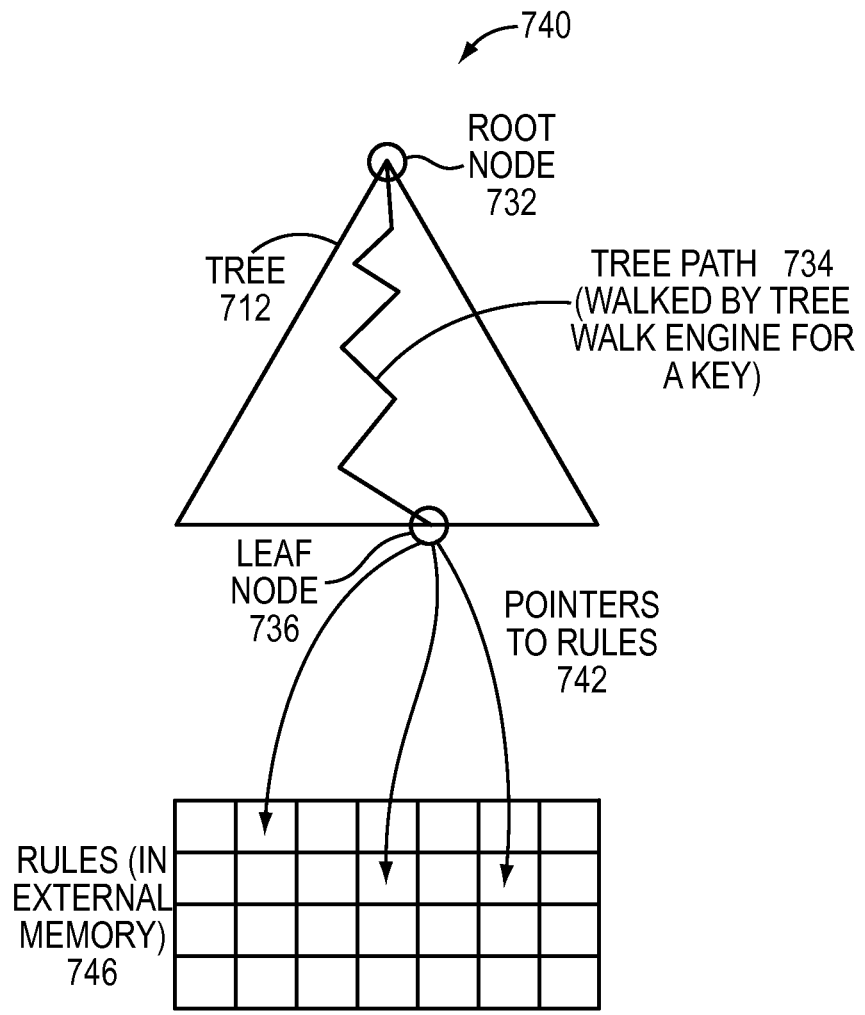
FIG. 7B is a diagram illustrating an example embodiment of a memory structure employed by a TWE that receives a key and loads a set of rules from the memory structure, where the rules are stored in an external memory.

FIG. 7B is a diagram 740 illustrating an example embodiment of a memory structure employed by a TWE that receives a key and loads a set of rules from the memory structure, where the rules are stored in an external memory, as opposed to an on-chip memory. Again, the TWE receives the key and walks the tree 712 along the tree path 734 from the root node 732 until it reaches a leaf node 736, either storing a null value, in which case the TWE returns a nomatch, or storing pointers 742 to rules. In the external memory embodiment, the leaf node 736 points directly to the rules and/or chunks 746 in the external memory. When rules are stored in the OCM, the leaf node 736 may point to buckets, and the buckets then point to the rules and/or chunks. However, when the rules are stored in the external memory, the TWE loads the rules based on the pointer 742 to rules from the external memory and sends the rules 746 to the Bucket Post Processor (BPP). The BPP is employed to process rules from the external memory 746. The same tree structure can point to either buckets or rules in the external memory. For example, each leaf node 736 can point to an address in memory (or null). The system can determine whether the address points to the rule in the external memory or the bucket in the OCM. Based on the determination, the system accesses the appropriate memory, and the same tree can be used for both the external memory and the OCM simultaneously in one embodiment. However, the search processor can be configured to employ only the external memory embodiment or only the OCM embodiment separately.

Figure 8A:
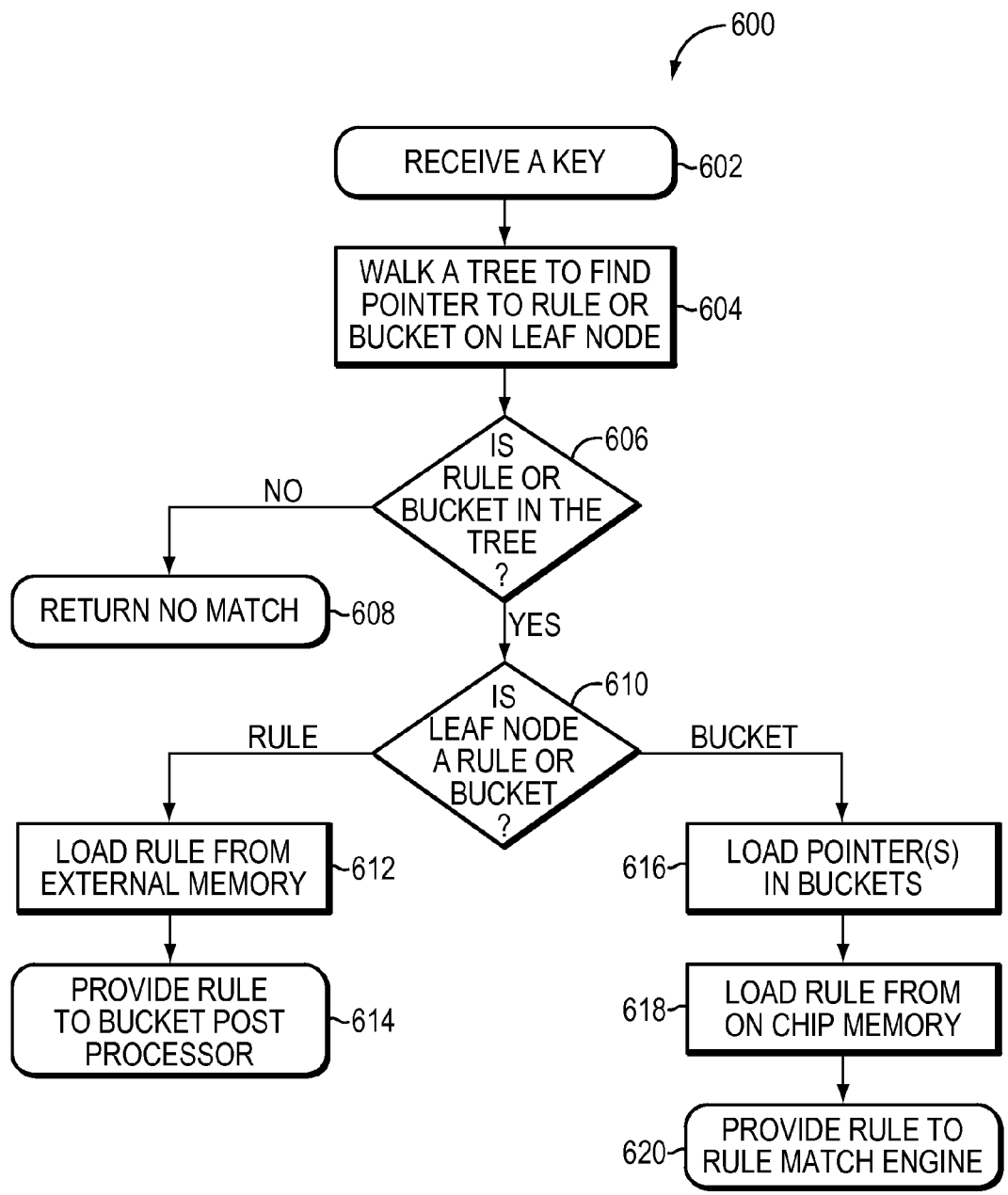
FIG. 8A is a flow diagram illustrating an example process employed by the search processor.

FIG. 8A is a flow diagram 600 illustrating an example process employed by the search processor. First, the search processor receives a key from the header area of a received packet (602). The search processor, using a TWE, then walks a tree data structure to find a pointer to a rule or a bucket on a leaf node of the tree (604). The leaf node can be nonexistent or null, which automatically causes a nomatch for the received key.

The search cluster of the search processor then determines whether the rule or bucket is in the tree (606) by searching for a non-null leaf node. If not, for instance, if the leaf node is nonexistent or null, the search cluster returns a nomatch (608). If the leaf node stores a rule or bucket, then the search cluster determines whether the leaf node points to a rule or points to a bucket (610). If the leaf node points directly to the rule, then search cluster loads the rule from an external memory (612). Then the system provides the rule to the BPP (614). The system provides the rule to the BPP by either (i) the BPP pulling the rule from the external memory using the pointer from the leaf node or (ii) a navigation unit within the search cluster sending a command to the external memory to forward the requested memory addresses to the BPP.

The BPP is a processor similar to the RME that is configured to process a chunk of rules and compare the rules to keys, however, the BPP is further configured to process rules from the external memory. Loading rules from an external memory (610, 612, 614) is an optional embodiment of the search processor and corresponding search clusters. The search processor can store all of the rules and/or chunks of rules on an OCM. Therefore, the tree data structure may store pointers to buckets instead of pointers to rules directly. Even in an embodiment where rules and/or chunks of rules are stored solely on the OCM, the leaf nodes can point directly to the rules and/or chunks of rules in the OCM without the use of buckets.

If the leaf node points to a bucket (610), then the search processor loads pointers stored in the bucket (616). Then, the search processor loads the rules that are stored in the OCM where the pointers from the bucket are pointing (618). Then, the system provides the rule(s) to RMEs (620).

Figure 8B:
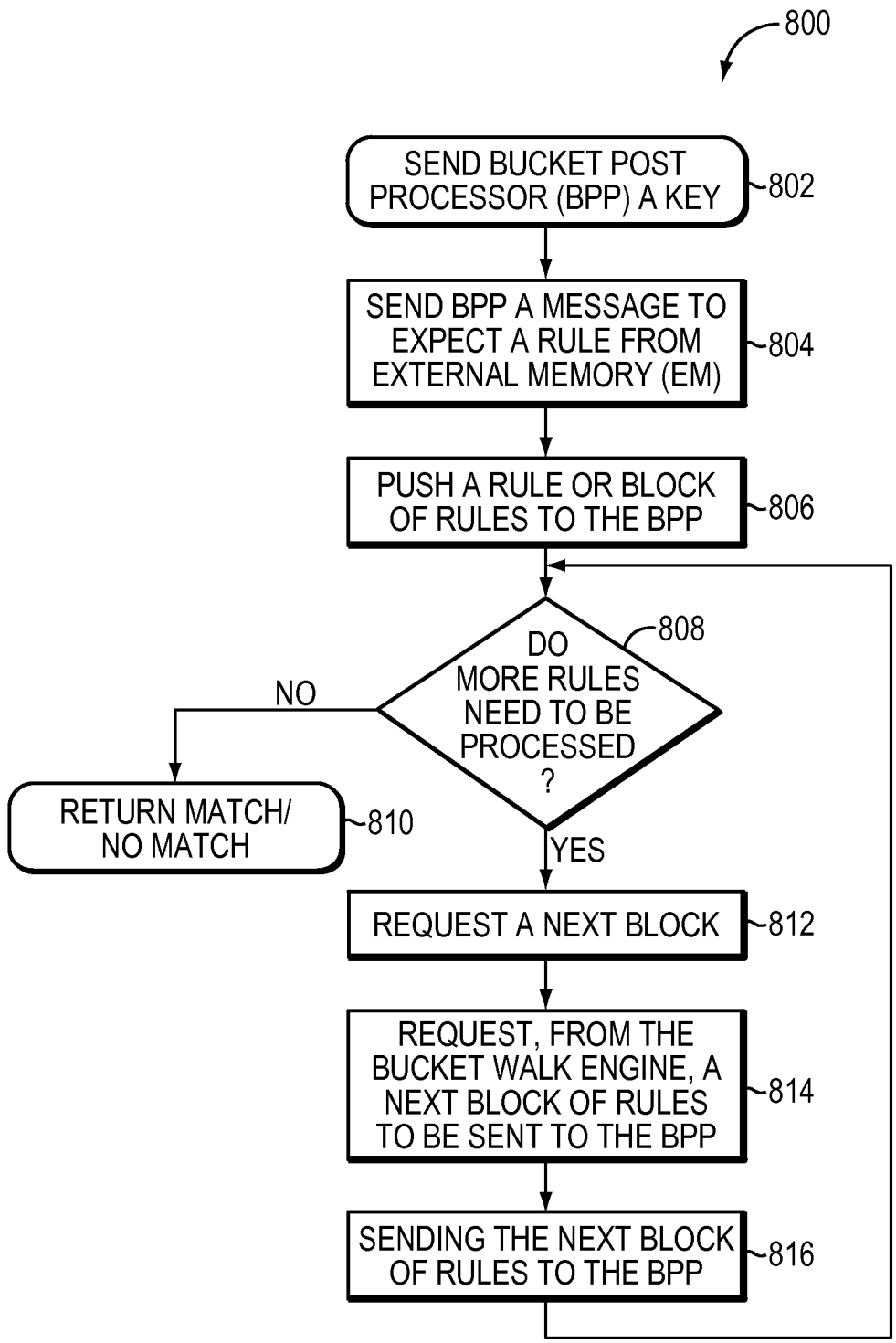
FIG. 8B is a flow diagram illustrating an example process of performing a search on a key using a set of rules by the BPP.

FIG. 8B is a flow diagram 800 illustrating an example process of performing a search on a key using a set of rules by the BPP. First, a packet processing engine sends a BPP a key (802). The BWE sends the BPP a message to expect to receive a rule from external memory (EM). Then the BWE pushes a rule or a block of rules to the BPP (806). Then, the BPP determines whether more rules need to be processed (808). If no additional rules need to be processed, the BPP returns a match or nomatch of the processed rules (810). If additional rules need to be processed, for instance, if only part of a chunk is processed, the BPP requests a next block of rules (812). Then, the BWE requests a next block of rules to be sent to the BPP (814). Then, the BWE sends the next block of rules to the BPP (816). The BPP determines, again, whether more rules need to be processed (808). If not, the BPP returns a match or nomatch (810). However, if more rules do need to be processed, then the BPP requests a next block of rules (812).

Figure 9:
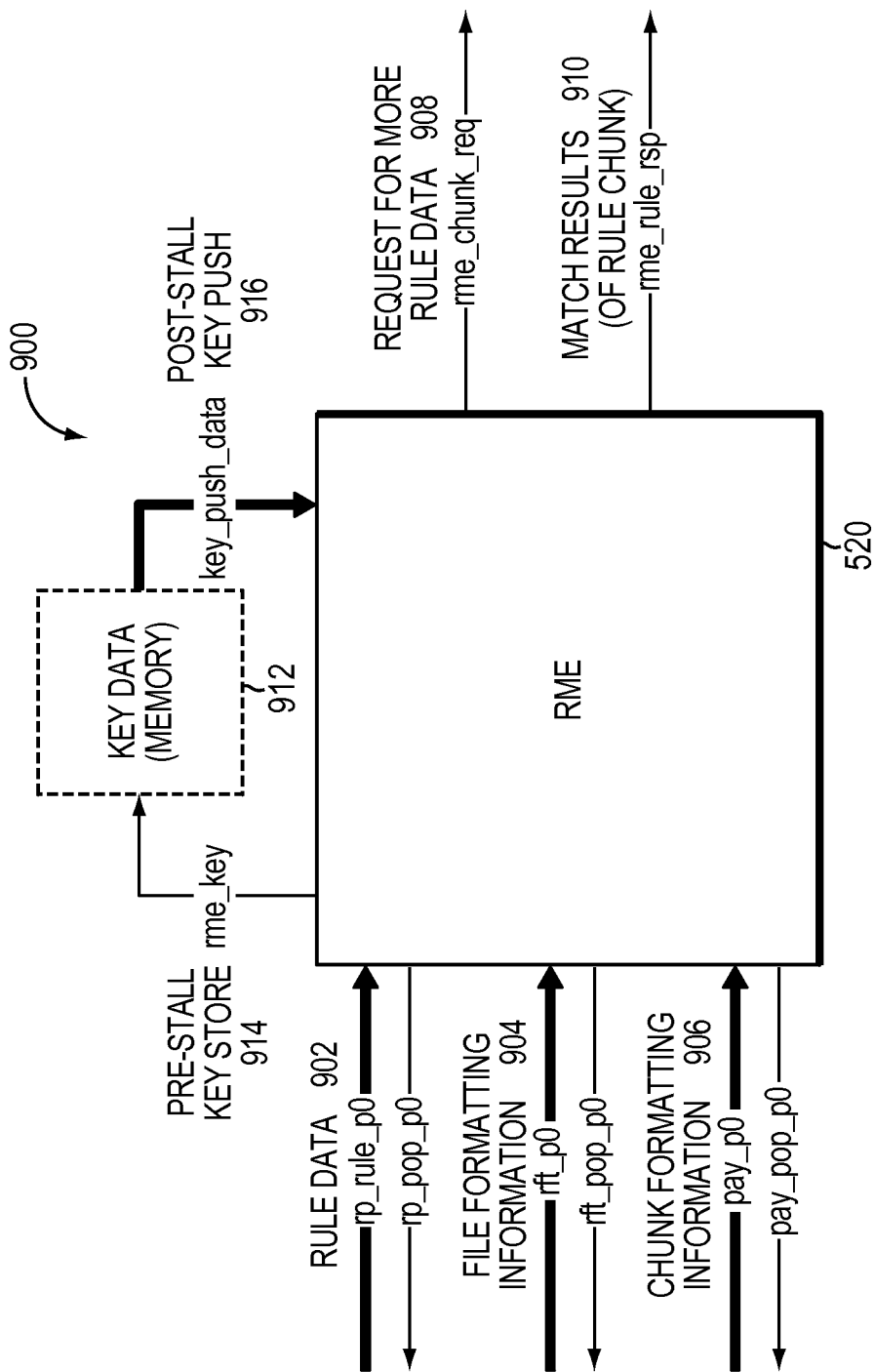
FIGS. 9-11 are block diagrams illustrating example embodiments of a rule match engine.

FIG. 9 is a block diagram 900 illustrating an example embodiment of the RME 520. The RME 520 receives rule data 902, rule formatting information 904, and chunk formatting information 906. Further, in the case where the RME 520 stalls, for example when the RME 520 needs to wait at least one clock cycle (or 'beat') to finish processing a rule or key, the RME 520 sends a prestall key store under 914 to a key data memory 912. After the stall completes, the RME 520 receives a post stall key push 916 to the RME 520. After processing, the RME 520 outputs a request for more rule data 908, if necessary. However, when the RME 520 has finished processing the rule chunk, the RME 520 outputs match results 910 of the rule chunk.

Figure 10:
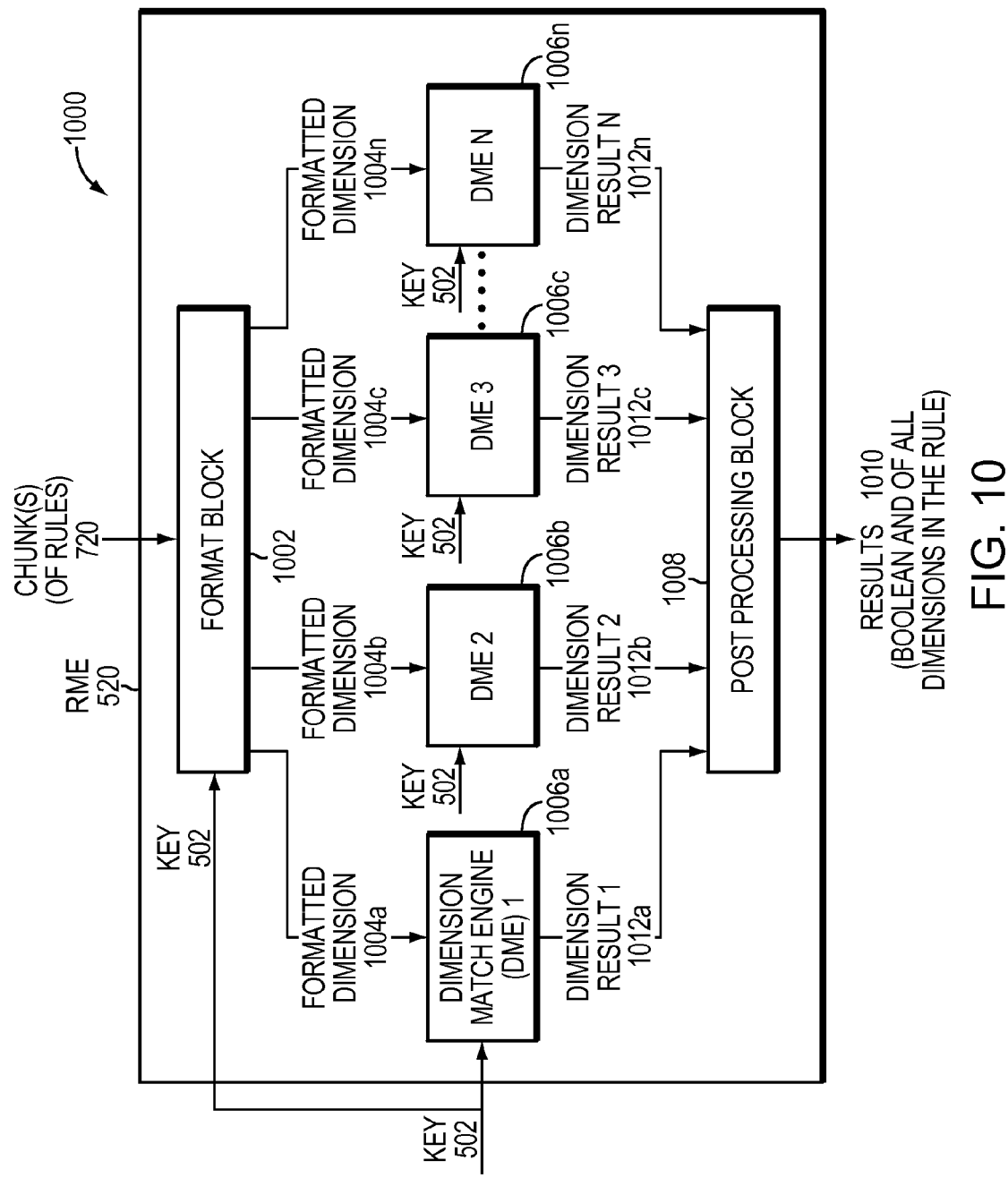

FIG. 10 is a block diagram 1000 illustrating an example embodiment of the RME 520. The RME 520 receives the key 502 and the chunks of rules 720. The RME 520 can be logically divided into three blocks. First, the RME 520 includes a formatting block 1002 configured to format rules for processing. Second, the RME 520 includes a dimension match engine (DME) block 1006a-n containing multiple DMEs configured to match dimensions with the key. Third, the RME 520 includes a post processing block 1008 that receives all of the processing from the DME block 1006a-n and issues a final result 1010. The final result 1010 is a Boolean 'and' of all dimensions results.

The formatting block 1002 receives chunks of rule 720 and the key 502. The formatting block, based on the chunks of rules 720, rule format info and the key 502, outputs formatted dimensions 1004a-n to the DME block 1006a-n. The format block 1002 outputs as many formatted dimensions 1004a-n as there are the DMEs in a particular clock cycle. For example, in an RME 520 that includes twelve DMEs, the format block 1002 can issue twelve formatted dimensions 1004a-n to each of the twelve DMEs 1006a-n. However, the RME 520 can contain any number of DMEs. The DMEs 1006a-n receive the formatted dimension 1004a-n and the key 502. The DMEs process the key, comparing it to the formatted dimension 1004a-n, and output a respective dimension result 1012a-n. The post processing block 1008 receives all of the dimension results 1012a-n, and performs of Boolean 'and' of all of the dimension results 1012a-n to output results 1010. Therefore results 1010 indicate whether the key 502 matches a particular rule across all of its dimensions.

In other words, in one embodiment, rules are stored within a chunk. A chunk is a collection of rules that are grouped together. The RME receives the chunk of rules one line of data per clock cycle (or beat). In one embodiment, the line of data can be 256-bits wide, however other embodiments the line of data can be any size.

Each line can contain at least one rule. For example a first line transmitting a chunk may contain three and a half rules, that is, three complete rules and one partial rule. The one partial rule is 'cut off' because the line of data is too short to store the complete fourth rule. Instead, the fourth rule is transmitted on a second line transmitting the chunk.

The second line may contain two and a half rules, that is, two complete rules, and one partial rules. The first rule of the second line of data is the remainder of the partial rule in the first line of data (i.e., the fourth rule). The second line of data contains two complete rules (i.e., the fifth and sixth rules of the chunk). In another embodiment, a line can include two partial rules, where the first partial rule is 'cut-off' at the beginning of the line, and the second partial rule is 'cut-off' at the end of the line. However, in this embodiment, the chunk contains six rules transmitted over two clock cycles, as described above.

The format block 1002, or first stage, formats all dimensions of the received multiple rules and assign each rule to a DME on each clock cycle. In this embodiment, in first clock cycle the format block 1002 processes three rules because it has received three complete rules (i.e., the first, second and third rule) where the format block 1002 does not process the fourth rule because it hasn't been completely received yet. In the second clock cycle, the format block 1002 processes three more rules (i.e., the fourth, fifth, and sixth rules) because all have been received completely at this point.

Every clock cycle, the DMEs 1006a-n process the dimensions. Then, the post processing block 1008 sorts the outputs of DMEs, and returns a final response on completion of whole chunk (in this embodiment, the six rules).

Figure 11A:
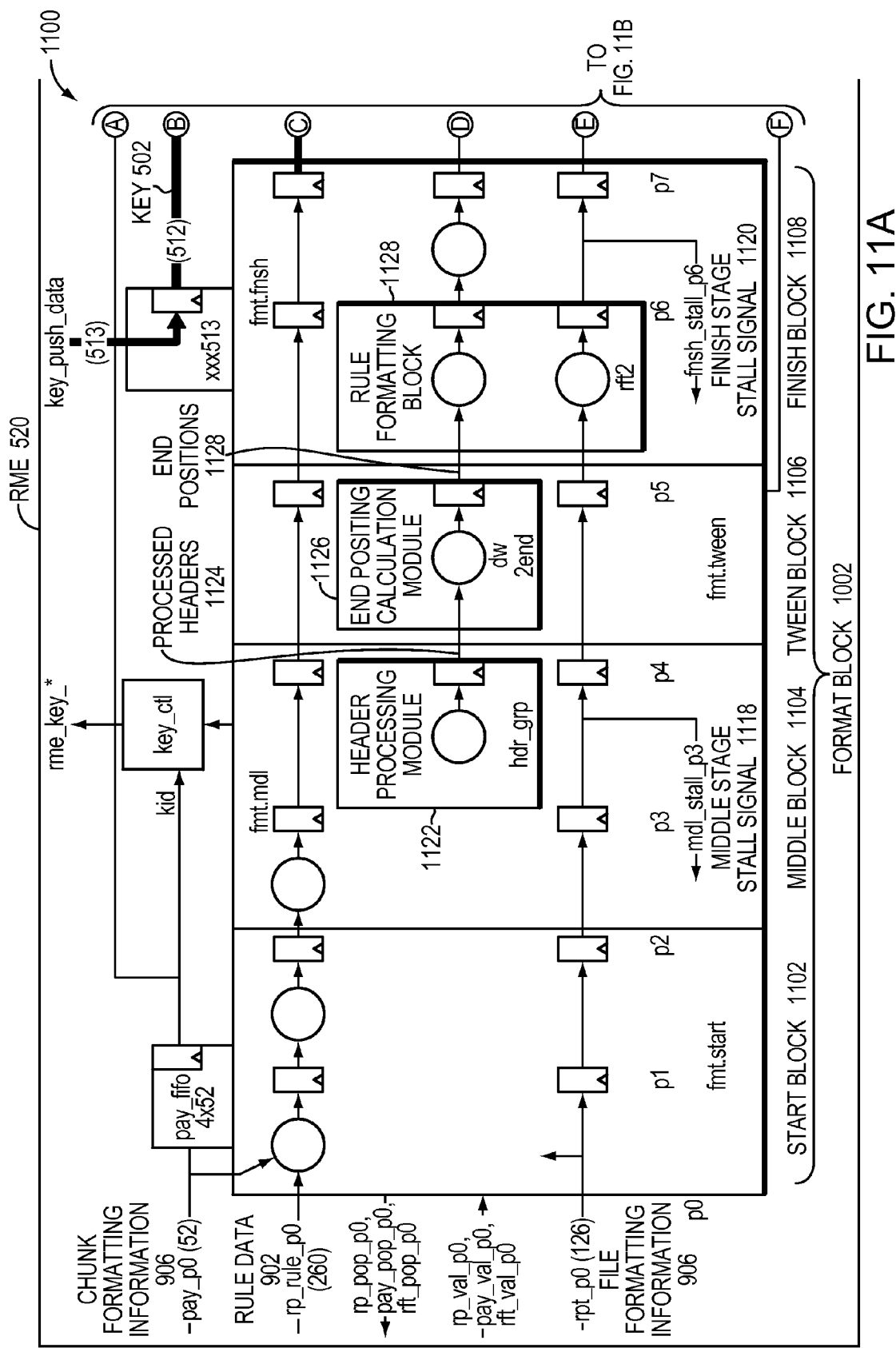
Figure 11B:
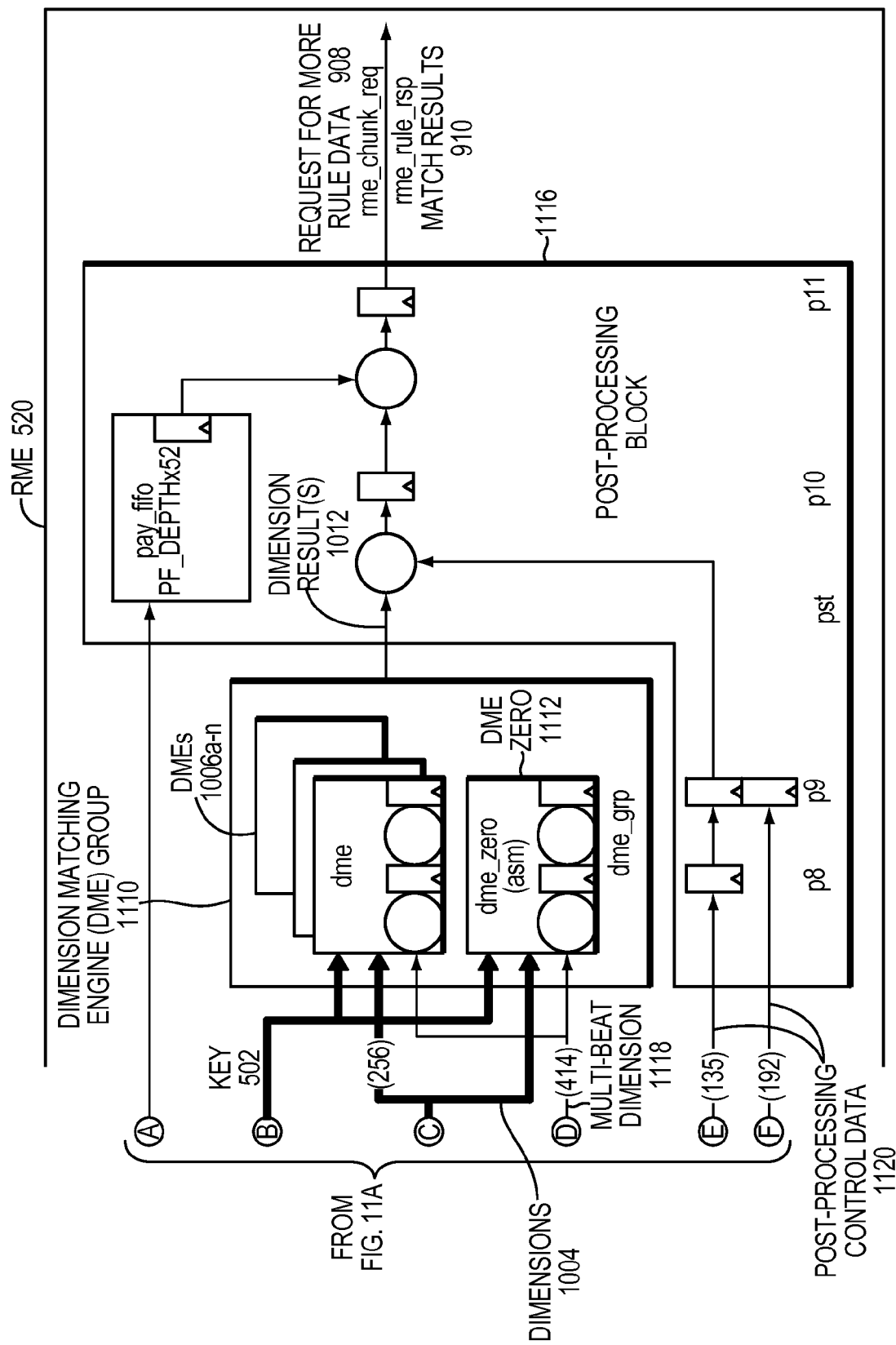

FIG. 11 is a block diagram 1100 illustrating an example embodiment of the RME 520. The RME 520 includes the format block 1002, the DME group 1110, and a post processing block 1116. The format block 1002, DME group 1110 and the post processing block 1116 executed similar high-level functions of the same respective blocks described in relation to FIG. 10.

In relation to FIG. 11, the format block 1002 includes a start block 1102, a middle block 1104, a tween block 1106, and a finish block 1108. The start block 1102 has two pipeline stages, P1 and P2. The middle block 1104 has two pipeline stages, P3, and P4. The tween block 1106 has one stage, P5. The finish block 1108 has two stages, P6 and P7.

The format block 1002 receives rule data 902 and rule formatting information at the start block 1102. The start block 1102 has three high-level functions. First, the start block 1102 finds starts of the rules within the rule data 902. Second, the start block 1102 identifies rules that do not require processing, such as a rule with a check rule violation or a rule with a valid bit being set to zero (or false). Third, the start block 1102 precalculates terms for next stage (e.g., the middle block 1104) processing.

The middle block 1104 has three high-level functions. First, the middle block 1104 removes rules that do not need to be processed, as identified by the start block 1102. The start block 1102, as described above, identifies rules that do not require processing, such as a rule with a check rule violation or with a valid bit set to zero or false. Second, the middle block 1104 extracts rule format from headers of the rule data 902. Third, the middle block 1104 extracts at least one priority field from headers of the rule data 902. The priority field of each rule indicates the priority in which the rule is processed.

The tween block 1106 has two high-level functions. First, the tween block 1106 calculates rule header and positions. Second, the tween block 1106 calculates rule dimension and positions.

The finish block 1108 has two high-level functions. First, the finish block 1108 calculates control for the multiple DMEs 1006a-n of the DME group 1110. Second the finish block 1108 generates control rule and formatting information for the post processing block 1116.

The start block 1102 has two pipeline stages, P1 and P2. The start block 1102 introduces a large delay, through combinatorial logic, from its inputs. The stages of the start block 1102 (i.e., P1 and P2) are configured to enable stalling, or hold information from a stall issued by the middle block 1104 or the finish block 1108. The start block 1102 also calculates header length information. The start block 1102 also identifies rules that do not need to be processed, by (1) performing a check rules operation, and (2) checking the valid bits of the rules. The start block 1102, in some embodiments, does not remove the rule, but rather identifies, flags, and/or selects the rule to be removed later, for instance, by the middle block 1104. The start block 1102 then determines whether the start block 1102 has processed more than a threshold of rules. The start block 1102 identifies rules P3 and P4 in excess of the threshold for removal. The start block 1102 also identifies rules for removal based on each rules validity bit.

The middle block 1104 has two pipeline stages, P3 and P4. Both stages are configured to stall and hold under a stall from the finish block 1108. Stage P3 removes invalid rules identified by the start block 1102. Therefore, only a rule that passes the check rules test and has its validity bit set (e.g., being true or one) are sent to the next stage of the middle block 1104 (e.g., stage P4).

Pipeline stage P4 of the middle block 1104 extracts header formatting information in a header processing module 1122. The header processing module 1122 processes up to four headers per clock cycle, however, the actual number of headers processed is dependent on the number of dimensions within the rules. This limits the amount of formatting information the tween block 1106 and finish block 1108 process during each clock cycle.

In one embodiment, the header processing module 1122 can process a certain number of headers based on the number of dimensions within each header. For example, in an embodiment where the RME 520 includes 12 DMEs 1006*a-n*, the header processing module 1122 can process four headers when each header includes 1-3 dimensions. This means that the header processing module 1122 processes 4-12 maximum dimensions per cycle, which does not overload the twelve DMEs 1006*a-n*.

The header processing module 1122 can process three header paths if each header includes 4-5 dimensions. This allows the RME 520 12 to 15 maximum dimensions per cycle, which occupies the DMEs 1006*a-n*, however, with stall conditions, the DMEs 1006*a-n* can process any surplus dimensions in a next clock cycle.

The header processing module 1122 can process two header paths when the headers include 6-11 dimensions. This creates 12-22 maximum dimensions per cycle, which occupies the DMEs 1006*a-n*, however, using stall conditions, any surplus dimensions can be processed in a next clock cycle.

Last, the header processing module 1122 can process one header path when the header includes 12-16 dimensions. The RMEs 520 process 12-16 total dimensions per clock cycle, which occupies the DMEs 1006*a-n*. Surplus dimensions can be processed in a next clock cycle.

The DME group 1110 of the RME 520 can include any number of DMEs 1006*a-n*. Adjusting the number of DMEs 1006*a-n* can affect the numbers described above. Accordingly, the above numbers describe one example embodiment and other combinations of numbers of headers, dimensions, and DMEs can realize other embodiments.

Further, the header processing module 1122 can process partial headers. A partial header is a header that straddles across two beats, or clock cycles, which requires processing during more than one cycle. The straddled header path is stored until the header processing module 1122 downloads the complete header. Multi-beat headers are discussed in further detail in relation to FIG. 12.

In relation to FIG. 11, rule data may contain more headers than described in the embodiments described above. Upon a rule including more headers than in the embodiments described above, the RME 520 asserts a stall, via the middle block stall signal 1118, so that the header processing module 1122, and the RME 520 in general, can process the additional headers in the rule. The middle block stall signal 1118 stalls stages P1 and P2 of the start block 1102. Then the RME 520 processes the number of headers based on the number of headers and number of dimensions, as described above. Then, the RME 520 stores unprocessed data in the middle block 1104 to be processed in next clock cycles.

The tween block 1106 includes one pipeline stage, P5. The tween block 1106 stalls upon a finish stall stage data 1120 signal from the finish block 1108. The tween block 1106 is configured to calculate rule header and position. The tween block 1106 is further configured to calculate rule dimension and positions from dimension widths. The tween block 1106 is further configured to calculate key positions from each dimension from rule formatting data.

The finish block 1108 includes two pipeline stages P6 and P7. The finish block 1108 includes a FIFO memory structure configured to manage control. The FIFO structure can push and pop, or retire, a variable number of elements. Elements in the FIFO are positions of headers and dimensions.

The finish block 1108 further calculates control for the DMEs 1006*a-n*. The calculated controls are shift accounts, masks, or assembly controls (e.g., for dimension straddles). In an embodiment where the RME includes 12 DMEs 1006*a-n*, the finish block 1108 retires, or processes, up to 12 dimensions per beat or clock cycle (including dimension straddles), up to four rules starts per beat, parts of up to five rules per beat, when the finish block 1108 is finishing processing a rule from the previous beat, and up to 256 bits of rule data per beat.

The finish block 1108 pushes up to four rule end positions (e.g., header and dimension end positions) and field widths into a FIFO data structure in a rule formatting (RFT) block 1128. The RFT block 1128 also calculates control data for dimension data for the first 16 elements of the FIFO data structure the control data includes a retirement state for the up to four headers and 12 rule dimensions. The finish block 1108 uses this control data to retire control and rule data. The formatting data from the RFT block 1128 is retired when the corresponding complete rule is sent to the DME group 1110, or when all header bits are retired. The RFT block 1128 retires data by popping any dimension and/or header it sends.

The finish block 1108 retires rule data when it is sent to the DME group 1110. When there are more rule bits than can be retired in one clock cycle (e.g., more than 12 dimensions and/or more than four rules) the finish block 1108 stalls by issuing a finish block stall signal 1120. The finish block 1108 processes as much of the rule data, (e.g., as many rule bits) as possible during the clock cycle and stores the remaining rule data to process in the next cycle.

Further, the RFT block 1128 can cause the finish block 1108 to issue a stall if it stores more than 32 elements stored in its FIFO, in one embodiment. The 32 element threshold allows the rule format stall to be independent of the number of elements popped in any cycle because it hides one cycle of the pop through a stall latency from the maximum allowed rule formatting pop count of the finish block 1108.

The finish block 1108 calculates control for each of the 12 DMEs 1006*a-n* through the control information from the rule formatting block 1128. The control information includes (1) shift counts to align rule and key data for the match, (2) a mask control to select a number of bits for each match, (3) and an assembly control for each of the assembly of dimensions that straddle beat boundaries.

The finish block 1108 further calculates control for post processing of the matched results, (e.g., via post processing control data 1120). The post processing control data 1120 includes information that allows the post processing block 1116 to identify which dimension results correspond with each rule. Each rule is given a tag, which follows each dimension of that rule as it exists in the finish block 1108.

The DME group 1110 includes multiple DMEs 1006*a-n* (e.g., 12 DMEs). Each DME 1006*a-n* can perform a 128-bit match of one of four different types. The four match types are (1) a range match, (2) an exact match, (3) a prefix match, and (4) a mask match. The DMEs 1006*a-n* can perform more than a 128-bit match of the four different types. For example, the DMEs 1006*a-n* can perform any bit length match, in one embodiment.

A range match determines whether a given key is within a minimum value and maximum value as set in a given dimension. An exact match determines whether a given key exactly matches a value as set in a given dimension. A prefix match determines whether a given number of bits, as set in the dimensions, of a given value as set in the dimension matches first set of a given number of bits in a given key bits. For example, a prefix match can match a first eight bits of a key to an eight-bit value in the dimension. Therefore, the prefix dimension includes both a length and a value to check. A mask match determines whether a given set of bits in a key, as indicated in a bit mask in the dimension, matches a value as indicated in the mask dimension. Therefore the mask dimension includes both a bit mask and a value for the bit mask to be checked.

As described above, a range match and a mask match both employ two rule data operands (i.e., range requires a minimum value and a maximum value, and mask requires a bit mask and a value). An exact match employs one rule data operand, which is the exact match value that searches against the key. A prefix match employs one rule data operand plus a width or a zero kill shift for unused bits. Matching a dimension to a key employs at least one operand of key data.

Figure 12:
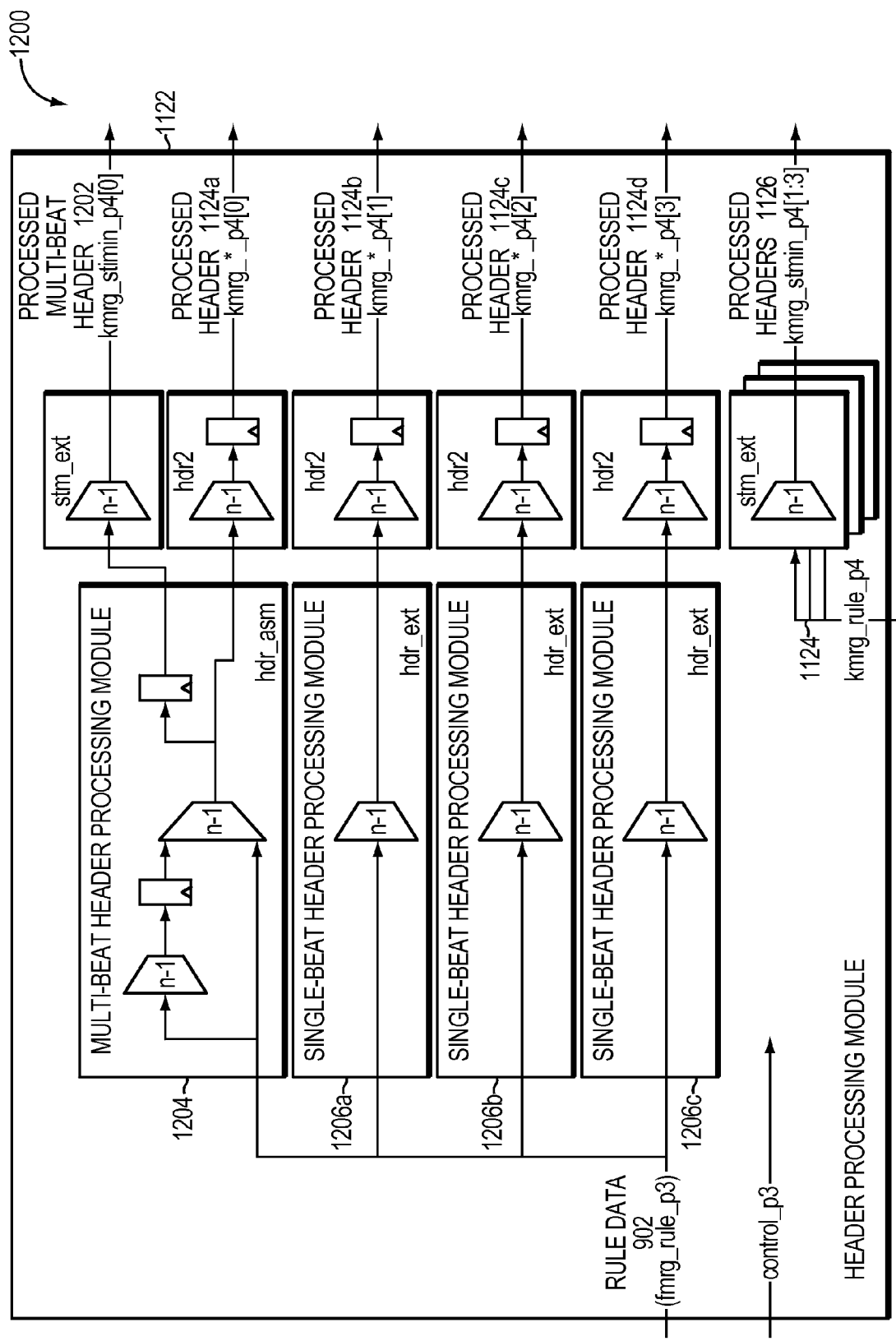
FIG. 12 is a block diagram of a header processing module.

FIG. 12 is a block diagram 1200 of the header processing module 1122. The header processing module 1122 includes a multi-beat header processing module 1204 and a plurality of single-beat header processing modules 1206*a-c*. The header processing module 1122 can include any number of single-header processing modules 1206*a-c*. The header processing module 1122 can either include one multi-beat header processing module 1204 or multiple multi-beat header processing modules 1204. The header processing module 1122 receives rule data 902. The header processing module 1122 distributes individual unformatted rule headers to each of the single-beat header processing module 1206*a-c* and, if necessary, the multi-beat header processing module 1204.

The single-beat header processing modules 1206*a-c* output processed headers 1124*b-d*. Further, the multi-beat header processing module 1204 outputs a processed header 1124*a* and a processed multi-beat header 1202, which combines the header information across the multiple beats. The processed headers 1124*a-d* and processed multi-beat header 1202 include header formatting information (e.g., beginning and ending of each dimension, etc.). Further, the processed headers 1124 *b-d* are combined to become processed headers 1126.

Figure 13:
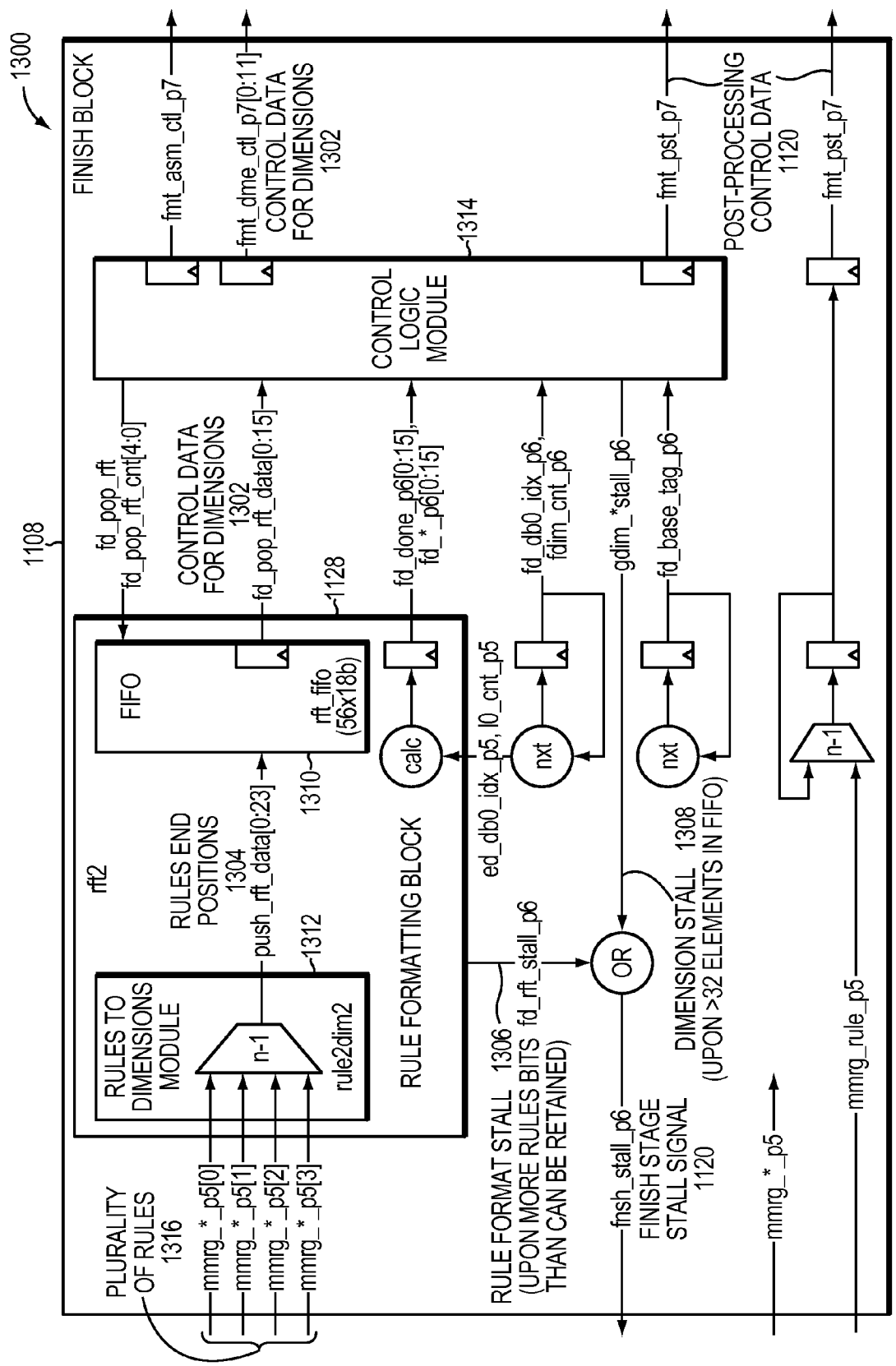
FIG. 13 is a block diagram of a finish block of a rule matching engine.

FIG. 13 is a block diagram 1300 of the finish block 1108 of the RME 520. The finish block 1108 receives a plurality of rules 1316 at a rules to dimensions module 1312 in the rule formatting block 1128. The rules to dimensions module 1312 calculates rule end positions 1304, which are stored in a FIFO 1310 memory structure within the rule formatting block 1128. The FIFO 1310 'pops' the rule end positions 1304 sequentially as control data for dimensions 1302 to a control logic module 1314, which then outputs control data for dimensions 1302 and post processing control data 1120. The finish block 1108 further issues additional post processing control data 1120 received, and optionally delayed, from other blocks in the format block 1002.

The rule formatting block 1128 can further issue a rule format stall 1306 upon receiving more rule bits than can be retired in one beat (or clock cycle). Further, the control logic module 1314 can issue a dimension stall 1308 upon determining that the FIFO 1310 stores greater than 32 elements. If either the rule formatting block 1128 issues a rule format stall 1306 or the control logic module issues a dimension stall 1308, the finish block 1108 issues a finish stage stall signal 1120.

Figure 14A:
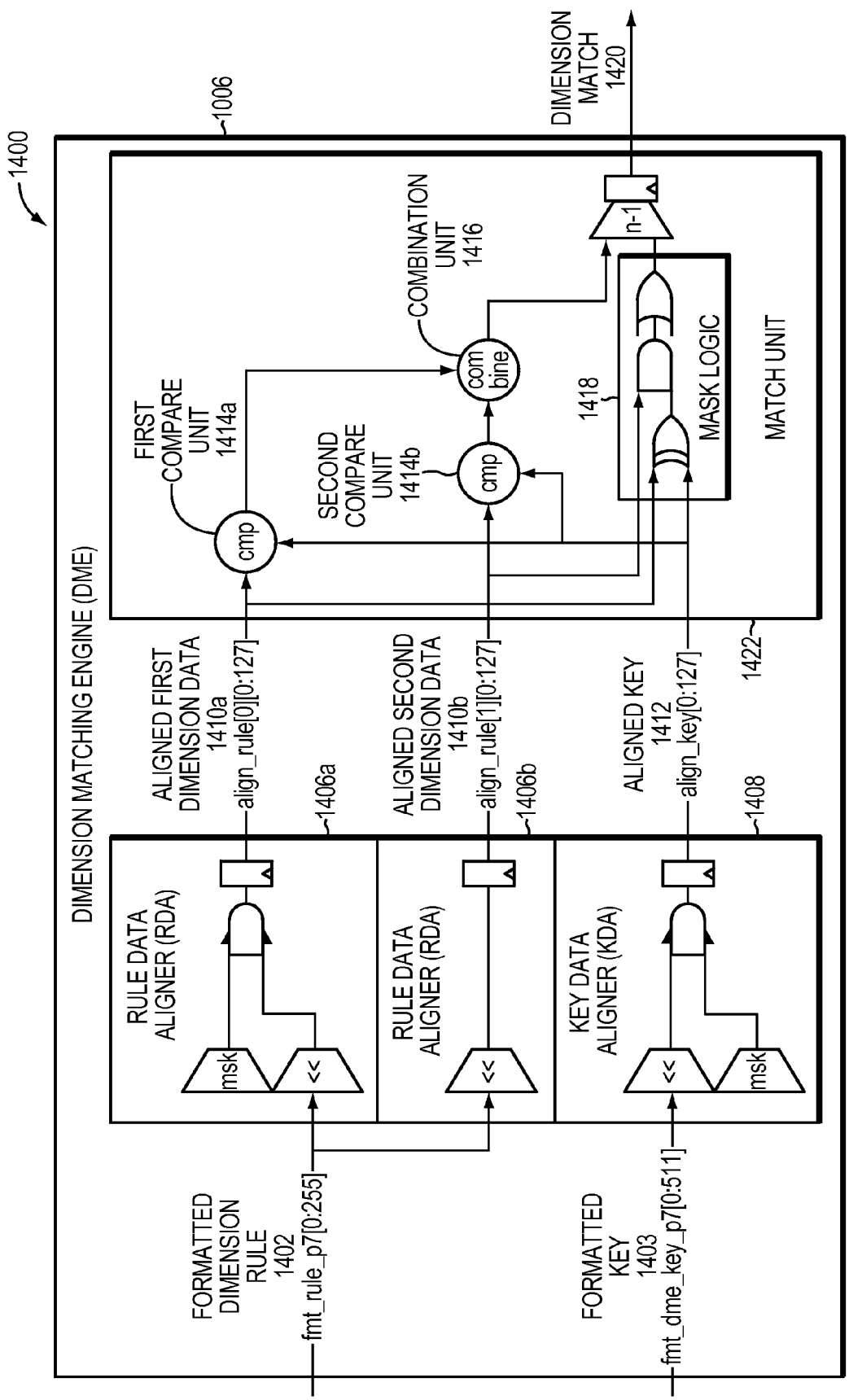
FIG. 14A is a block diagram of a dimension match engine.

FIG. 14A is a block diagram 1400 of an example embodiment of the DME 1006. The DME 1006 includes at least one rule data aligner (RDA) 1406*a-b* and a key data aligner (KDA) 1408. The DME 1006 further includes a match unit 1422, which is sometimes also called a compare unit. The DME 1006 receives 256 bits of rule data and 512 bits of key data, in one embodiment. The DME 1006 receives unique control data to control the RDAs 1406A-B, the KDA 1408, and the match unit 1422.

The match unit 1422 includes a first compare unit 1414*a*, a second compare unit 1414*b*, a combination unit 1416, and mask logic 1418. The match unit 1422 receives an aligned first dimension data 1410*a*, and aligned second dimension data 1410*b*, and an aligned key 1412, and outputs a dimension match 1420 indicating whether the key matches the particular rule.

The aligned first dimension data 1410*a* and aligned second dimension data 1410*b* correspond to the two possible pieces of data accompanying each dimension. For example, range matching uses the aligned first dimension data 1410*a* as a minimum, and the aligned second dimension data 1410*b* as a maximum. The first compare unit 1414*a* therefore performs a greater than (or greater than or equal to) operation, the second compare unit 1414*b* performs a less than (or less than or equal to) operation, and the combination unit 1416 then performs a logical 'and' operation on the results of the first and second compare units 1414*a-b* to reach the dimension match 1420.

In a mask operation, the aligned first dimension data 1410*a* is the value of the dimension, and the aligned second dimension 1410*b* is the bit mask. The match unit 1422 then performs an exclusive-or operation of the aligned first dimension data 1410*a* and the aligned key 1412. Then, the match unit 1422 performs a bit-wise 'and' of the aligned second dimension data 1410*b* (e.g., the mask, and the results of the exclusive or operation). Then the match unit 1422 performs an 'or' operation of all of the bits of the 'and' operation. The mask logic 1418 performs the above operations. The dimension match 1420 is the result of the final 'or' of the mask logic 1418.

For an exact or prefix match, the aligned first dimension data 1410a and the aligned second dimension data 1410b include the same formatted rule bits. Therefore, the exact or prefix match can take the same path through the match unit 1422 as the range match.

For mask operations, the aligned first dimension data 1410a is masked on a nimble granularity. The aligned second dimension data 1410b is not masked because masking is not required. The aligned key 1412 is masked on a bit granularity to support prefix operations.

Figure 14B:
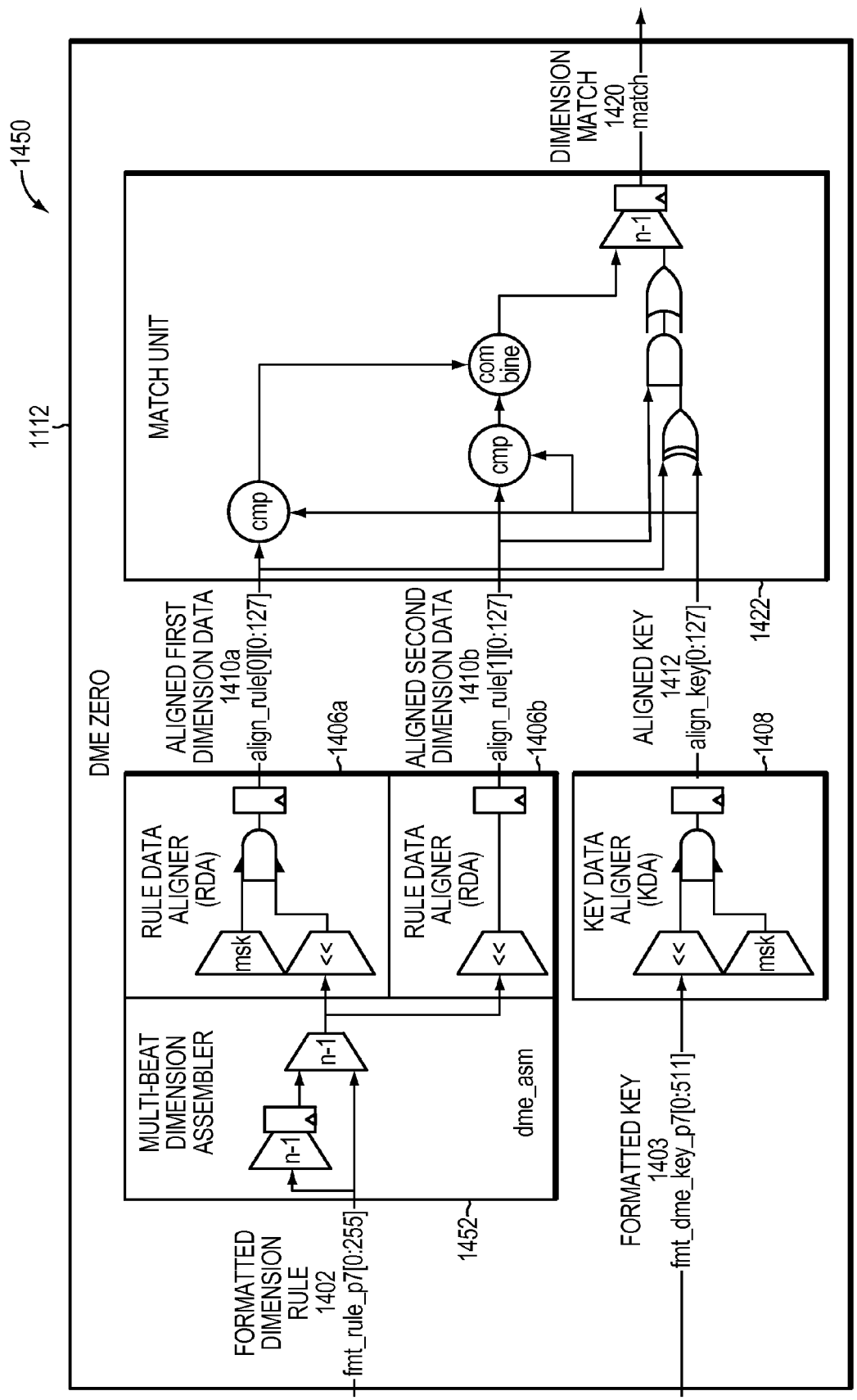
FIG. 14B is a block diagram illustrating an example embodiment of dimension match engine zero.

FIG. 14B is a block diagram 1450 illustrating an example embodiment of a DME zero 1112. The DME zero 1112 is a special DME unit configured to handle rules that are sent over multiple clock cycles or beats. The DME zero 1112 receives a formatted dimension rule 1402 and a formatted key 1403. A multi-beat dimension assembler 1452 receives the formatted dimension rule. The multi-beat dimension assembler 1452 includes a memory to hold the rule across multiple beats before sending the reassembled rule to the RDAs 1406a-b as described in relation to FIG. 14A. In relation to FIG. 14B, the KDA 1408 receives a formatted key 1403 in the same manner as FIG. 14A. In addition, in relation to FIG. 14B, the match unit 1422 further operates in the same manner as the match unit 1422 of FIG. 14A.

Figure 15:
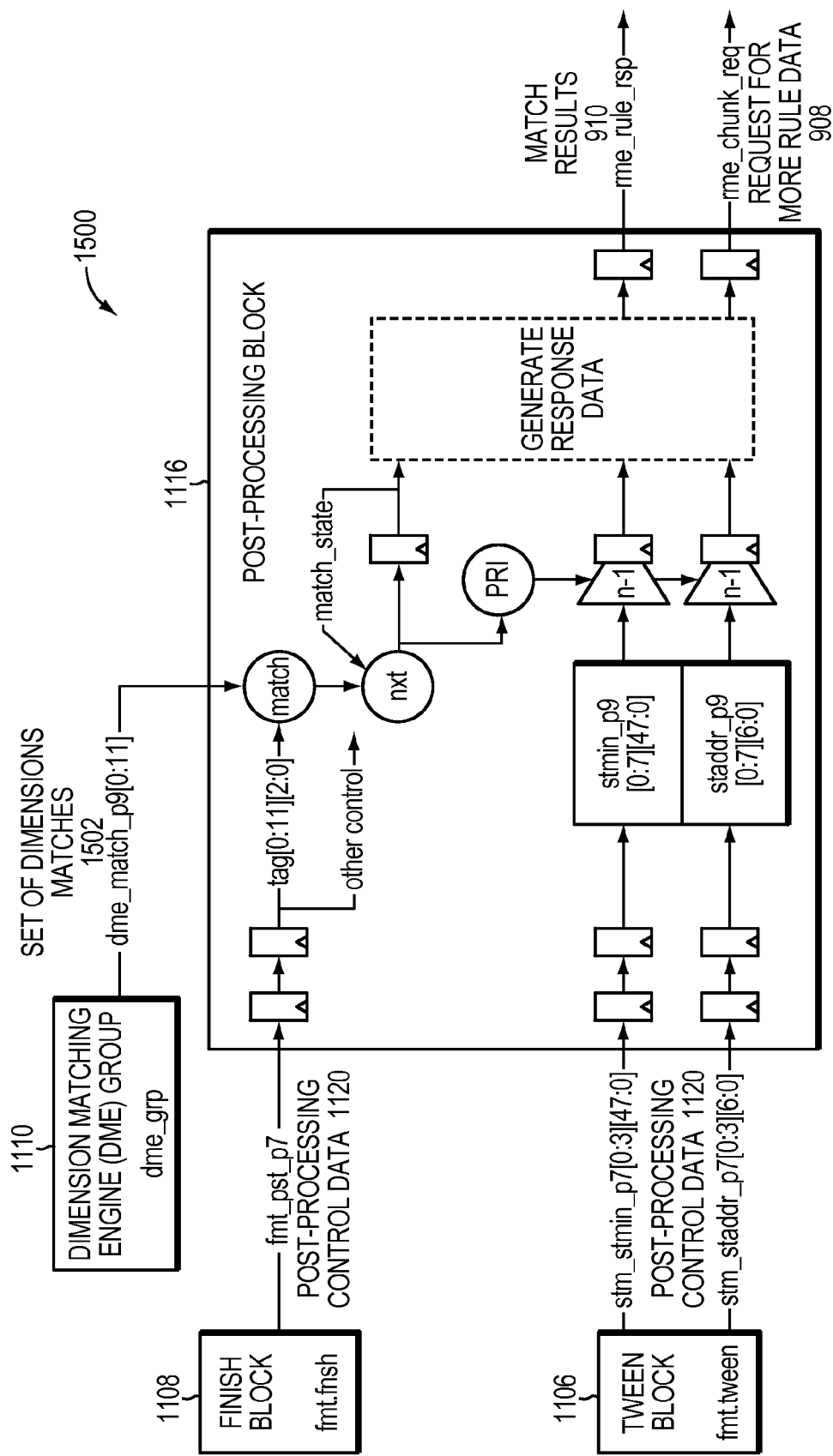
FIG. 15 is a block diagram illustrating an example embodiment of a post processing block.

FIG. 15 is a block diagram 1500 illustrating an example embodiment of the post processing block 1116. The post processing block 1116 receives post processing control data 1120 from the finish block 1108 and the tween block 1106. The post processing block 1116 also receives up to 12 dimensions from the DME group 1110. Based on the post processing control data 1120 and the set of dimensional matches 1502, the post processing block 1116 issues either a request for more rule data 908, in the case where the rule processing is incomplete, or match results 910 in the case where a conclusion has been reached about the rule.

Figure 16:
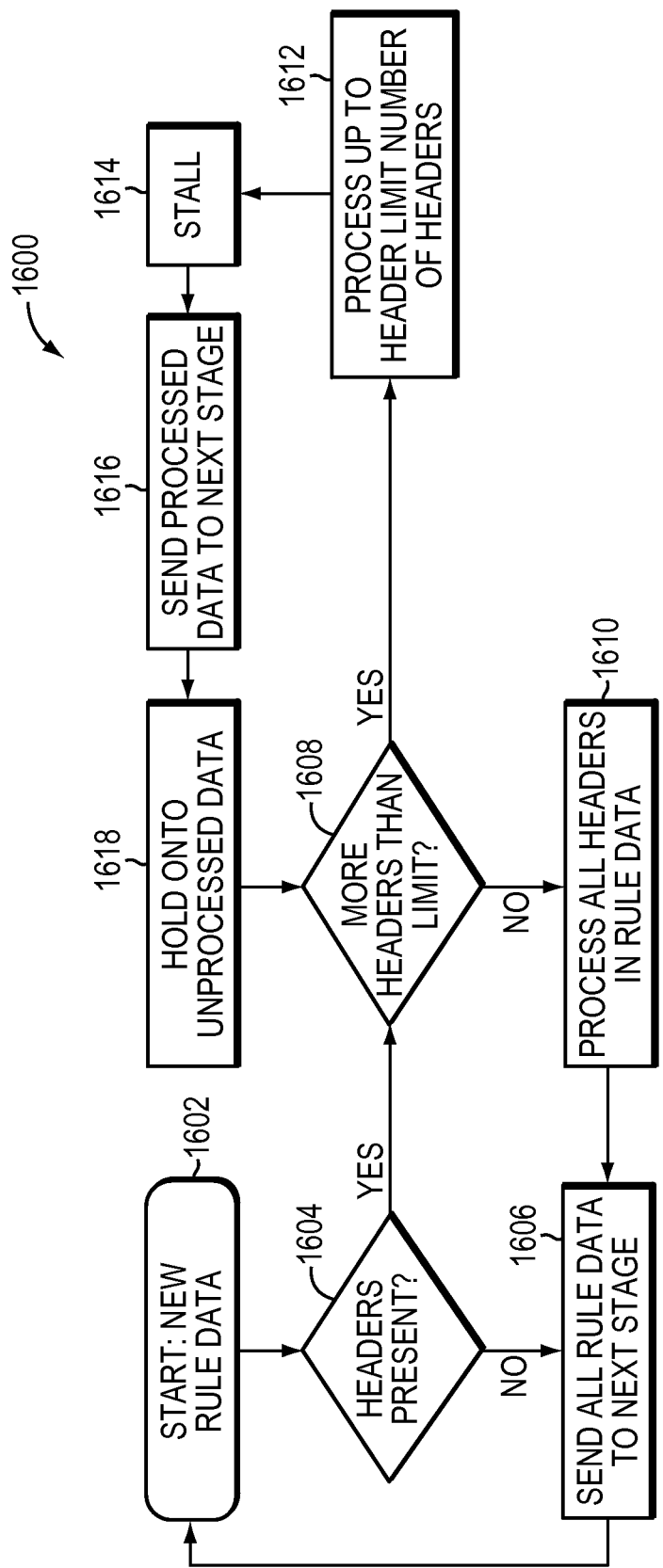
FIG. 16 is a flow diagram illustrating an example process employed by a search processor to process headers of a rule.

FIG. 16 is a flow diagram 1600 illustrating an example process employed by the search processor to process headers of a rule. The RME of the search processor begins by receiving rule data (1602). Then the RME determines whether headers are present in the rule data (1604). If headers are not present, the RME sends all rule data to the next stage of processing in the format block (1606). Then, the format block waits for new rule data (1602).

If headers are present in the rule data (1604), then the format block determines whether there are more headers than a particular limit (1608). If there are not more headers than the predetermined limit, then the format block processes all headers in the rule data (1610). Then, the format block sends all rule data to the next stage of processing (1606). Then, the format block waits to receive new rule data (1602).

However, if the RME has received more headers than the predetermined limit (1608), the format block processes the number of headers up to the header limit (1612). Then, the format block stalls (1614). Then, the format block sends process data to the next stage (1616). The format block stores unprocessed data in its current stage (1618). Then, the format block determines whether the RME is storing more headers than the predetermined limit (1608) and proceeds accordingly.

Figure 17:
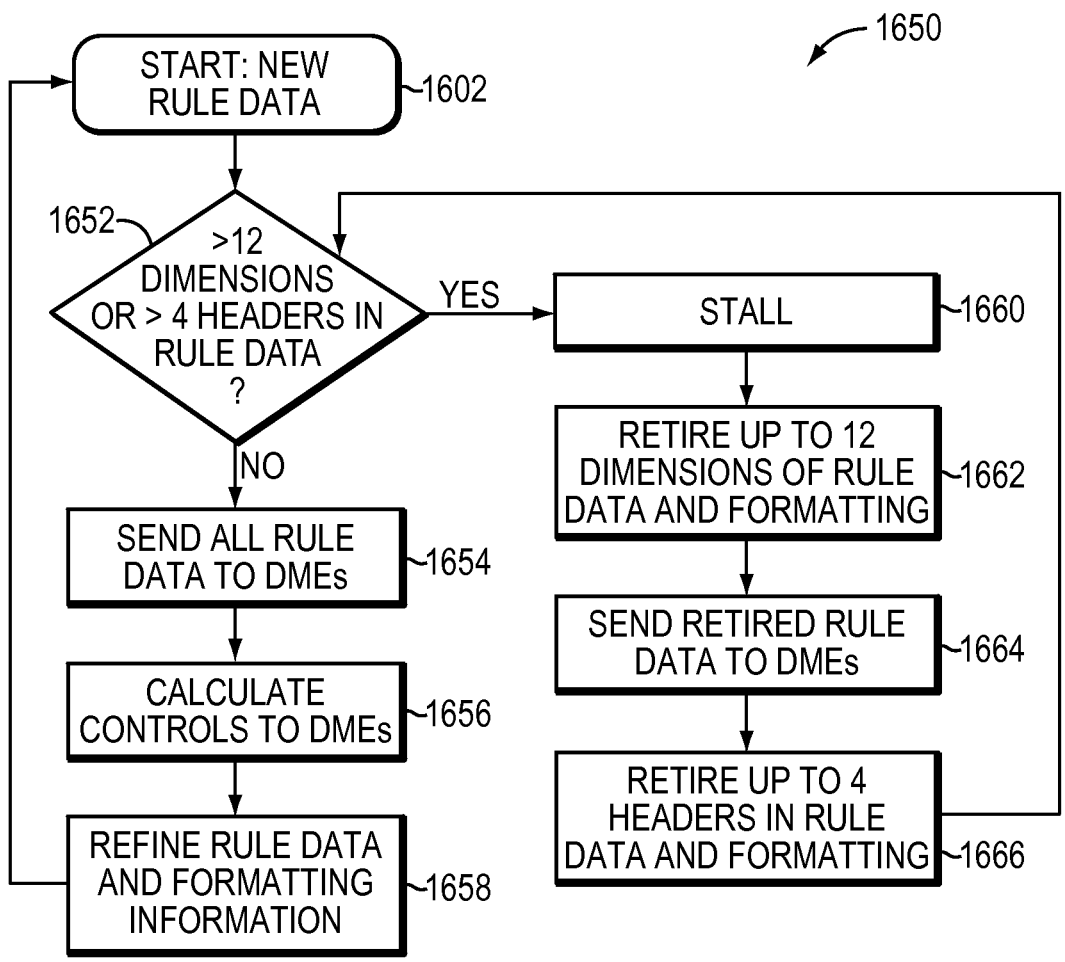
FIG. 17 is a flow diagram illustrating an example process employed by a search processor to process headers of a rule.

FIG. 17 is a flow diagram 1650 illustrating another example embodiment of a process employed by the RME of the search processor to process headers. The format block begins by receiving new rule data (1602). Then, the format block determines whether there are more than 12 dimensions or more than 4 headers in the rule data (1652). If there are not more than 12 dimensions or more than 4 rule data headers in the rule data, the format block sends all rule data to the DMEs (1654). Then, the format block calculates control data to send to the DMEs (1656). Then, the format block refines rule data and formatting information (1658). Then, the format block waits for new rule data (1602).

On the other hand, if there are more than 12 dimensions or more than 4 headers in the rule data (1652), the format block stalls (1660). Then, the format block retires up to 12 dimensions of rule data and formatting (1662). Then, the format block sends the retired rule data to the DMEs (1664). Then, the format block retires up to 4 headers in the rule data and formatting (1666). Then, the format block determines again whether there are more than 12 dimensions or more than 4 headers in the rule data (1652) and proceeds accordingly.

Figure 18:
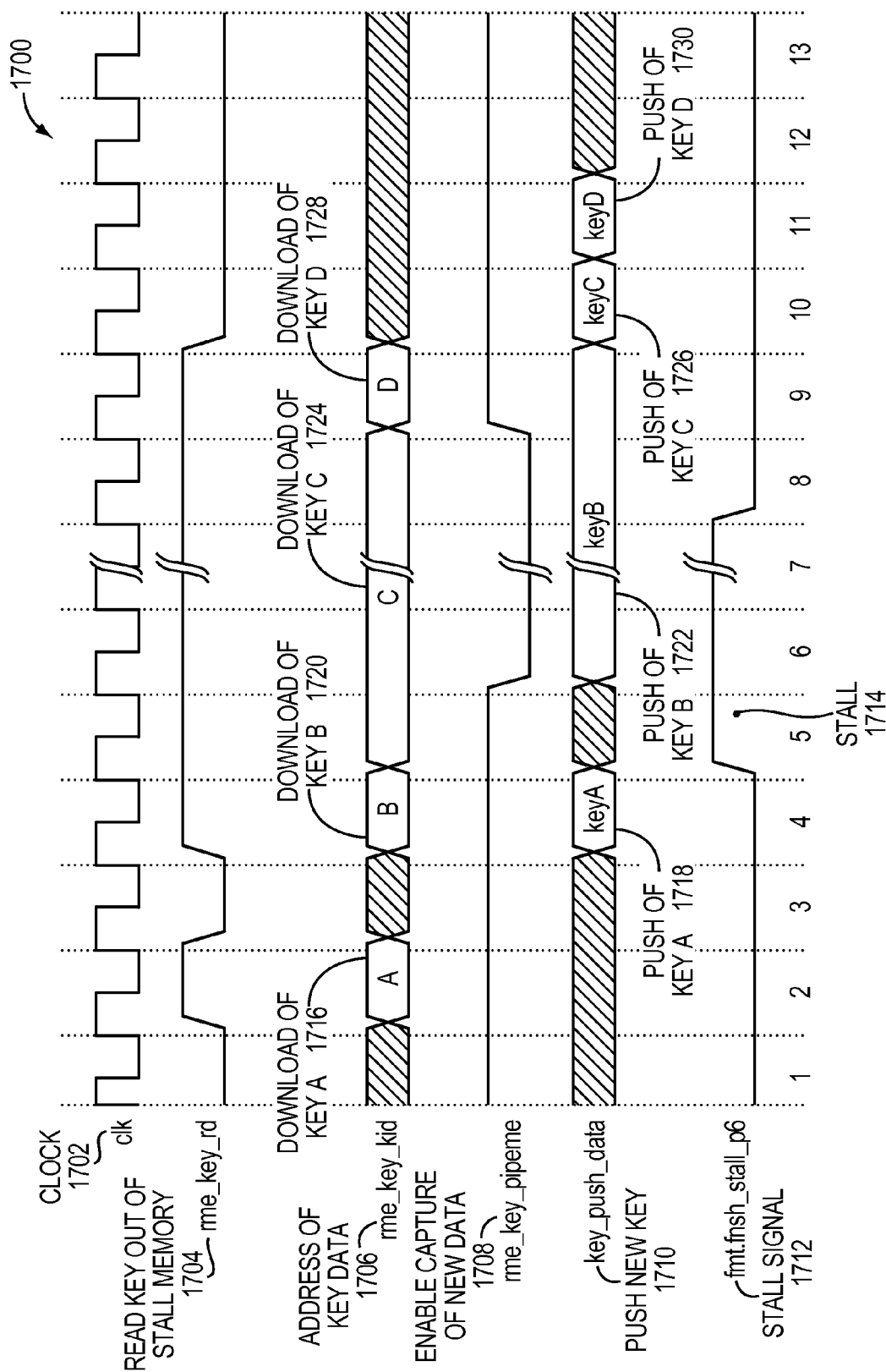
FIG. 18 is a timing diagram illustrating an example embodiment of pushing keys to a rule match engine during a stall.

FIG. 18 is a timing diagram 1700 illustrating an example embodiment of pushing keys to the RME during a stall. The timing diagram 1700 includes a clock 1702, a read key out of stall memory 1704, an address of key data 1706, an enable capture of new data 1708, a push new key 1710 signal, and a stall signal 1712. The clock 1702 oscillates between an up and down value on a periodic basis. The read key out of stall memory 1704 indicates when a particular key is being read from the stalled memory. The address of key data 1706 indicates which key is being downloaded. The enable capture of new data 1708 indicates when the RME is able to download new data. When the enable capture of new data 1708 signal is logically down or low, a stall is needed. Push new key 1710 indicates when a downloaded key is being pushed through the RME. For example, push of Key A 1718 indicates that Key A is being pushed through the RME. Push of Key B 1722 indicates that Key B is being pushed through the RME, however it elapses over a long period of time because it coincides with the stall 1714. Likewise, push of Key C 1726 and push of Key D 1730 occur after the stall and push of Key B 1722 are complete.

Figure 19:
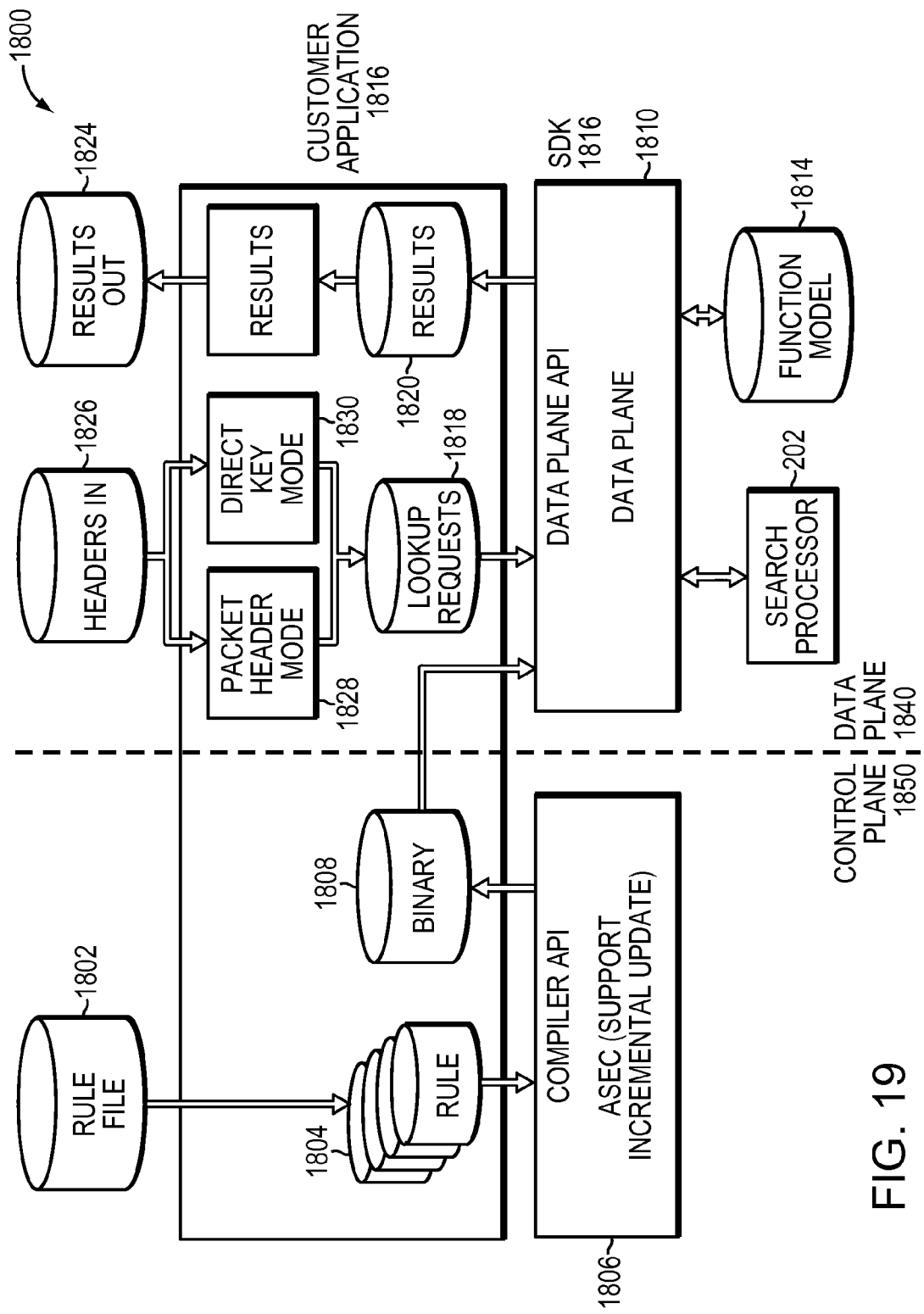
FIG. 19 is a block diagram illustrating an example embodiment of a control and data plane employed by a search processor described herein.

FIG. 19 is a block diagram 1800 illustrating an example embodiment of a control plane 1850 and a data plane 1840 employed by the search processor described herein. The control plane 1850 receives a rule file 1802. The rule file 1802 can be a text or other formatted rule file. The rule 1802 is broken into multiple rules 1804. Then, the compiler application programming interface (API) 1806 converts the rules 1804 to a binary rule format 1808. The compiler 1806 can also incrementally update a set of already existing rules by adding new rules to an already existing binary rule format 1808. In one embodiment, the binary rule format 1808 includes a tree, rules and/or chunks, and optionally buckets in an on-chip and/or external memory. The binary rule format 1808 is sent to the data plane 1840 with the data plane API 1810. The data plane API 1810 loads the binary rule format 1808 to the search processor 202. The data plane API 1810 may further load the binary rule format 1808 into a function model 1814.

The data plane 1840 further receives headers 1826 at a customer application layer 1816. The headers 1826 are received either in a packet header mode 1828 or a direct key mode 1838. In either packet header mode 1828 or direct key mode 1830, the customer application layer 1816 generates the lookup request 1818 to the data plane 1810. The data plane 1810 then looks up the headers in the search processor 202 by employing the binary rules file 1808 already loaded into the processor to generate results 1820. The results 1820 are sent to the customer application layer 1816 which are then outputted as results output 1824.

FIG. 20A is a block diagram 2000 of an example embodiment of an exact rule type 2004. The exact rule type 2004 includes a rule value 2002. The rule value 2002 is compared directly to a key value. A key value matches the exact rule type 2004 if the rule value 2002 matches the key value directly.

FIG. 20B is a block diagram 2005 illustrating an example embodiment of a dimension being either a range rule type 2006 or a mask rule type 2008. A range rule type 2006 includes a range minimum rule value 2010a and a range maximum rule value 2010b. A key value matches the range rule type 2006 if the key value is greater than (or greater than or equal to) the range minimum rule value 2010a and less than (or less than or equal to) the range maximum rule value 2010b.

The mask rule type 2008 includes a mask value 2010a and a bit mask 2012b. The mask value 2012a is the value to which the key is compared, and the bit mask 2012b is the set of bits of the key and the mask which the mask value 2010a is compared. A key value matches the mask rule type 2008 if the masked bits of the key value match the masked bits of the mask value 2012a.

FIG. 20C is a block diagram 2020 of an example embodiment of a prefix rule type 2022. The prefix rule type includes a value 2024, which acts as the rule value. The value 2024 has a certain endianness, in this embodiment with the upper bits being the more significant bits and low bits being the less significant bits. A key value matches the prefix rule type 2022 if the value 2024 matches the upper bits of the key value.

FIG. 21A is a block diagram 2100 of individual dimensions within key data. The key data includes dimension zero 2102A, having a width of 84 bits, dimension one 2102B having a width of 32 bits, and dimension two 2102C, having a width of 72 bits. The rest of the key data remains unused as unused key bits 2104, having a width of 324 bits. Dimension zero 2102A is allocated to DME zero 1006A, dimension one 2102B is allocated to DME one 1006B, and dimension two is allocated to DME two, 1060C. The remaining DMEs 1006D-N remain unused because the rest of the key data is unused.

FIG. 21B is a block diagram 2110 illustrating an example rule with dimension padding 2114. The rule includes rule value 2112 and dimension padding 2114. After the rule value 2112, the dimension padding 2114 is a 0-3 bit padding that aligns the next dimension to a nibble boundary padding, where the dimension padding 2114 is binary zeros.

FIG. 21C is a block diagram 2120 of an example rule with a plurality of dimensions 2102a-n. The plurality of dimensions 2102a-n include padding as described in relation to FIG. 21B. Therefore the dimensions 2102a-n are nibble aligned. The end of the rule further includes rule padding 2126. The rule padding 2126 keeps each rule at 512 bits with key bit zero 2124 beginning with the padding and key bit five hundred and eleven 2122 spanning all the way to the beginning of dimension zero.

Figure 21D:
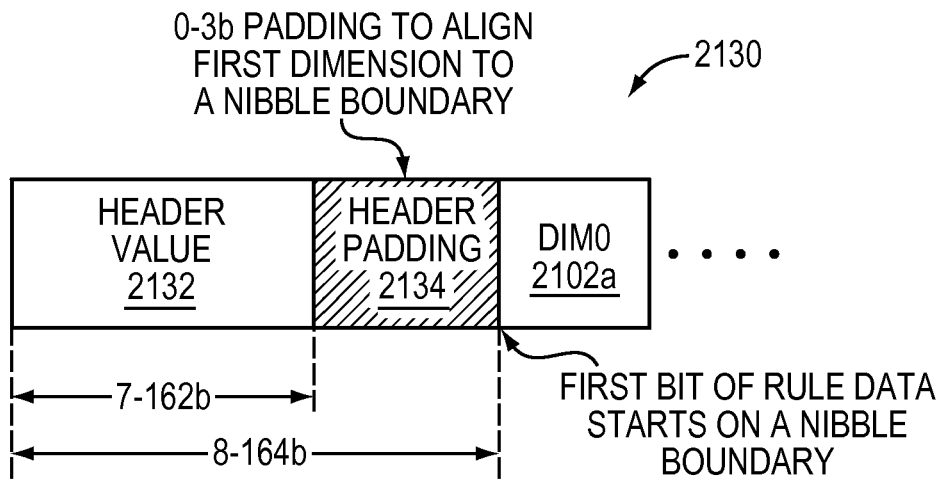
FIG. 21D is a block diagram of example embodiments of a rule including a header.

FIG. 21D is a block diagram 2130 of an example embodiment of a rule including a header. The rule includes a header value 2132 of a certain bit length. After the header value 2132, the rule includes header padding 2134 which is a 0-3 bit padding that aligns the first dimension 2102A to a nibble boundary. The first bit of rule data that is not the header starts on a nibble boundary.

Figure 21E:
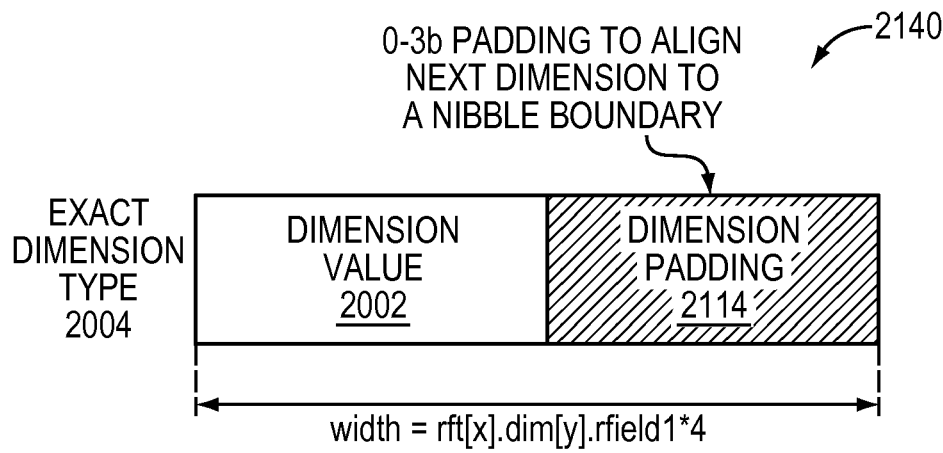
FIG. 21E is a block diagram of an example of an exact rule type including rule padding.

FIG. 21E is a block diagram 2140 of an example of an exact rule type 2004 including dimension padding 2114. The exact rule type 2004 includes a rule value 2002 and dimension padding 2114. The dimension padding 2114 is a 0-3 bit padding that aligns the next dimension to a nibble boundary.

FIG. 21F is a block diagram 2150 illustrating a prefix dimension type 2022. The prefix dimension type 2022 includes a value 2024 and dimension padding 2114. The dimension padding 2114 is a zero bit padding that aligns the next dimension to a nibble boundary.

FIG. 21G is a block diagram 2160 of a mask dimension type 2108 and range dimension type 2106. The mask dimension type and range dimension type 2006 include respective dimension values 2162. The mask dimension type 2008 and range dimension type 2006 further include dimension padding 2114 at the end of each of the dimension values 2162 that align the next operand to a nibble boundary. Therefore, the mask dimension type 2008 and range dimension type 2006 each have two operands as values and each operand is nibble aligned.

Figure 21H:
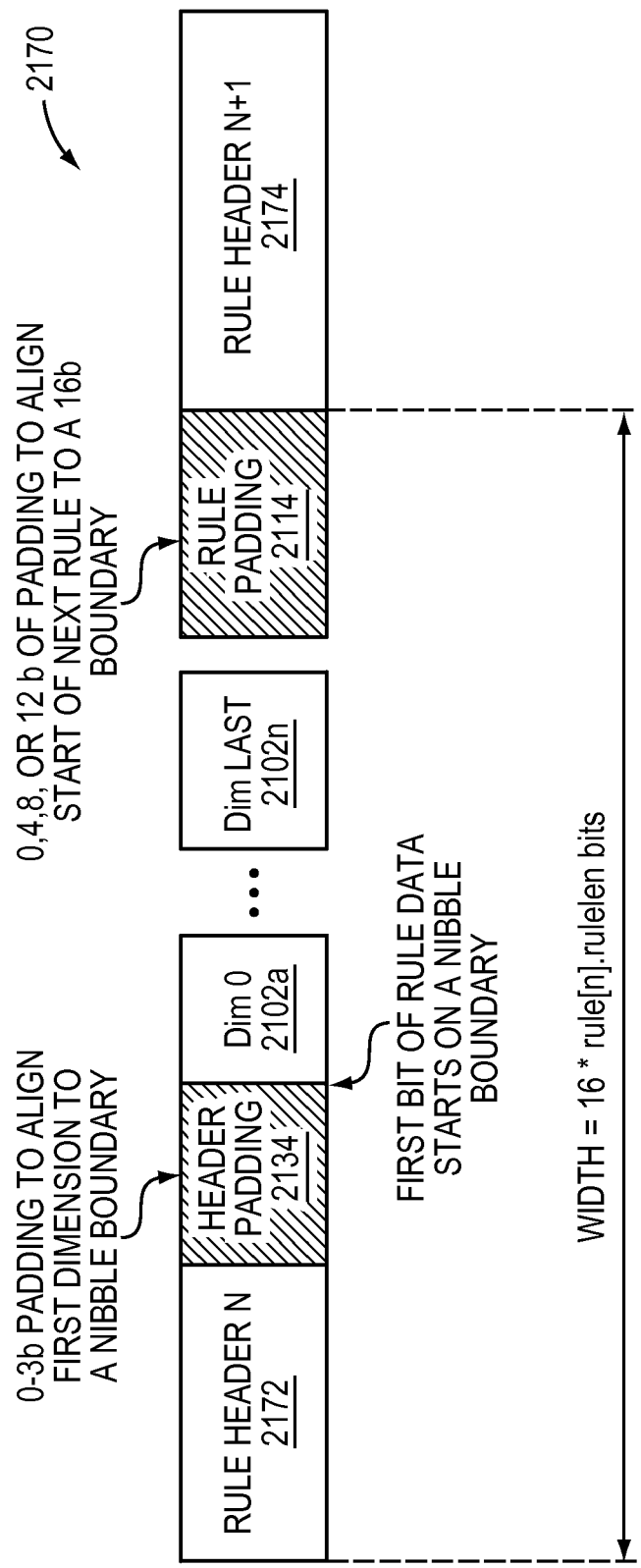
FIG. 21H is a block diagram illustrating an example embodiment of padding rule headers with multiple rules.

FIG. 21H is a block diagram 2170 illustrating an example embodiment of a rule with header padding 2134 and rule padding 2114. Rule header N 2172 is followed by a 0-3 bit header padding 2134 to align the first dimension of the rule to a nibble boundary. Dimension zero therefore starts its first bit on a nibble boundary. After the last dimension of rule N 2102N, a rule N+1 begins. Before the rule header N+1 2174, the rule N includes rule padding 2114. Rule padding 2114 includes 0, 4, 8, or 12 bits of padding that aligns the start of the next rule (e.g., rule N+1) to a 16 bit boundary. Therefore, the width between the beginning of two sequential rule headers is a multiple of 16 bits, or 2 bytes.

Figure 22:
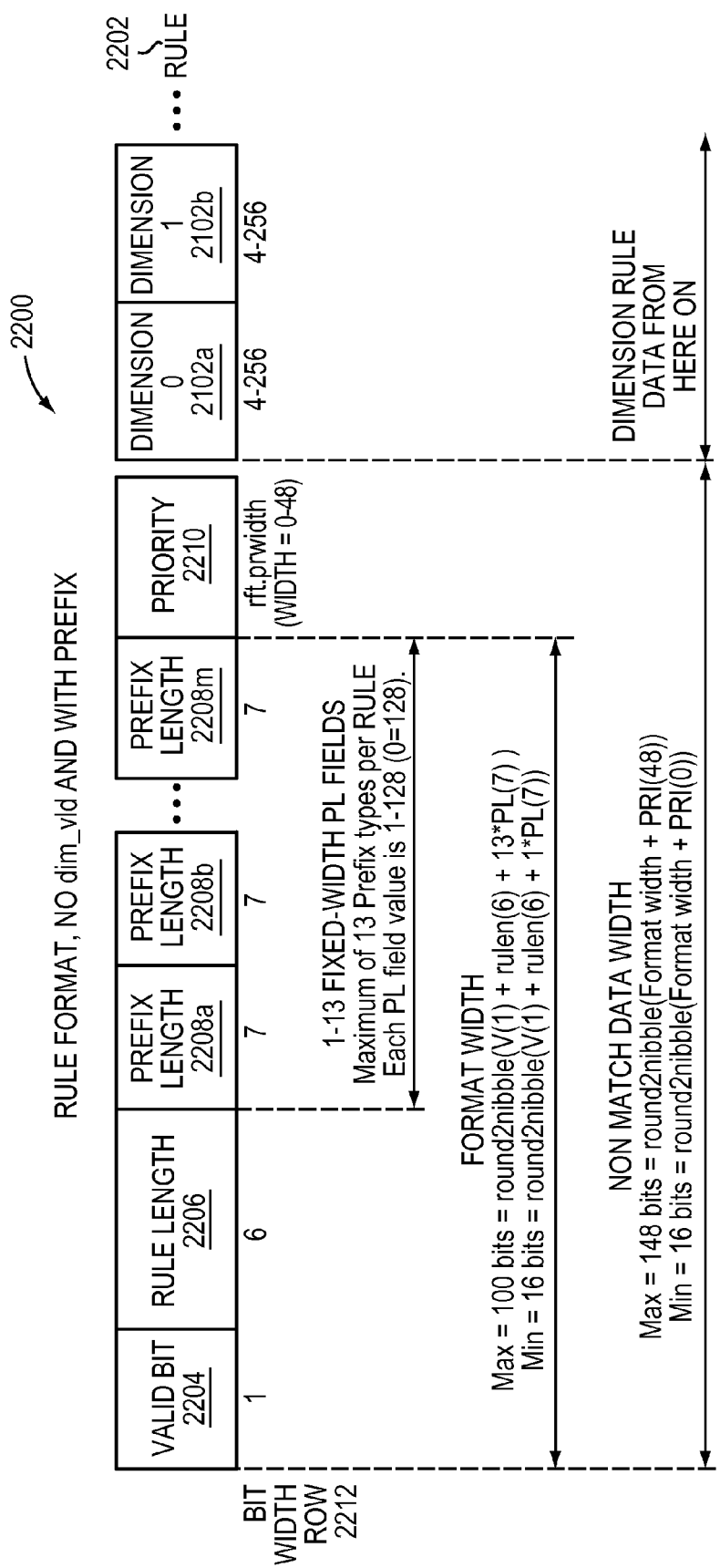
FIG. 22 is a block diagram illustrating an example rule format of a rule without a dimension validity field.

FIG. 22 is a block diagram 2200 illustrating an example rule format of a rule without a dimension validity field. The rule format includes a valid bit 2204, a rule length 2206, a prefix length A 2208A, a prefix length B 2208B, a prefix length M 2208M, a priority field 2210, a first dimension 2102A, a second dimension 2102B, and as many dimensions as the rule is configured to store. The block diagram 2200 further indicates the bit width of each element by the bit width row 2212. For instance, the validity bit 2204 is one bit wide, the rule length 2206 is six bits wide, each prefix length 2208A-M is seven bits wide, respectively, the priority field 2210 is anywhere from 0-48 bits, and each dimension is between 4- and 256-bits.

The valid bit 2204 is a flag that indicates whether the rule is valid or not. If the valid bit is set to one, then the rule is processed by the RME or BPP. If the valid bit is set to zero, then the rule is screened out and not processed. Setting the validity bit can be a more efficient method to enable and disable rules than deleting or inserting the rule.

Further, in one embodiment, when the dimension valid bit is set to zero, its corresponding dimension value is not stored. Therefore, the dimension, and therefore rule and chunk, occupy less space in memory and further increase efficiency.

The rule length is a 6-bit value that indicates the length of the rule, which is useful for rule processing. For example, the rule length 2206 informs the RME or BPP when to stop processing the rule because the remaining bits of the rule are simply padding to fill out the rest of the rule length. Prefix lengths 2208a-m indicate the length of a prefix field for a given dimension. The PL fields are used for prefix dimension types. The priority field indicates the priority of the rule, for instance, the priority of the rule within a chunk of rules. The dimensions 2102a-b indicate the actual values of the rule 2202 to be processed.

Figure 23:
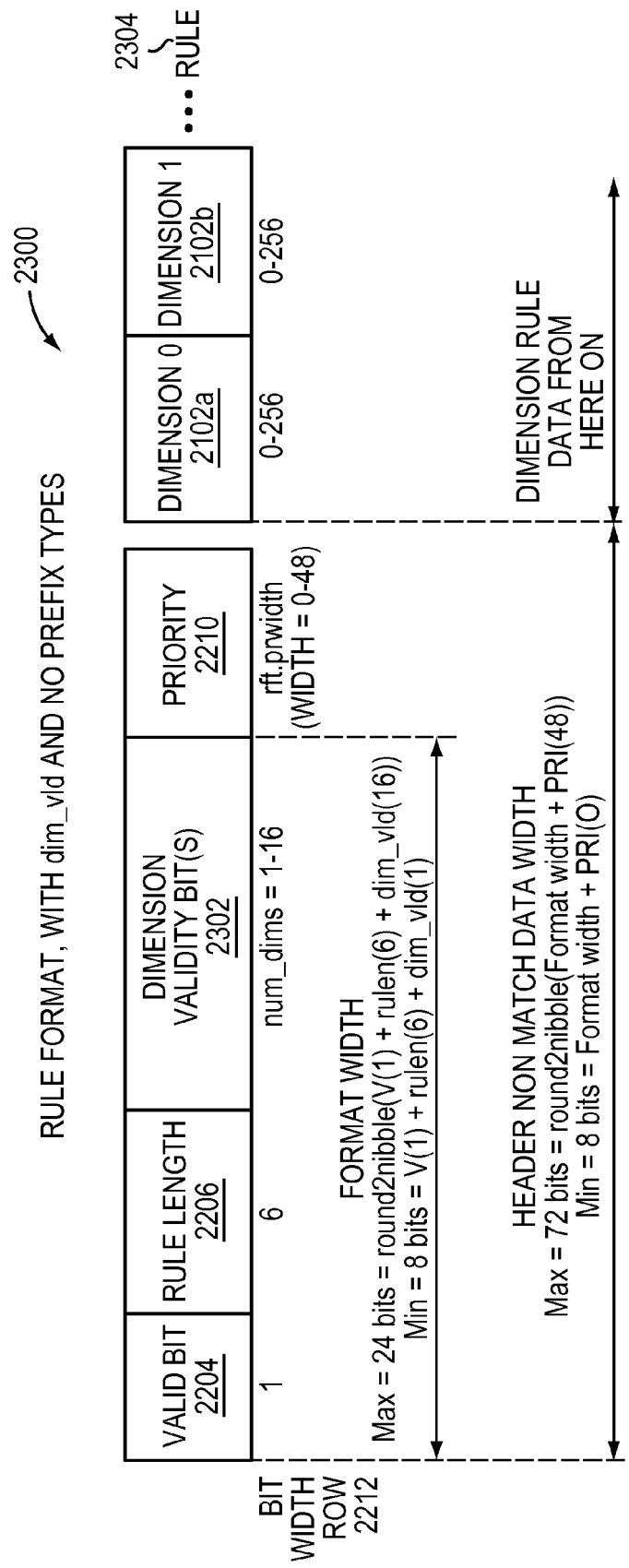
FIG. 23 is a block diagram illustrating a rule format with dimension validity bits.

FIG. 23 is a block diagram 2300 illustrating a rule format with dimension validity bits 2302. The rule 2304 includes a valid bit 2204, a rule length 2206, the dimension validity bits 2302, and the priority field 2210. The rule 2304 further includes the dimensions 2102a-b, as described above. As described above, the validity bit 2204 indicates whether the rule should be processed, and the rule length 2206 indicates how long the rule is, which indicates how far the RME or BPP should read the rule before ending processing. The dimension validity bits 2302 are a 1-16 bit value that mask the validity of each individual dimension. For example, if all of the dimension validity bits 2302 are one, then the dimensions are all valid. However for each dimension validity bit that is set to zero, the corresponding dimension to that bit position within the dimension of validity bits 2302 is disabled, or set to be a wildcard. For instance, a dimension that is disabled matches any key value (e.g., similar to a key value of a wildcard).

Figure 24A:
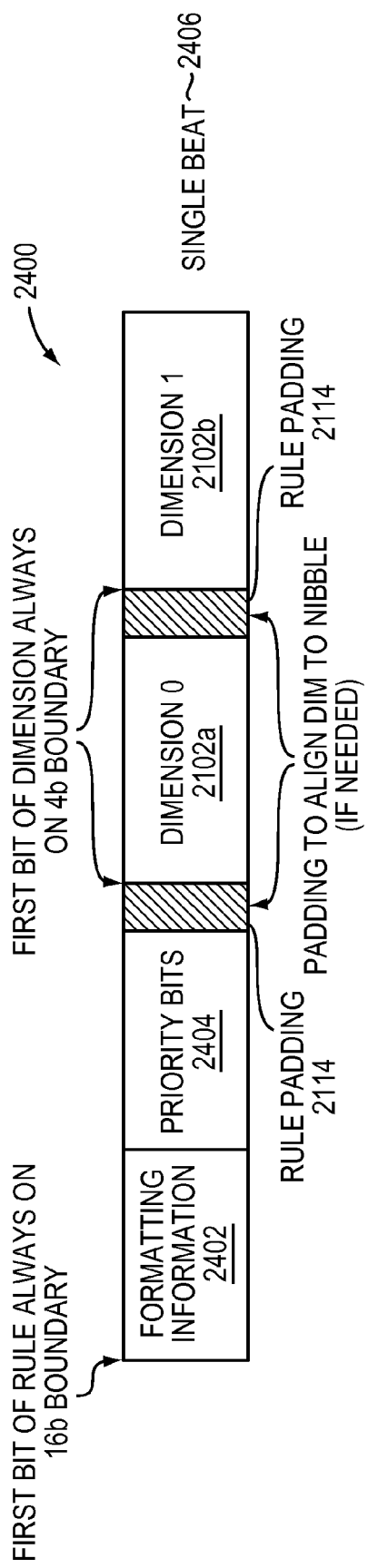
FIG. 24A is a block diagram illustrating a rule transmitted over a single beat, or clock cycle.

FIG. 24A is a block diagram 2400 illustrating a rule transmitted over a single beat 2406, or clock cycle. The rule begins with formatting information 2402 on a 16-bit boundary. The rule further has priority bits 2404 and rule padding 2114. Individual dimensions 2102a-b are between rule padding.

Figure 24B:
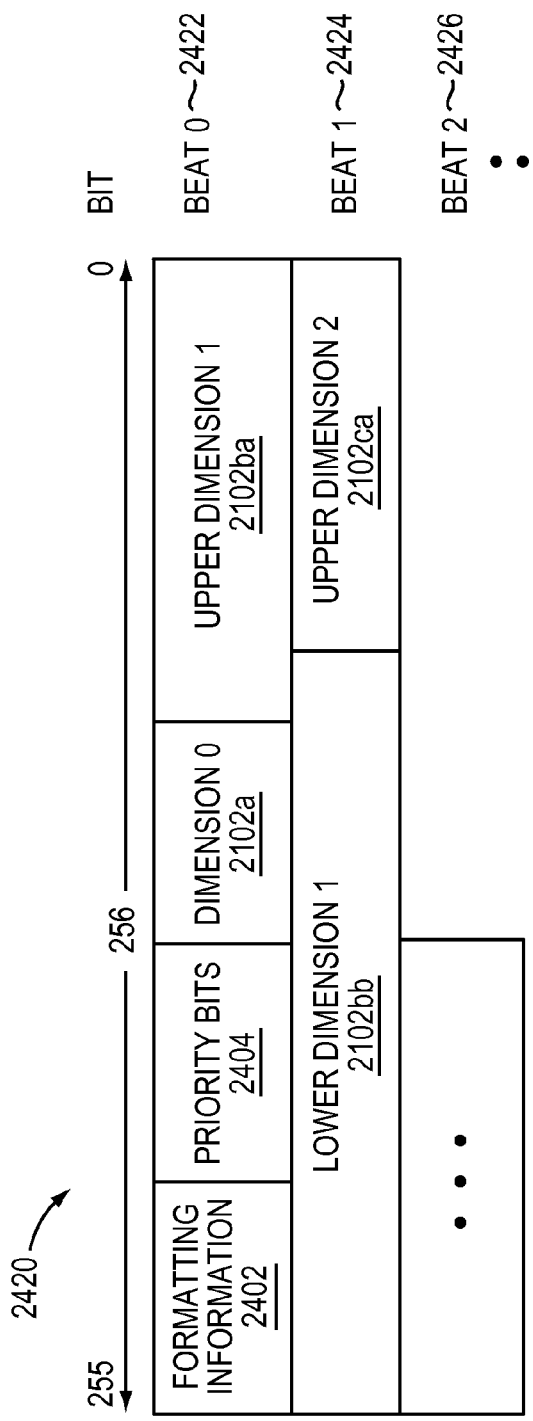
FIG. 24B is a block diagram illustrating an example embodiment of a rule transferred over multiple beats.

FIG. 24B is a block diagram 2420 illustrating an example embodiment of a rule transferred over multiple beats. The rule again starts with formatting information 2402, priority bits 2404 and dimension zero 2102a. The rule continues being transferred in beat zero 2422 with an upper dimension one 2102ba because the entire dimension one 2102b cannot fit in beat zero, which contains 256 bits and is therefore larger than dimension zero 2102a and dimension one 2102b combined. Therefore lower dimension one 2102bb is transferred during beat one 2424. Then, upper dimension two 2102ca is transferred at the end of beat one 2424. Again, dimension two 2102c does not completely transfer during beat one 2424, so dimension two 2102c continues being transferred during beat two 2426. The rules continue being transferred across multiple beats in this manner, if necessary.

Figure 25:
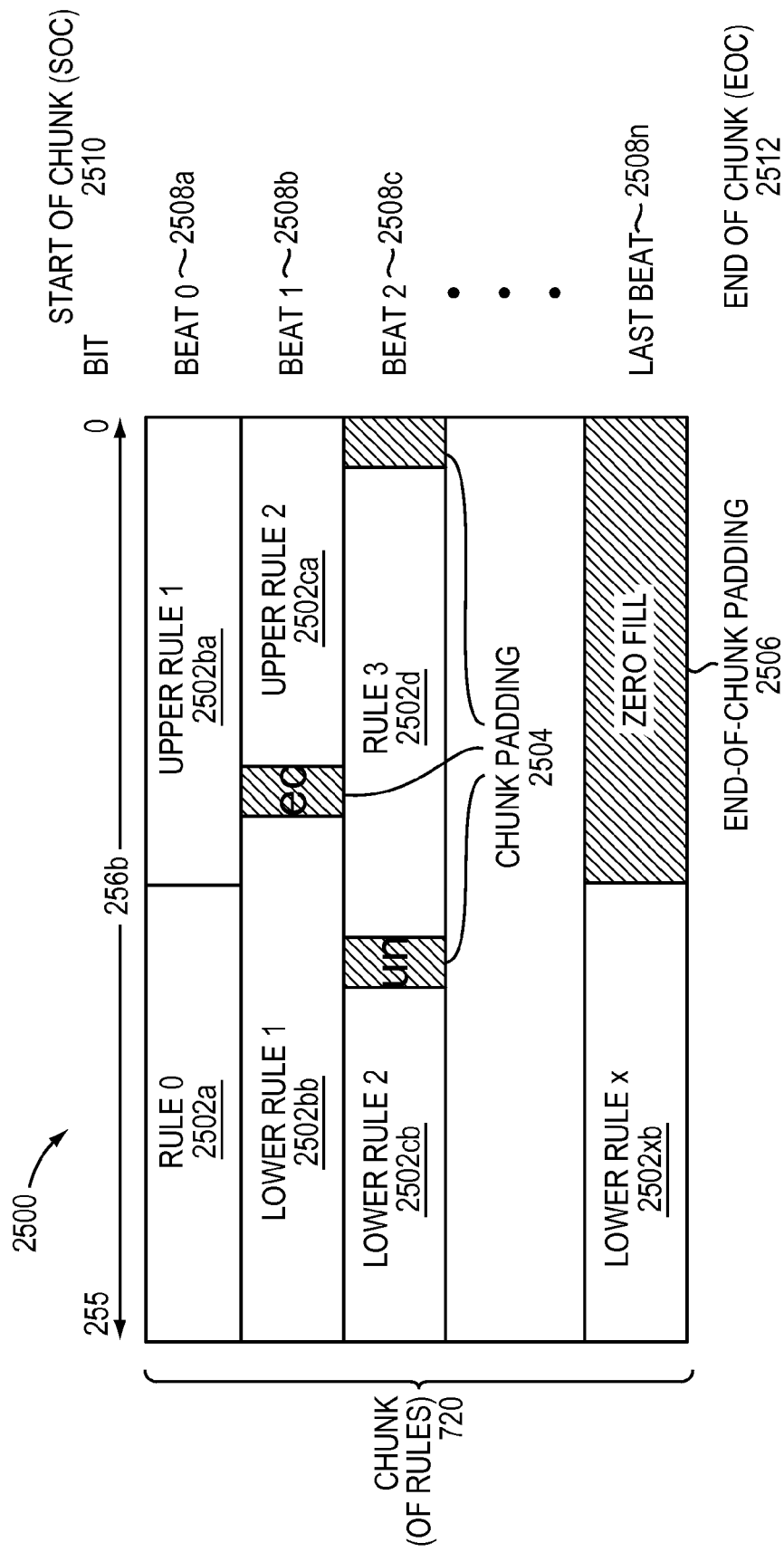
FIG. 25 is a block diagram illustrating example embodiments of a chunk format.

FIG. 25 is a block diagram 2500 illustrating example embodiments of a chunk format. A chunk is a set of rules stored in memory that are often processed together. The chunk 720 includes rule zero 2502a, rule one 2502b, rule two 2502c, rule three 2502d and rule X 2502x. The end of the chunk includes end of the chunk padding 2506. The chunk 720 is stored over more than 256 bits so it takes multiple beats to transfer the chunk. In this manner, the rules are transferred by breaking the rule up into multiple beats.

First, the rule zero 2502a is transferred during beat one 2508a. Then, during beat zero 2508a, upper rule one 2502ba is transferred, however rule one does not finish during beat zero 2508a. Rule one continues being transferred as lower rule one 2502bb in beat one 2508b. Then, chunk padding 2504 is transmitted to align the rules to the appropriate bit position. Upper rule two 2502ca is then transferred during beat one 2508b, however, rule two again does not get to finish completely being transferred during beat one. Therefore lower rule two 2502cb is transferred during beat two 2508c. Then chunk padding 2504 is transferred to align the rule to the appropriate bit position. Then rule three 2502d is transferred during beat two 2508c. Rule three does finish being transferred during beat two 2508c and chunk padding 2504 is transferred after rule three 2502d to align the next rule to the appropriate bit boundary. In this particular example, the chunk padding 2504 is at the end of beat two, so the next rule begins at the beginning of the next beat. Rules of the chunk 720 continue to be stored in the chunk 720 in this manner, until rule X 2502x. The last beat 2508n transfers lower rule X 2502xb, where the upper rule X (not shown) is transferred in the previous beat. Since rule X is the last rule, the last beat 2508n is filled with end of chunk padding 2506, which is filled with zeros.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   encoding a key matching network security rule having at least one dimension by storing in a memory:
   a length of the key matching network security rule;
   a header of the key matching network security rule having at least one header field; and
   at least one rule value field of the key matching network security rule, a given rule value field of the at least one rule value field corresponding to a given dimension of the at least one dimension, a given header field of the at least one header field including at least one dimension validity field storing a dimension validity value, a given dimension validity field of the at least one dimension validity field corresponding to the given dimension of the at least one dimension of the key matching network security rule, the stored length indicating an end of processing for the key matching network security rule, the dimension validity value stored in the given dimension validity field indicating whether the corresponding given dimension is stored to enable the key matching network security rule to occupy less space in the memory.

2. The method of claim 1, wherein storing the header of the key matching network security rule further includes at least one of:
   storing a match type of the key matching network security rule corresponding to the given dimension;
   storing the given dimension validity value with a first or second dimension validity value, enabling matching of the given dimension based on the first dimension validity value stored and disabling matching of the given dimension based on the second dimension validity value stored, wherein disabling matching of the given dimension includes masking the given dimension;
   storing a rule validity value corresponding to the key matching network security rule, wherein the key matching network security rule is enabled if the rule validity value has a first rule validity value and the key matching network security rule is disabled if the rule validity value has a second rule validity value; and
   storing a priority value corresponding to the key matching network security rule, wherein the priority value indicates a priority of the key matching network security rule compared to a plurality of key matching network security rules.

3. The method of claim 2, wherein disabling matching of the given dimension further includes disabling storage of the given rule value field of the key corresponding to the given dimension based on the given dimension validity value of the at least one dimension validity value of the given header field, corresponding to the given dimension, storing the second dimension validity value.

4. The method of claim 2, wherein the match type field includes an indication of at least one of a prefix match, an exact match, a mask match, and a range match, wherein the prefix match is configured to match a beginning of a field of a key to the given dimension, the exact match is configured to exactly match a field of a key to the given dimension, the mask match is configured to match bits of a field of a key corresponding to a mask to the given dimension, and the range match is configured to match a field of a key to a range of values indicated by the given dimension.

5. The method of claim 4, wherein if the match type field includes the indication of the prefix match, the match type field further includes a length to match the beginning of the field of the key.

6. The method of claim 1, further comprising aligning, by adding padding bits to the at least one header field and to the at least one rule value field in the memory, wherein the added padding bits set the at least one header fields and the at least one rule value field to be a multiple of a particular bit length.

7. The method of claim 1, further comprising:
grouping a plurality of key matching network security rules in a chunk; and
aligning the plurality of key matching network security rules within the chunk by padding each of the plurality of key matching network security rules to be a multiple of a particular bit length.

8. The method of claim 7, wherein aligning the plurality of key matching network security rules within the chunk aligns any particular key matching network security rule to be less than the particular bit length after a successive particular bit length.

9. The method of claim 7, wherein each of the key matching network security rules includes a corresponding priority, the method further comprising:
ordering the each of the plurality of key matching network security rules in the chunk according to the corresponding priority.

10. The method of claim 1, wherein the given header field is a first header field, the given rule value field is a first rule value field, the given dimension is a first dimension, and a second header field of the at least one header field corresponds with a second dimension of the at least one dimension, and the second rule value field, according to the second header field, is configured to be compared against a key or a field of the key.

11. The method of claim 10, wherein (i) if the second header field indicates a prefix match, the second rule value field includes a rule value and a bit length, and the rule value is compared against the bit length of the key or the field of the key, (ii) if the second header field indicates a mask match, the rule value field includes the rule value and a bit mask, and the rule value is compared against the particular bits of the key or the field of the key indicated by the bit mask, (iii) if the second header field indicates a range match, the rule value field includes a minimum and a maximum, and the key or the field of the key is determined to be within or out of a range indicated by the minimum and the maximum, and (iv) if the second header field indicates an exact match, the rule value field includes the rule value, and the key or the field of the key is compared against the rule value.

12. The method of claim 1, wherein storing the header of the key matching network security rule further includes:
storing the given dimension validity value with a first or second dimension validity value, enabling matching of the given dimension based on the first dimension validity value stored and disabling matching of the given dimension based on the second dimension validity value stored, wherein disabling matching of the given dimension includes masking the given dimension.

13. An apparatus comprising:
a memory;
a processor configured to encode a key matching network security rule having at least one dimension by storing in the memory:
a length of the key matching network security rule;
a header of the key matching network security rule having at least one header field; and
at least one rule value field of the key matching network security rule, a given rule value field of the at least one rule value field corresponding to a given dimension of the at least one dimension, a given header field of the at least one header field including at least one dimension validity field storing a dimension validity value, a given dimension validity field of the at least one dimension validity field corresponding to the given dimension of the at least one dimension of the key matching network security rule, the stored length indicating an end of processing for the key matching network security rule, the dimension validity value stored in the given dimension validity field indicating whether the corresponding given dimension is stored to enable the key matching network security rule to occupy less space in the memory.

14. The apparatus of claim 13, wherein the processor is further configured to encode the key matching network security rule by storing the header of the key network security matching rule by at least one of:
storing a match type of the key matching network security rule corresponding to the given dimension;
storing the given dimension validity value with a first or second dimension validity value, enabling matching of the given dimension based on the first dimension validity value stored and disabling matching of the given dimension based on the second dimension validity value stored, wherein disabling matching of the given dimension includes masking the given dimension;
storing a rule validity value corresponding to the key matching network security rule, wherein the key matching network security rule is enabled if the rule validity value has a first rule validity value and the key matching network security rule is disabled if the rule validity value has a second rule validity value; and
storing a priority value corresponding to the key matching network security rule, wherein the priority value indicates a priority of the key matching network security rule compared to a plurality of key matching network security rules.

15. The apparatus of claim 14, wherein the processor is further configured to disable storing of the given rule value field of the key corresponding to the given dimension, if the given dimension validity value corresponding to the given dimension is storing the second dimension validity value.

16. The apparatus of claim 14, wherein the match type field includes an indication of at least one of a prefix match, an exact match, a mask match, and a range match, wherein the prefix match is configured to match a beginning of a field of a key to the given dimension, the exact match is configured to exactly match a field of a key to the given dimension, the mask match is configured to match bits of a field of a key corresponding to a mask to the given dimension, and the range match is configured to match a field of a key to a range of values indicated by the given dimension.

17. The apparatus of claim 16, wherein if the match type field includes the indication of the prefix match, the match type field further includes a length to match the beginning of the field of the key.

18. The apparatus of claim 13, wherein the processor is further configured to align, by adding padding bits to the at least one header field and to the at least one rule value field in the memory, wherein the added padding bits set the at least one header fields and the at least one rule value field to be a multiple of a particular bit length.

19. The apparatus of claim 13, wherein the processor is further configured to (a) group a plurality of key matching network security rules in a chunk, and (b) align the plurality of key matching network security rules within the chunk by padding each of the plurality of key matching network security rules to be a multiple of a particular bit length.

20. The apparatus of claim 19, wherein the processor is further configured to align any particular key network security matching rule to be less than the particular bit length after a successive particular bit length.

21. The apparatus of claim 19, wherein each of the key matching network security rules includes a corresponding priority, the processor further configured to order the each of the plurality of key matching network security rules in the chunk according to the corresponding priority.

22. The apparatus of claim 13, wherein the given header field is a first header field, the given rule value field is a first rule value field, the given dimension is a first dimension, and a second header field of the at least one header field corresponds with a second dimension of the at least one dimension, and the second rule value field, according to the second header field, is configured to be compared against a key or a field of the key.

23. The apparatus of claim 22, wherein (i) if the second header field indicates a prefix match, the second rule value field includes a rule value and a bit length, and the rule value is compared against the bit length of the key or the field of the key, (ii) if the second header field indicates a mask match, the rule value field includes the rule value and a bit mask, and the rule value is compared against the particular bits of the key or the field of the key indicated by the bit mask, (iii) if the second header field indicates a range match, the rule value field includes a minimum and a maximum, and the key or the field of the key is determined to be within or out of a range indicated by the minimum and the maximum, and (iv) if the second header field indicates an exact match, the rule value field includes the rule value, and the key or the field of the key is compared against the rule value.

24. The apparatus of claim 13, wherein the processor is a compiler and the processor is further configured to compile the key matching network security rules in a textual format to a binary format.

* * * * *